(12) United States Patent
Shattil

(10) Patent No.: US 11,804,882 B1
(45) Date of Patent: Oct. 31, 2023

(54) SINGLE CARRIER FREQUENCY DIVISION MULTIPLE ACCESS BASEBAND SIGNAL GENERATION

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 351 days.

(21) Appl. No.: 17/386,508

(22) Filed: Jul. 27, 2021

Related U.S. Application Data

(60) Continuation of application No. 14/727,769, filed on Jun. 1, 2015, now Pat. No. 11,201,644, which is a
(Continued)

(51) Int. Cl.
*H04B 7/0452* (2017.01)
*H04B 1/00* (2006.01)
(Continued)

(52) U.S. Cl.
CPC ......... *H04B 7/0452* (2013.01); *H04B 1/0003* (2013.01); *H04B 7/024* (2013.01);
(Continued)

(58) Field of Classification Search
CPC ... H04L 5/0073; H04L 5/0035; H04L 5/0023; H04B 7/0456; H04B 7/0452; H04B 1/0003
See application file for complete search history.

(56) References Cited

U.S. PATENT DOCUMENTS

| 4,164,714 A | 8/1979 | Swanson |
| 4,471,399 A | 9/1984 | Udren |

(Continued)

FOREIGN PATENT DOCUMENTS

| EP | 2449690 B1 | 5/2012 |
| EP | 2675072 | 12/2013 |

(Continued)

OTHER PUBLICATIONS

C-Y. Hsu, et al.; "Novel SLM Scheme with Low-Complexity for PAPR Reduction in OFDM System", IEICE Trans. Fundamentals, vol. E91-A. No. 7, pp. 1689-1696, Jul. 2008.
(Continued)

*Primary Examiner* — Samina F Choudhry
(74) *Attorney, Agent, or Firm* — Steven J Shattil

(57) ABSTRACT

Applications of CI processing to ad-hoc and peer-to-peer networking significantly improve throughput, network capacity, range, power efficiency, and spectral efficiency. CI-based subscriber units perform network-control functions to optimize network performance relative to channel conditions, network loads, and subscriber services. CI codes are used to identify and address network transmissions. Channel characteristics of communication links are employed to encode, address, and authenticate network transmissions. CI transceivers used as relays and routers employ unique characteristics of transmission paths to code and decode network transmissions. A central processor is adapted to perform array processing with signals received from, and transmitted by, a plurality of subscriber units in a wireless network.

29 Claims, 17 Drawing Sheets

Related U.S. Application Data continuation of application No. 14/276,309, filed on May 13, 2014, now Pat. No. 9,048,897, which is a continuation of application No. 12/545,572, filed on Aug. 21, 2009, now Pat. No. 8,750,264, which is a division of application No. 11/187,107, filed on Jul. 22, 2005, now Pat. No. 8,670,390.

(60) Provisional application No. 60/598,187, filed on Aug. 2, 2004.

(51) Int. Cl.

| | | |
|---|---|---|
| *H04B 7/026* | (2017.01) | |
| *H04J 13/00* | (2011.01) | |
| *H04L 27/26* | (2006.01) | |
| *H04L 45/24* | (2022.01) | |
| *H04L 47/10* | (2022.01) | |
| *H04L 5/00* | (2006.01) | |
| *H04B 7/0456* | (2017.01) | |
| *H04B 7/024* | (2017.01) | |
| *H04B 7/06* | (2006.01) | |
| *H04L 27/01* | (2006.01) | |
| *H04L 27/148* | (2006.01) | |
| *H04J 13/12* | (2011.01) | |
| *H04W 72/044* | (2023.01) | |
| *H04W 84/18* | (2009.01) | |

(52) U.S. Cl.
CPC ........... *H04B 7/026* (2013.01); *H04B 7/0456* (2013.01); *H04B 7/0697* (2013.01); *H04J 13/0003* (2013.01); *H04J 13/004* (2013.01); *H04L 5/0007* (2013.01); *H04L 5/0023* (2013.01); *H04L 5/0035* (2013.01); *H04L 5/0037* (2013.01); *H04L 5/0073* (2013.01); *H04L 27/01* (2013.01); *H04L 27/148* (2013.01); *H04L 27/2602* (2013.01); *H04L 27/265* (2013.01); *H04L 27/2636* (2013.01); *H04L 27/2646* (2013.01); *H04L 27/2647* (2013.01); *H04L 45/24* (2013.01); *H04L 47/10* (2013.01); *H04J 13/12* (2013.01); *H04L 5/0021* (2013.01); *H04L 27/2601* (2013.01); *H04L 27/2614* (2013.01); *H04W 72/046* (2013.01); *H04W 84/18* (2013.01)

(56) References Cited

U.S. PATENT DOCUMENTS

| | | |
|---|---|---|
| 4,479,226 A | 10/1984 | Prabhu et al. |
| 4,550,402 A | 10/1985 | Gable et al. |
| 4,590,511 A | 5/1986 | Bocchi et al. |
| 4,628,517 A | 12/1986 | Schwarz |
| 4,700,341 A | 10/1987 | Huang |
| 4,827,480 A | 5/1989 | Kowalski |
| 4,901,307 A | 2/1990 | Gilhousen et al. |
| 4,912,422 A | 3/1990 | Kobayashi et al. |
| 4,943,973 A | 7/1990 | Werner |
| 5,003,545 A | 3/1991 | Kowalski |
| 5,016,242 A | 5/1991 | Tang |
| 5,093,863 A | 3/1992 | Galand et al. |
| 5,125,100 A | 6/1992 | Katznelson |
| 5,191,459 A | 3/1993 | Thompson et al. |
| 5,249,201 A | 9/1993 | Posner et al. |
| 5,282,222 A | 1/1994 | Fattouche et al. |
| 5,309,514 A | 5/1994 | Johnson et al. |
| 5,406,551 A | 4/1995 | Saito et al. |
| 5,410,538 A | 4/1995 | Roche et al. |
| 5,412,648 A | 5/1995 | Fan |
| 5,422,952 A | 6/1995 | Kennedy et al. |
| 5,425,049 A | 6/1995 | Dent et al. |
| 5,457,557 A | 10/1995 | Zarem et al. |
| 5,463,376 A | 10/1995 | Stoffer |
| 5,491,727 A | 2/1996 | Petit |
| 5,500,856 A | 3/1996 | Nagase et al. |
| 5,504,775 A | 4/1996 | Chouly et al. |
| 5,504,783 A | 4/1996 | Tomisato et al. |
| 5,519,692 A | 5/1996 | Hershey |
| 5,521,937 A | 5/1996 | Kondo et al. |
| 5,528,581 A | 6/1996 | De Bot |
| 5,533,012 A | 7/1996 | Fukasawa et al. |
| 5,543,806 A | 8/1996 | Wilkinson |
| 5,548,582 A | 8/1996 | Brajal et al. |
| 5,555,268 A | 9/1996 | Fattouche et al. |
| 5,563,906 A | 10/1996 | Hershey et al. |
| 5,579,304 A | 11/1996 | Sugimoto et al. |
| 5,612,978 A | 3/1997 | Blanchard et al. |
| 5,630,154 A | 5/1997 | Bolstad et al. |
| 5,640,698 A | 6/1997 | Shen et al. |
| 5,691,832 A | 11/1997 | Tiedenbaum et al. |
| 5,694,393 A | 12/1997 | Kaye |
| 5,704,013 A | 12/1997 | Watari et al. |
| 5,712,716 A | 1/1998 | Vanoli et al. |
| 5,765,097 A | 6/1998 | Dail |
| 5,790,516 A | 8/1998 | Gudmundson et al. |
| 5,793,413 A | 8/1998 | Hylton et al. |
| 5,793,759 A | 8/1998 | Rakib et al. |
| 5,809,426 A | 9/1998 | Radojevic et al. |
| 5,815,801 A | 9/1998 | Hamalainen et al. |
| 5,818,619 A | 10/1998 | Medved et al. |
| 5,822,368 A | 10/1998 | Wang |
| 5,828,658 A | 10/1998 | Ottersten et al. |
| 5,831,977 A | 11/1998 | Dent |
| 5,838,268 A | 11/1998 | Frenkel et al. |
| 5,844,951 A | 12/1998 | Proakis et al. |
| 5,862,189 A | 1/1999 | Huisken et al. |
| 5,931,893 A | 8/1999 | Dent et al. |
| 5,940,196 A | 8/1999 | Piehler et al. |
| 5,940,379 A | 8/1999 | Startup et al. |
| 5,943,322 A | 8/1999 | Mayor et al. |
| 5,943,332 A | 8/1999 | Liu et al. |
| 5,949,796 A | 9/1999 | Kumar |
| 5,955,983 A | 9/1999 | Li |
| 5,955,992 A | 9/1999 | Shattil |
| 5,960,032 A | 9/1999 | Letaief et al. |
| 5,991,334 A | 11/1999 | Papadopoulos et al. |
| 6,008,760 A | 12/1999 | Shattil |
| 6,018,317 A | 1/2000 | Dogan et al. |
| 6,047,190 A | 4/2000 | Haleem et al. |
| 6,055,432 A | 4/2000 | Haleem et al. |
| 6,058,105 A | 5/2000 | Hochwald |
| 6,075,812 A | 6/2000 | Cafarella et al. |
| 6,084,871 A | 7/2000 | Engstrom et al. |
| 6,088,351 A | 7/2000 | Jenkin et al. |
| 6,091,967 A | 7/2000 | Kruys et al. |
| 6,097,712 A | 8/2000 | Secord et al. |
| 6,097,773 A | 8/2000 | Carter et al. |
| 6,107,954 A | 8/2000 | Li |
| 6,122,295 A | 9/2000 | Kato et al. |
| 6,128,276 A | 10/2000 | Agee |
| 6,128,350 A | 10/2000 | Shastri et al. |
| 6,130,918 A | 10/2000 | Humphrey et al. |
| 6,141,393 A | 10/2000 | Thomas et al. |
| RE36,944 E | 11/2000 | Li |
| 6,144,711 A | 11/2000 | Raleigh et al. |
| 6,154,443 A | 11/2000 | Huang et al. |
| 6,175,550 B1 | 1/2001 | van Nee et al. |
| 6,175,551 B1 | 1/2001 | Awater et al. |
| 6,178,158 B1 | 1/2001 | Suzuki et al. |
| 6,188,717 B1 | 2/2001 | Kaiser et al. |
| 6,192,068 B1 | 2/2001 | Fattouche et al. |
| 6,208,295 B1 | 3/2001 | Dogan et al. |
| 6,211,671 B1 | 4/2001 | Shattil |
| 6,215,983 B1 | 4/2001 | Dogan et al. |
| 6,233,248 B1 | 5/2001 | Sautter et al. |
| 6,236,642 B1 | 5/2001 | Shaffer et al. |
| 6,240,129 B1 | 5/2001 | Reusens et al. |
| 6,243,565 B1 | 6/2001 | Smith et al. |
| 6,243,581 B1 | 6/2001 | Jawanda |
| 6,252,909 B1 | 6/2001 | Tzannes et al. |
| 6,266,702 B1 | 7/2001 | Darnell et al. |

(56) References Cited

U.S. PATENT DOCUMENTS

| | | |
|---|---|---|
| 6,282,167 B1 | 8/2001 | Michon et al. |
| 6,282,185 B1 | 8/2001 | Hakkinen et al. |
| 6,289,220 B1 | 9/2001 | Spear |
| 6,292,473 B1 | 9/2001 | Duske et al. |
| 6,301,221 B1 | 10/2001 | Paterson |
| 6,307,892 B1 | 10/2001 | Jones et al. |
| 6,310,704 B1 | 10/2001 | Dogan et al. |
| 6,320,897 B1 | 11/2001 | Fattouche et al. |
| 6,331,837 B1 | 12/2001 | Shattil |
| 6,348,791 B2 | 2/2002 | Shattil |
| 6,351,499 B1 | 2/2002 | Paulraj et al. |
| 6,359,923 B1 | 3/2002 | Agee et al. |
| 6,377,566 B1 | 4/2002 | Cupo et al. |
| 6,389,034 B1 | 5/2002 | Guo et al. |
| 6,405,147 B1 | 6/2002 | Fera |
| 6,418,136 B1 | 7/2002 | Naor et al. |
| 6,421,528 B1 | 7/2002 | Rosen et al. |
| 6,434,390 B2 | 8/2002 | Rahman |
| 6,438,173 B1 | 8/2002 | Stantchev et al. |
| 6,442,130 B1 | 8/2002 | Jones, IV et al. |
| 6,442,193 B1 | 8/2002 | Hirsch |
| 6,442,222 B1 | 8/2002 | Ghazi-Moghadam et al. |
| 6,452,981 B1 | 9/2002 | Raleigh et al. |
| 6,459,740 B1 | 10/2002 | Lo |
| 6,463,295 B1 | 10/2002 | Yun |
| 6,470,055 B1 | 10/2002 | Feher |
| 6,473,393 B1 | 10/2002 | Ariyavisitakul et al. |
| 6,473,418 B1 | 10/2002 | Laroia et al. |
| 6,496,290 B1 | 12/2002 | Lee |
| 6,504,862 B1 | 1/2003 | Yang et al. |
| 6,507,319 B2 | 1/2003 | Sikina |
| 6,510,133 B1 | 1/2003 | Uesugi |
| 6,512,737 B1 | 1/2003 | Agee |
| 6,526,105 B1 | 2/2003 | Harikumar et al. |
| 6,532,224 B1 | 3/2003 | Dailey |
| 6,549,581 B1 | 4/2003 | Izumi et al. |
| 6,563,881 B1 | 5/2003 | Sakoda et al. |
| 6,567,482 B1 | 5/2003 | Popovic |
| 6,567,982 B1 | 5/2003 | Howe et al. |
| 6,570,913 B1 | 5/2003 | Chen |
| 6,603,827 B2 | 8/2003 | Bottomley et al. |
| 6,606,351 B1 | 8/2003 | Dapper et al. |
| 6,631,175 B2 | 10/2003 | Harikumar et al. |
| 6,636,495 B1 | 10/2003 | Tangemann |
| 6,650,645 B2 | 11/2003 | Scott et al. |
| 6,654,408 B1 | 11/2003 | Kadous et al. |
| 6,654,719 B1 | 11/2003 | Papadias |
| 6,662,024 B2 | 12/2003 | Walton et al. |
| 6,665,521 B1 | 12/2003 | Gorday et al. |
| 6,667,714 B1 | 12/2003 | Solondz |
| 6,674,810 B1 | 1/2004 | Cheng |
| 6,674,999 B2 | 1/2004 | Ramachandran |
| 6,678,318 B1 | 1/2004 | Lai |
| 6,686,879 B2 | 2/2004 | Shattil |
| 6,687,511 B2 | 2/2004 | McGowan et al. |
| 6,693,984 B1 | 2/2004 | Andre et al. |
| 6,694,154 B1 | 2/2004 | Molnar et al. |
| 6,704,794 B1 | 3/2004 | Kejriwal et al. |
| 6,717,908 B2 | 4/2004 | Vijayan et al. |
| 6,728,295 B1 | 4/2004 | Nallanathan et al. |
| 6,747,946 B1 | 6/2004 | Kaneko et al. |
| 6,751,187 B2 | 6/2004 | Walton et al. |
| 6,757,344 B2 | 6/2004 | Carleton et al. |
| 6,760,373 B2 | 7/2004 | Gross et al. |
| 6,765,969 B1 | 7/2004 | Vook et al. |
| 6,778,514 B1 | 8/2004 | Boccussi et al. |
| 6,785,513 B1 | 8/2004 | Sivaprakasam |
| 6,813,485 B2 | 11/2004 | Sorrells et al. |
| 6,832,251 B1 | 12/2004 | Gelvin et al. |
| 6,850,481 B2 | 2/2005 | Wu et al. |
| 6,859,506 B1 | 2/2005 | McCorkle |
| 6,859,641 B2 | 2/2005 | Collins et al. |
| 6,882,619 B1 | 4/2005 | Gerakoulis |
| 6,901,422 B1 | 5/2005 | Sazegari |
| 6,907,270 B1 | 6/2005 | Blanz |
| 6,928,047 B1 | 8/2005 | Xia |
| 6,944,168 B2 | 9/2005 | Paatela et al. |
| 6,980,768 B2 | 12/2005 | Arend et al. |
| 6,982,968 B1 | 1/2006 | Barratt et al. |
| 6,985,533 B2 | 1/2006 | Attallah et al. |
| 6,996,076 B1 | 2/2006 | Forbes et al. |
| 7,009,958 B1 | 3/2006 | Gerakoulis |
| 7,010,015 B2 | 3/2006 | Hervey |
| 7,010,048 B1 | 3/2006 | Shattil |
| 7,020,110 B2 | 3/2006 | Walton et al. |
| 7,031,309 B1 | 4/2006 | Sautter et al. |
| 7,031,371 B1 | 4/2006 | Lakkis |
| 7,035,661 B1 | 4/2006 | Yun |
| 7,057,555 B2 | 6/2006 | Lewis |
| 7,075,999 B2 | 7/2006 | Redfern |
| 7,076,168 B1 | 7/2006 | Shattil |
| 7,082,153 B2 | 7/2006 | Balachandran et al. |
| 7,099,268 B2 | 8/2006 | Ichihara et al. |
| 7,139,321 B2 | 11/2006 | Giannakis et al. |
| 7,149,211 B2 | 12/2006 | Bennett et al. |
| 7,154,936 B2 | 12/2006 | Bjerke et al. |
| 7,155,255 B2 | 12/2006 | Blum et al. |
| 7,158,474 B1 | 1/2007 | Gerakoulis |
| 7,158,504 B2 | 1/2007 | Kadaba et al. |
| 7,194,766 B2 | 3/2007 | Noehring et al. |
| 7,197,084 B2 | 3/2007 | Ketchum et al. |
| 7,263,133 B1 | 8/2007 | Miao |
| 7,283,799 B2 | 10/2007 | Shattil |
| 7,286,604 B2 | 10/2007 | Shattil |
| 7,295,509 B2 | 11/2007 | Laroia et al. |
| 7,317,750 B2 | 1/2008 | Shattil |
| 7,366,117 B2 | 4/2008 | Kim et al. |
| 7,376,074 B2 | 5/2008 | Jung et al. |
| 7,391,804 B2 | 6/2008 | Shattil |
| 7,406,261 B2 | 7/2008 | Shattil |
| 7,418,043 B2 | 8/2008 | Shattil |
| 7,426,196 B2 | 9/2008 | Gopalakrishnan et al. |
| 7,430,257 B1 | 9/2008 | Shattil |
| 7,469,013 B1 | 12/2008 | Bolt et al. |
| 7,508,798 B2 | 3/2009 | Tong et al. |
| 7,570,956 B2 | 8/2009 | Bigham et al. |
| 7,594,010 B2 | 9/2009 | Dohler et al. |
| 7,606,137 B2 | 10/2009 | Shattil |
| 7,751,488 B2 | 7/2010 | Moffatt |
| 7,764,594 B2 | 7/2010 | Walton et al. |
| 7,787,514 B2 | 8/2010 | Shattil |
| 7,787,556 B2 | 8/2010 | Zhang et al. |
| 7,801,247 B2 | 9/2010 | Onggosanusi et al. |
| 7,876,729 B1 | 1/2011 | Grilli et al. |
| 7,907,588 B2 | 3/2011 | Schaepperle et al. |
| 8,031,583 B2 | 10/2011 | Classon et al. |
| 8,102,907 B2 | 1/2012 | Kim |
| 8,107,965 B2 | 1/2012 | Hui et al. |
| 8,160,166 B2 | 4/2012 | Moffatt et al. |
| 8,301,139 B2 | 10/2012 | Lotze et al. |
| 8,320,301 B2 | 11/2012 | Walton et al. |
| 8,345,693 B1 | 1/2013 | Kim |
| 8,363,739 B2 | 1/2013 | Ma et al. |
| 8,391,913 B2 | 3/2013 | Zimmer et al. |
| 8,396,153 B1 | 3/2013 | Shen et al. |
| 8,401,095 B2 | 3/2013 | Han et al. |
| 8,416,837 B2 | 4/2013 | Wu et al. |
| 8,472,335 B2 | 6/2013 | De Pasquale et al. |
| 8,498,647 B2 | 7/2013 | Gorokhov et al. |
| 8,526,400 B2 | 9/2013 | Tong et al. |
| 8,649,364 B2 | 2/2014 | Myung |
| 8,654,871 B2 | 2/2014 | Kishigami et al. |
| 8,670,390 B2 | 3/2014 | Shattil |
| 8,724,721 B2 | 5/2014 | Soler Garrido |
| 8,780,830 B2 | 7/2014 | Doppler et al. |
| 8,804,647 B2 | 8/2014 | Ko et al. |
| 8,885,628 B2 | 10/2014 | Palanki et al. |
| 8,929,550 B2 | 1/2015 | Shattil |
| 8,942,082 B2 | 1/2015 | Shattil |
| 8,976,838 B2 | 3/2015 | Jaeckel et al. |
| 9,025,684 B2 | 5/2015 | Jeong et al. |
| 9,026,790 B2 | 5/2015 | Bolton et al. |
| 9,042,468 B2 | 5/2015 | Barbu et al. |
| 9,130,810 B2 | 9/2015 | Laroia et al. |

(56) References Cited

U.S. PATENT DOCUMENTS

| | | |
|---|---|---|
| 9,225,471 B2 | 12/2015 | Shattil |
| 9,485,063 B2 | 11/2016 | Shattil |
| 9,628,231 B2 | 4/2017 | Shattil |
| 9,693,339 B2 | 6/2017 | Palanki et al. |
| 9,698,888 B2 | 7/2017 | Ko et al. |
| 9,768,842 B2 | 9/2017 | Shattil |
| 9,798,329 B2 | 10/2017 | Shattil |
| 9,800,448 B1 | 10/2017 | Shattil |
| 9,819,449 B2 | 11/2017 | Shattil |
| 9,870,341 B2 | 1/2018 | Badin et al. |
| 10,211,892 B2 | 2/2019 | Shattil |
| 10,243,773 B1 | 3/2019 | Shattil |
| 10,554,353 B2 | 2/2020 | Zhao et al. |
| 10,568,143 B2 | 2/2020 | Delfeld et al. |
| 10,602,507 B2 | 3/2020 | Nammi et al. |
| 10,637,705 B1 | 4/2020 | Shattil |
| 10,917,167 B2 | 2/2021 | Jia et al. |
| 10,992,998 B2 | 4/2021 | Bergstrom |
| 11,018,918 B1 | 5/2021 | Shattil |
| 11,025,377 B2 | 6/2021 | Rakib et al. |
| 11,025,471 B2 | 6/2021 | Kuchi |
| 2001/0050926 A1 | 12/2001 | Kumar |
| 2002/0009096 A1 | 1/2002 | Odenwalder |
| 2002/0034191 A1 | 3/2002 | Shattil |
| 2002/0044524 A1 | 4/2002 | Laroia et al. |
| 2002/0051433 A1 | 5/2002 | Affes et al. |
| 2002/0061068 A1 | 5/2002 | Leva et al. |
| 2002/0118727 A1 | 8/2002 | Kim et al. |
| 2002/0118781 A1 | 8/2002 | Thomas et al. |
| 2002/0127978 A1 | 9/2002 | Khatri |
| 2002/0137472 A1 | 9/2002 | Quinn et al. |
| 2002/0168016 A1 | 11/2002 | Wang et al. |
| 2002/0172184 A1 | 11/2002 | Kim et al. |
| 2002/0172213 A1 | 11/2002 | Aroia et al. |
| 2002/0181509 A1 | 12/2002 | Mody et al. |
| 2002/0193146 A1* | 12/2002 | Wallace ............... H04B 7/0697 455/562.1 |
| 2002/0196733 A1 | 12/2002 | Shen et al. |
| 2003/0026222 A1 | 2/2003 | Kotzin |
| 2003/0043732 A1 | 3/2003 | Walton et al. |
| 2003/0072380 A1 | 4/2003 | Huang |
| 2003/0086363 A1 | 5/2003 | Hernandes |
| 2003/0128658 A1 | 7/2003 | Walton et al. |
| 2003/0133469 A1 | 7/2003 | Brockmann et al. |
| 2003/0147655 A1 | 8/2003 | Shattil |
| 2003/0154262 A1 | 8/2003 | Kaiser et al. |
| 2003/0161282 A1* | 8/2003 | Medvedev ............ H04L 5/0025 370/208 |
| 2003/0169824 A1 | 9/2003 | Chayat |
| 2003/0206527 A1 | 11/2003 | Yim |
| 2003/0218973 A1 | 11/2003 | Oprea et al. |
| 2004/0013101 A1 | 1/2004 | Akin et al. |
| 2004/0017824 A1 | 1/2004 | Koenck |
| 2004/0047405 A1 | 3/2004 | Boesel et al. |
| 2004/0057501 A1 | 3/2004 | Balachandran et al. |
| 2004/0086027 A1 | 5/2004 | Shattil |
| 2004/0100897 A1 | 5/2004 | Shattil |
| 2004/0141548 A1 | 7/2004 | Shattil |
| 2004/0151109 A1 | 8/2004 | Batra et al. |
| 2004/0178954 A1 | 9/2004 | Vook et al. |
| 2004/0223476 A1 | 11/2004 | Jose et al. |
| 2004/0240535 A1 | 12/2004 | Verma et al. |
| 2004/0243258 A1 | 12/2004 | Shattil |
| 2005/0058098 A1 | 3/2005 | Klein et al. |
| 2005/0075081 A1 | 4/2005 | Catreux-Erceg et al. |
| 2005/0078742 A1 | 4/2005 | Cairns et al. |
| 2005/0179607 A1 | 8/2005 | Gorsuch et al. |
| 2005/0198199 A1 | 9/2005 | Dowling |
| 2005/0255808 A1 | 11/2005 | Ahmed et al. |
| 2005/0259627 A1 | 11/2005 | Song et al. |
| 2005/0265275 A1 | 12/2005 | Howard et al. |
| 2005/0265293 A1 | 12/2005 | Ro et al. |
| 2005/0270968 A1 | 12/2005 | Feng et al. |
| 2005/0286476 A1 | 12/2005 | Crosswy et al. |
| 2006/0023803 A1 | 2/2006 | Perlman et al. |
| 2006/0034378 A1 | 2/2006 | Lindskog et al. |
| 2006/0057958 A1 | 3/2006 | Ngo et al. |
| 2006/0106600 A1 | 5/2006 | Bessette |
| 2006/0153283 A1 | 7/2006 | Scharf et al. |
| 2006/0245346 A1 | 11/2006 | Bar-Ness et al. |
| 2006/0262870 A1 | 11/2006 | Khan |
| 2007/0041311 A1 | 2/2007 | Baum et al. |
| 2007/0041404 A1 | 2/2007 | Palanki et al. |
| 2007/0071125 A1 | 3/2007 | Tan et al. |
| 2007/0081580 A1 | 4/2007 | Breiling |
| 2007/0078924 A1 | 5/2007 | Hassan et al. |
| 2007/0098099 A1 | 5/2007 | Gore et al. |
| 2007/0110172 A1 | 5/2007 | Faulkner et al. |
| 2007/0140102 A1 | 6/2007 | Oh et al. |
| 2007/0160014 A1 | 7/2007 | Larsson |
| 2007/0177681 A1 | 8/2007 | Choi et al. |
| 2007/0183386 A1 | 8/2007 | Muharemovic et al. |
| 2007/0206686 A1 | 9/2007 | Vook et al. |
| 2007/0211807 A1 | 9/2007 | Han et al. |
| 2007/0218942 A1 | 9/2007 | Khan et al. |
| 2008/0075188 A1 | 3/2008 | Kowalski et al. |
| 2008/0095121 A1 | 4/2008 | Shattil |
| 2008/0151743 A1 | 6/2008 | Tong et al. |
| 2008/0240022 A1 | 10/2008 | Yoon et al. |
| 2008/0298335 A1 | 12/2008 | Lee |
| 2008/0298502 A1 | 12/2008 | Xu et al. |
| 2008/0310484 A1 | 12/2008 | Shattil |
| 2008/0317172 A1 | 12/2008 | Zhang et al. |
| 2009/0074093 A1 | 3/2009 | Han et al. |
| 2009/0086848 A1 | 4/2009 | Han et al. |
| 2009/0092182 A1 | 4/2009 | Shin et al. |
| 2009/0110033 A1 | 4/2009 | Shattil |
| 2009/0112551 A1 | 4/2009 | Hollis |
| 2009/0147870 A1 | 6/2009 | Lin et al. |
| 2009/0156252 A1 | 6/2009 | Harris |
| 2009/0316643 A1 | 9/2009 | Yamada et al. |
| 2009/0274103 A1 | 11/2009 | Yang et al. |
| 2009/0304108 A1 | 12/2009 | Kwon et al. |
| 2010/0008432 A1 | 1/2010 | Kim et al. |
| 2010/0039928 A1 | 2/2010 | Noh et al. |
| 2010/0041350 A1 | 2/2010 | Zhang et al. |
| 2010/0056200 A1 | 3/2010 | Tolonen |
| 2010/0080112 A1 | 4/2010 | Bertrand et al. |
| 2010/0091919 A1 | 4/2010 | Xu et al. |
| 2010/0098042 A1 | 4/2010 | Dent |
| 2010/0110875 A1 | 5/2010 | No et al. |
| 2010/0165829 A1 | 7/2010 | Narasimha et al. |
| 2010/0184369 A1 | 7/2010 | Cho et al. |
| 2010/0185541 A1 | 7/2010 | Hassan et al. |
| 2010/0232525 A1 | 9/2010 | Xia et al. |
| 2010/0248739 A1 | 9/2010 | Westerberg et al. |
| 2010/0254484 A1 | 10/2010 | Hamaguchi et al. |
| 2010/0254497 A1 | 10/2010 | To et al. |
| 2010/0317343 A1 | 12/2010 | Krishnamurthy et al. |
| 2011/0041021 A1 | 2/2011 | Khoshnevis et al. |
| 2011/0058471 A1 | 3/2011 | Zhang |
| 2011/0064156 A1 | 3/2011 | Kim et al. |
| 2011/0096658 A1 | 4/2011 | Yang et al. |
| 2011/0105051 A1 | 5/2011 | Thomas et al. |
| 2011/0107174 A1 | 5/2011 | Liu et al. |
| 2011/0135016 A1 | 6/2011 | Ahn et al. |
| 2011/0206207 A1 | 8/2011 | Priotti |
| 2011/0228878 A1 | 9/2011 | Sorrentino |
| 2011/0281534 A1 | 11/2011 | Liao et al. |
| 2012/0014392 A1 | 1/2012 | Bhushan et al. |
| 2012/0057660 A1 | 3/2012 | Nguyen et al. |
| 2012/0087393 A1 | 4/2012 | Jeong et al. |
| 2012/0093200 A1 | 4/2012 | Kyeong |
| 2012/0113816 A1 | 5/2012 | Bhattad et al. |
| 2012/0177140 A1 | 7/2012 | Sahara |
| 2012/0188994 A1 | 7/2012 | Palanki et al. |
| 2012/0213054 A1 | 8/2012 | Hamaguchi et al. |
| 2012/0224517 A1 | 9/2012 | Yun et al. |
| 2012/0250740 A1 | 10/2012 | Ling |
| 2012/0252387 A1 | 10/2012 | Haskins et al. |
| 2012/0269285 A1 | 10/2012 | Jeong et al. |
| 2012/0294346 A1 | 11/2012 | Kolze |
| 2013/0058239 A1 | 3/2013 | Wang et al. |
| 2013/0058432 A1 | 3/2013 | Futatsugi et al. |

(56) References Cited

U.S. PATENT DOCUMENTS

| | | |
|---|---|---|
| 2013/0077508 A1 | 3/2013 | Axmon et al. |
| 2013/0142275 A1 | 6/2013 | Baik et al. |
| 2013/0198590 A1 | 8/2013 | Kim et al. |
| 2013/0223269 A1 | 8/2013 | To et al. |
| 2013/0315211 A1 | 11/2013 | Balan et al. |
| 2014/0064392 A1 | 3/2014 | Jonsson et al. |
| 2014/0086186 A1 | 3/2014 | Hamaguchi et al. |
| 2014/0198863 A1 | 7/2014 | Terry |
| 2014/0348253 A1 | 11/2014 | Mobasher et al. |
| 2015/0009971 A1 | 1/2015 | Han et al. |
| 2015/0103723 A1 | 4/2015 | Kim et al. |
| 2015/0117558 A1 | 4/2015 | Phillips |
| 2015/0124765 A1 | 5/2015 | Rong et al. |
| 2015/0195840 A1 | 7/2015 | Ahn et al. |
| 2015/0199963 A1 | 7/2015 | Maaninen |
| 2015/0227747 A1 | 8/2015 | Gassi |
| 2015/0234033 A1 | 8/2015 | Jamieson et al. |
| 2015/0271000 A1 | 9/2015 | Yang et al. |
| 2015/0304153 A1 | 10/2015 | Moffatt et al. |
| 2015/0358190 A1 | 12/2015 | Kruglick et al. |
| 2016/0006594 A1 | 1/2016 | Persson et al. |
| 2016/0050096 A1 | 2/2016 | DelMarco |
| 2016/0050099 A1 | 2/2016 | Siohan et al. |
| 2016/0197756 A1 | 7/2016 | Mestdagh et al. |
| 2016/0248443 A1 | 8/2016 | Murakami et al. |
| 2016/0254889 A1 | 9/2016 | Shattil |
| 2016/0269083 A1 | 9/2016 | Porat et al. |
| 2016/0344497 A1 | 11/2016 | Myung et al. |
| 2016/0353446 A1 | 12/2016 | Abdoli et al. |
| 2017/0019284 A1 | 1/2017 | Ankarali et al. |
| 2017/0026218 A1 | 1/2017 | Shattil |
| 2017/0054480 A1 | 2/2017 | Shattil |
| 2017/0126291 A1 | 5/2017 | Lea et al. |
| 2017/0126454 A1 | 5/2017 | Huan et al. |
| 2017/0126458 A1 | 5/2017 | Shattil |
| 2017/0134202 A1 | 5/2017 | Baligh et al. |
| 2017/0134235 A1 | 5/2017 | Wu et al. |
| 2017/0250848 A1 | 8/2017 | Lee et al. |
| 2017/0255593 A9 | 9/2017 | Agee |
| 2017/0264474 A1 | 9/2017 | He et al. |
| 2017/0279648 A1 | 9/2017 | Song et al. |
| 2017/0295000 A1 | 10/2017 | Yoo et al. |
| 2017/0353340 A1 | 12/2017 | Raphaeli et al. |
| 2018/0006692 A1 | 1/2018 | Noh et al. |
| 2018/0062904 A1 | 3/2018 | Hwang et al. |
| 2018/0075482 A1 | 3/2018 | Gierach |
| 2018/0091338 A1 | 3/2018 | Mayer et al. |
| 2018/0092086 A1 | 3/2018 | Nammi et al. |
| 2018/0109408 A1 | 4/2018 | Sandell et al. |
| 2018/0167244 A1 | 6/2018 | Cheng et al. |
| 2018/0191543 A1 | 7/2018 | Park et al. |
| 2018/0212810 A1 | 7/2018 | Park et al. |
| 2018/0219590 A1 | 8/2018 | Matsuda et al. |
| 2018/0262253 A1 | 9/2018 | Rahman et al. |
| 2018/0278303 A1 | 9/2018 | Hong et al. |
| 2018/0288809 A1 | 10/2018 | Delfeld et al. |
| 2018/0309599 A1 | 10/2018 | Lee |
| 2019/0036657 A1 | 1/2019 | Zhao et al. |
| 2019/0181928 A1 | 6/2019 | Pan et al. |
| 2019/0393948 A1 | 9/2019 | Zhao et al. |

FOREIGN PATENT DOCUMENTS

| | | |
|---|---|---|
| EP | 2763321 A1 | 8/2014 |
| JP | H08331093 | 12/1996 |
| JP | 2012-100323 | 5/2012 |
| KR | 10-2010-0019974 | 2/2010 |
| KR | 10-20090033703 | 8/2011 |
| WO | WO/2001/054303 | 7/2001 |
| WO | WO/2001/054303 | 4/2002 |
| WO | 0237771 | 5/2002 |

OTHER PUBLICATIONS

N. Jacklin, et al.; "A Linear Programming Based Tone Injection Algorithm for PAPR Reduction of OFDM and Linearly Precoded Systems", IEEE Trans. on Circuits and Systems—I: Regular Papers, vol. 60, No. 7, pp. 1937-1945, Jul. 2013.

T. Dias, R.C. de Lamare; "Study of Unique-Word Based GFDM Transmission Systems"; https://arxiv.org/pdf/1805.10702.pdf, May 27, 2018.

R. Ferdian, et al.; "Efficient Equalization Hardware Architecture for SC-FDMA Systems without Cyclic Prefix"; 2012 International Symposium on Communications and Information Technologies (ISCIT): pp. 936-941, Oct. 2012.

M. Au, et al.; "Joint Code-Frequency Index Modulation for IoT and Multi-User Communications"; IEEE Journal of Selected Topics in Signal Processing (vol. 13, Issue: 6, Oct. 2019).

I.M. Hussain; "Low Complexity Partial SLM Technique for PAPR Reduction in OFDM Transmitters"; Int. J. on Electrical Engineering and Informatics, vol. 5, No. 1, Mar. 2013.

Z. Wang, et al.; "Linearly Precoded or Coded OFDM against Wireless Channel Fades?"; Third IEEE Signal Processing Workshop on Signal Processing Advances in Wireless Communications, Taoyuan, Taiwan, Mar. 20-23, 2001.

B.E. Priyanto, et al.; "Initial Performance Evaluation of DFT-Spread OFDM Based SC-FDMA for UTRA LTE Uplink;" 2007 IEEE 65th Vehicular Technology Conference—VTC2007-Spring; May 29, 2007.

H. Wu, et al., "Sum rate analysis of SDMA transmission in single carrier FDMA system"; Communication Systems, 2008. ICCS 2008. 11th IEEE Singapore International Conference; Dec. 2008.

R. Stirling-Gallacher; "Multi-Carrier Code Division Multiple Access," Ph. D. Thesis, University of Edinburgh; Aug. 1997.

T. Ginige, et al.; "Dynamic Spreading Code Selection Method for PAPR Reduction in OFDM-CDMA Systems With 4-QAM Modulation"; IEEE Communications Letters, vol. 5, No. 10; Oct. 2001.

D.A. Wiegandt, C.R. Nassar; "Higher-Speed, Higher-Performance 802.11a Wireless LAN via Carrier-Interferometry Orthogonal Frequency Division Multiplexing"; 2002 IEEE International Conference on Communications. Conference Proceedings. ICC 2002 (Cat. No. 02CH37333). Apr. 28-May 2, 2002.

Z. Wu, et al.; "High-Performance 64-QAM OFDM via Carrier Interferometry Spreading Codes"; 2003 IEEE 58th Vehicular Technology Conference. VTC 2003-Fall (IEEE Cat. No. 03CH37484). Oct. 6-9, 2003.

B.Natarajan, C.R. Nassar and S.Shattil; "High-Throughput High-Performance TDMA Through Pseudo-Orthogonal Carrier Interferometry Pulse Shaping"; IEEE Transactions on Wireless Communications, vol. 3, No. 3, May 2004.

B.Natarajan, C.R. Nassar; "Introducing Novel FDD and FDM in MC-CDMA to Enhance Performance"; RAWCON 2000. 2000 IEEE Radio and Wireless Conference (Cat. No. 00EX404). Sep. 13-13, 2000.

B.Natarajan, Z Wu, C.R. Nassar and S.Shattil; "Large Set of CI Spreading Codes for High-Capacity MC-CDMA"; IEEE Transactions on Communications, vol. 52, No. 11, Nov. 2004.

B.Natarajan, C.R. Nassar, Z Wu; "Multi-carrier platform for wireless communications. Part 1: High-performance, high-throughput TDMA and DS-CDMA via multi-carrier implementations"; Wireless Communications and Mobile Computing; Wirel. Commun. Mob. Comput. 2002; 2:357-379 (DOI: 10.1002/wcm.51) Jun. 18, 2002.

S.A. Zekavat, C.R. Nassar and S.Shattil; "Merging Multicarrier CDMA and Oscillating-Beam Smart Antenna Arrays: Exploiting Directionality, Transmit Diversity, and Frequency Diversity"; IEEE Transactions on Communications, vol. 52, No. 1, pp. 110-119, Jan. 2004.

C.R. Nassar, B.Natarajan, Z. Wu, D. Wiegandt, and S.Shattil; Multi-Carrier Technologies for Wireless Communication; Kluwer Academic Publishers 2002.

B.Natarajan, C.R. Nassar, S. Shattil; "Novel Multi-Carrier Implementation of FSK for Bandwidth Efficient, High Performance Wireless Systems"; 2002 IEEE International Conference on Communications. Conference Proceedings. ICC 2002 (Cat. No. 02CH37333) Apr. 28-May 2, 2002.

(56) References Cited

OTHER PUBLICATIONS

D.A. Wiegandt, C.R. Nassar, Z. Wu; "Overcoming Peak-to-Average Power Ratio Issues in OFDM via Carrier-Interferometry Codes"; IEEE 54th Vehicular Technology Conference. VTC Fall 2001. Proceedings (Cat. No. 01CH37211), Oct. 7-11, 2001.
D.A. Wiegandt, C.R. Nassar; "Peak-to-Average Power Reduction in High-Performance, High-Throughput OFDM via Pseudo-Orthogonal Carrier-Interferometry Coding"; PACRIM. 2001 IEEE Pacific Rim Conference on, vol. 2, Feb. 2001.
X. Lin, et al.; "5G New Radio: Unveiling the Essentials of the Next Generation Wireless Access Technology"; IEEE Communications Standards Magazine ( vol. 3 , Issue: 3 , Sep. 2019 ) pp. 30-37. Dec. 6, 2019.
"D2.2 Architecture, system and interface definitions of a 5G for Remote Area network"; Project website: http://5g-range.eu; Version 1 date Apr. 26, 2018.
R. Rani, et al.; "Peak-to-Average Power Ratio Analysis of SCFDMA Signal by Hybrid Technique"; International Journal of Computer Applications (0975-8887) vol. 69—No. 15, May 2013.
H. Kim, et al.; "Multiple Access for 5G New Radio: Categorization, Evaluation, and Challenges"; arXiv:1703.09042 [cs.IT], Mar. 27, 2017.
A. Anand, et al.; "Joint Scheduling of URLLC and eMBB Traffic in 5G Wireless Networks"; IEEE Infocom 2018—IEEE Conference on Computer Communications; Apr. 16-19, 2018.
M. Bennis, et al.; "Ultra-Reliable and Low-Latency Wireless Communication: Tail, Risk and Scale"; Proceedings of the IEEE ( vol. 106 , Issue: 10 , Oct. 2018 ).
B.G. Agee; "Efficient Allocation of RF Transceiver Resources in Spatially Adaptable Communication Networks"; SDR Forum/MPRG Workshop on Advanced in Smart Antennas for Software Radios, At Virginia Polytechnic Institute, Blacksburg, VA.
C.A. Azurdia-Meza, et al.; "PAPR reduction in SC-FDMA by pulse shaping using parametric linear combination bulses"; IEEE Communications Letters, vol. 16, No. 12, Dec. 2012.
C.A. Azurdia-Meza, et al.; "PAPR Reduction in Single Carrier FDMA Uplink by Pulse Shaping Using a β-α Filter"; Wireless Pers Commun 71, 23-44 (2013). https://doi.org/10.1007/s11277-012-0794-0; Aug. 9, 2012.
A Hamed, et al.; "Bandwidth and Power efficiency analysis of fading communication link"; 2016 International Symposium on Performance Evaluation of Computer and Telecommunication Systems (SPECTS); Jul. 24-27, 2016.
Y. Akhtman, L Hanzo; "Power Versus Bandwidth Efficiency in Wireless Communications: from Economic Sustainability to Green Radio"; China Communications 7(2) • Apr. 2010.
L. Militano, et al.; "Device-to-Device Communications for 5G Internet of Things"; EAI Endorsed Transactions on Internet of Things; Ghent vol. 1, Iss. 1, (Oct. 2015).
M. Vergara, et al.; "Multicarrier Chip Pulse Shape Design With Low Papr"; 21st European Signal Processing Conference (EUSIPCO 2013); Sep. 9-13, 2013.
C. Liu, et al.; "Experimental demonstration of high spectral efficient 4×4 MIMO SCMA-OFDM/OQAM radio over multi-core fiber system"; Optics Express 18431, vol. 25, No. 15 | Jul. 24, 2017.
F. Wei, et al.; "Message-Passing Receiver Design for Joint Channel Estimation and Data Decoding in Uplink Grant-Free SCMA Systems"; IEEE Transactions on Communications, vol. 18 , Issue: 1 , Jan. 2019: Nov. 6, 2018.
H. Jiang, et al.; "Distributed Layered Grant-Free Non-Orthogonal Multiple Access for Massive MTC"; 2018 IEEE 29th Annual International Symposium on Personal, Indoor and Mobile Radio Communications (PIMRC); Sep. 9-12, 2018.
S. Sengar, P.B. Bhattacharya; "Performance Improvement in OFDM System by PAPR Reduction Using Pulse Shaping Technique"; International Journal of Emerging Technology and Advanced Engineering, vol. 2, Issue 12, Dec. 2012.
B.H. Alhassoun; "Peak-To-Average-Power-Ratio (PAPR) Reduction Techniques For Orthogonal-Frequency-Division-Multiplexing (OFDM) Transmission"; Thesis, University of Denver, Jun. 1, 2012.

A. Boonkajay, et al.; "Performance Evaluation of Low-PAPR Transmit Filter for Single-Carrier Transmission"; 2012 18th Asia-Pacific Conference on Communications (APCC); Oct. 15-17, 2012.
D. Das; "Peak to Average Power Ratio Reduction in OFDM Using Pulse Shaping Technique"; Computer Engineering and Applications vol. 5, No. 2, ISSN: 2252-5459 (Online) Jun. 2016.
D. Wulich, et al.; "Peak to Average Power Ratio in Digital Communications"; https://www.academia.edu/6222108/Peak_to_Average_Power_Ratio_in_Digital_Communications 2005.
S. Singh, et al.; "Analysis of Roll-Off-Factor to Reduce the Papr in SC-FDMA System"; International Journal of Computational Intelligence Techniques, ISSN: 0976-0466 & E-ISSN: 0976-0474, vol. 3, Issue 2, 2012, pp. 76-78.
M. Mahlouji, T. Mahmoodi; "Analysis of Uplink Scheduling for Haptic Communications"; arXiv:1809.09837 [cs.NI], Sep. 26, 2018.
K. Au, et al.; "Uplink Contention Based SCMA for 5G Radio Access"; 2014 IEEE Globecom Workshops (GC Wkshps), Dec. 8-12, 2014.
S. Shah, A.R. Patel; "LTE-Single Carrier Frequency Division Multiple Access"; Jan. 1, 2010.
S.L. Ariyavisitakul, et al.; "Frequency Domain Equalization for Single-Carrier Broadband Wireless Systems"; IEEE Communications Magazine ( vol. 40 , Issue: 4 , Apr. 2002 ); pp. 58-66, Aug. 7, 2002.
A. Agarwal and P. R. Kumar, "Improved capacity bounds for wireless networks." Wireless Communications and Mobile Computing, vol. 4, pp. 251-261, 2004.
J.F. Cardoso, A. Souloumiac, "Blind Beamforming for non-Gaussian Signals," IEEE-Proceedings-F, vol. 140, No. 6, pp. 362-370, Dec. 1993.
D. Galda; H. Rohling, "A low complexity transmitter structure for OFDM-FDMA uplink systems", IEEE 55th Vehicular Technology Conference. VTC Spring 2002, May 6-9, 2002.
P. Gupta and P. R. Kumar, "The Capacity of Wireless Networks," IEEE Trans. Info. Theory, vol. IT-46, No. 2, Mar. 2000, pp. 388-404.
T. Kailath, Linear Systems, Prentice-Hall, Inc., 1980.
T. May; H. Rohling, "Reducing the peak-to-average power ratio in OFDM radio transmission systems", VTC '98. 48th IEEE Vehicular Technology Conference. May 21-21, 1998.
J.D. Schaffer, "Multiple objective optimization with vector evaluated genetic algorithms," Proceedings of 1st International Conference on Genetic Algorithms, 1991, pp. 93-100.
Z. Wu, C.R. Nassar, "Combined Directionality and Transmit Diversity via Smart Antenna Spatial Sweeping," RAWCON 2000, IEEE Radio and Wireless Conference 2000, p. 103-106. Sep. 13, 2000.
S.A. Zekavat; C.R. Nassar; S. Shattil, "Combining multi-input single-output systems and multi-carrier systems: achieving transmit diversity, frequency diversity and directionality", Vehicular Technology Conference. IEEE 55th Vehicular Technology Conference. VTC Spring 2002, May 6-9, 2002.
S.A. Zekavat, C. R. Nassar and S. Shattil, "Smart antenna spatial sweeping for combined directionality and transmit diversity," Journal of Communications and Networks (JCN), Special Issue on Adaptive Antennas for Wireless Communications, vol. 2, No. 4, pp. 325-330, Dec. 2000.
E. Zitzler and L. Thiele, "Multiobjective evolutionary algorithms: A comparative case study and the strength pareto approach," IEEE Tran. on Evol. Comput., vol. 3, No. 4, Nov. 1999, pp. 257-271.
D. Gerakoulis and E. Geraniotis, CDMA: Access and Switching for Terrestrial and Satellite Networks, John Wiley & Sons, LTD, 2001.
ITU-T, Asymmetric Digital Subscriber Line (ADSL) Transceivers, G.992.1, Jun. 1999.
H. Prakash, C.D.Suriyakala; "PAPR Reduction in MIMO SC-FDMA—A Survey"; Int. J Rec. Adv. Sci. Tech., 2015; 2(2):11-19.
Hajlaoui, M. Abdellaoui; "SOCP Approach for Reducing PAPR for MIMO-OFDM Via Tone Reservation"; International Journal of Distributed and Parallel Systems (IJDPS) vol. 2, No. 3, May 2011.
J. Shin, B. Seo; "PAPR Reduction Scheme for MISO and MIMO OFDM Systems with Limited Feedback"; WSEAS Transactions on Communications 13:355-362 • Jan. 2014.
D. Sinanovic, et al.; "Low PAPR Spatial Modulation for SC-FDMA"; IEEE Transactions on Vehicular Technology; vol. 66, Issue: 1, Jan. 2017.

(56) References Cited

OTHER PUBLICATIONS

G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.
M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.
M. Vu, A. Paulraj; "MIMO Wireless Linear Precoding"; IEEE Signal Processing Magazine. Submitted Feb. 2006, revised Nov. 2006 and Dec. 2006.
H.G. Myung, et al.; "Peak Power Characteristics of Single Carrier FDMA MIMO Precoding System"; 2007 IEEE 66th Vehicular Technology Conference, Sep. 30-Oct. 3, 2007.
B. Naik, et al.; "Reduction of PAPR in MIMO-OFDM/A System Using Polyphase Complementary Modulation", International Journal of Innovative Research in Computer and Communication Engineering; vol. 2, Issue 5, May 2014.
A.S. Parihar, A. Rai; "A Review: PAPR Reduction Techniques in MIMO OFDM System"; International Journal of Engineering and Innovative Technology (IJEIT); vol. 4, Issue 12, Jun. 2015.
B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).
C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.
K Mhatre, U.P. Khot; "Efficient Selective Mapping PAPR Reduction Technique"; International Conference on Advanced Computing Technologies and Applications (ICACTA-2015); Procedia Computer Science 45 ( 2015 ) 620-627.
K. Srinivasarao, et al.; "Peak-to-Average Power Reduction in MIMO OFDM Systems Using Sub-Optimal Algorithm"; International Journal of Distributed and Parallel Systems (IJDPS) vol. 3, No. 3, May 2012.
K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.
H. Zhang, D.L. Goeckel; "Peak Power Reduction in Closed-Loop MIMO-OFDM Systems via Mode Reservation"; Communications Letters, vol. 11, No. 7, Jul. 2007.
C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.
P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.
H-B Jeon, et al.; "Bit-Based SLM Schemes for PAPR Reduction in QAM Modulated OFDM Signals"; IEEE Transactions on Broadcasting, vol. 55, No. 3, Sep. 2009.
H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.
S-J Heo, et al.; "A Modified SLM Scheme With Low Complexity for PAPR Reduction of OFDM Systems"; IEEE Transactions on Broadcasting, vol. 53, No. 4, Dec. 2007.
M.I. Abdullah, et al.; "Comparative Study of PAPR Reduction Techniques in OFDM"; ARPN Journal of Systems and Software; vol. 1, No. 8, Nov. 2011.
E. Abdullah, et al.; "Modified selective mapping scheme with low complexity for minimizing high peak average power ratio in orthogonal frequency division multiplexing system"; AIP Conference Proceedings 1774, 050005 (2016).
S.T. O'Hara, J.R. Periard; "Orthogonal-Coded Selective Mapping (OCSM) for OFDM Peakto-Average Power Reduction Without Side Information"; Proceeding of the SDR 04 Technical Conference and Product Exposition 2004, Syracuse, NY, Technology Center—Syracuse Research Corporation. 2004.
P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.
D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.
B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.
C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.
C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.
B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.
Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.
S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.
B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.
Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.
B. Natarajan, C.R. Nassar, S. Shattil; "Innovative pulse shaping for high-performance wireless TDMA," Communications Letters, IEEE vol. 5, Issue 9, Sep. 2001 pp. 372-374.
B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.
V.Thippavajjula, B.Natarajan; "Parallel Interference Cancellation Techniques for Synchronous Carrier Interferometry/MC-CDMA Uplink"; IEEE 60th Vehicular Technology Conference, 2004. VTC2004-Fall. Sep. 26-29, 2004.
A. Serener, et al.; "Performance of Spread OFDM with LDPC Coding in Outdoor Environments"; 2003 IEEE 58th Vehicular Technology Conference. VTC 2003-Fall (IEEE Cat. No. 03CH37484), Oct. 6-9, 2003.
LTE: Evolved Universal Terrestrial Radio Access (E-UTRA); Multiplexing and channel coding (3GPP TS 36.212 version 8.8.0 Release 8), Jan. 2010.
LTE: Evolved Universal Terrestrial Radio Access (E-UTRA); Physical channels and modulation (3GPP TS 36.211 version 8.7.0 Release 8), Jun. 2009.
B.Natarajan, C.R. Nassar and S.Shattil; "CI/FSK: Bandwidth-Efficient Multicarrier FSK for High Performance, High Throughput, and Enhanced Applicability"; IEEE Transactions on Communications, vol. 52, No. 3, Mar. 2004.
G. Wunder, K.G. Paterson; "Crest-Factor Analysis of Carrier Interferometry MC-CDMA and OFDM systems"; International Symposium onInformation Theory, 2004. ISIT 2004. Proceedings. Jun. 27-Jul. 2, 2004.

(56) References Cited

OTHER PUBLICATIONS

B.Natarajan, C.R. Nassar "Crest Factor Reduction in MC-CDMA Employing Carrier Interferometry Codes"; EURSAP Journal on Wireless Comm. and Networking 2004:2, 374-379.

A.J. Best, B.Natarajan; "The Effect of Jamming on the Performance of Carrier Interferometry/OFDM"; WiMob'2005), IEEE International Conference on Wireless and Mobile Computing, Networking and Communications, 2005. Aug. 24-22, 2005.

S. Hijazi, et al.; "Enabling FCC's Proposed Spectral Policy via Carrier Interferometry"; 2004 IEEE Wireless Communications and Networking Conference (IEEE Cat. No. 04TH8733). Mar. 21-25, 2004.

Z. Wu, et al.; "FD-MC-CDMA: A Frequency-based Multiple Access Architecture for High Performance Wireless Communication"; Proceedings RAWCON 2001. 2001 IEEE Radio and Wireless Conference (Cat.No. 01EX514). Aug. 19-22, 2001.

P. Barbosa, et al.; "High-Performance MIMO-OFDM via Carrier Interferometry"; GLOBECOM '03. IEEE Global Telecommunications Conference (IEEE Cat. No. 03CH37489). Dec. 1-5, 2003.

D.A. Wiegandt, C.R. Nassar; "High-Throughput, High-Performance OFDM via Pseudo-Orthogonal Carrier Interferometry"; 12th IEEE International Symposium on Personal, Indoor and Mobile Radio Communications. PIMRC 2001. Proceedings (Cat. No. 01TH8598) Oct. 3-Sep. 30, 2001.

D.A. Wiegandt, C.R. Nassar; "High-Throughput, High-Performance OFDM via Pseudo-Orthogonal Carrier Interferometry Type 2"; The 5th International Symposium on Wireless Personal Multimedia Communications. Oct. 27-30, 2002.

D.A. Wiegandt, C.R. Nassar; "High-Throughput, High-Performance OFDM via Pseudo-Orthogonal Carrier Interferometry Spreading Codes"; IEEE Transactions on Communications, vol. 51, No. 7, pp. 1123-1134. Jul. 2003.

"Defendant Asustek Computer Inc.'s Answer to First Amended Complaint"; U.S. District Court for the Eastern District of Texas, Civil Action No. 2:22-CV-00066; Document 30, Filed Mar. 7, 2023.

B. Weinstein, P. Ebert; "Data Transmission by Frequency-Division Multiplexing Using the Discrete Fourier Transform"; IEEE Transactions on Communications; Oct. 1971.

A. Czylwik. "Comparison Between Adaptive OFDM and Single Carrier Modulation with Frequency Domain Equalization"; 1997 IEEE 47th Vehicular Technology Conference. Technology in Motion; May 4-7, 1997.

Intel Corporation; "Numerology for New Radio Interface" (R1-162386); 3GPP TSG RAN WG1 Meeting #84bis; Busan, Korea Apr. 11-15, 2016.

Qualcomm Incorporated; "Numerology requirements" (R1-162204); 3GPP TSG RAN WG1 Meeting #84bis; Busan, Korea, Apr. 11-15, 2016.

J. Zyren; "Overview of the 3GPP Long Term Evolution Physical Layer"; Document No. 3GPPEVOLUTIONWP; Jul. 2007. https://pdf4pro.com/view/overview-of-the-3gpp-long-term-evolution-physical-layer-7a50af.html.

Ixia; "SC-FDMA Single Carrier FDMA in LTE"; 915-2725-01 Rev A Nov. 2009. https://support.ixiacom.com/sites/default/files/resources/whitepaper/sc-fdma-indd.pdf.

Telesystem Innovations; "LTE in a Nutshell: The Physical Layer"; 2010. https://pdf4pro.com/view/lte-in-a-nutshell-mywww-zhaw-4c4210.html.

ETSI TS 136 211 V8.7.0 (Jun. 2009); "Evolved Universal Terrestrial Radio Access (E-UTRA); Physical Channels and Modulation" (3GPP TS 36.211 version 8.7.0 Release 8).

ETSI TS 138 211 V15.2.0 (Jul. 2018); "5G; NR; Physical channels and modulation"; (3GPP TS 38.211 version 15.2.0 Release 15).

ETSI TS 136 211 V15.2.0 (Oct. 2018); "LTE; Evolved Universal Terrestrial Radio Access (E-UTRA); Physical Channels and Modulation" (3GPP TS 36.211 version 15.2.0 Release 15).

ShareTechnote; "5G/NR—PHY Candidate"; https://www.sharetechnote.com/html/5G/5G_Phy_Candidate_DFTsOFDM.html.

EventHelix; "5G physical layer specifications"; Dec. 25, 2017; https://medium.com/5g-nr/5g-physical-layer-specifications-e025f8654981.

ETSI TR 121 905 V8.6.0 (Oct. 2008); "Digital cellular telecommunications system (Phase 2+); Universal Mobile Telecommunications System (UMTS); Vocabulary for 3GPP Specifications"; (3GPP TR 21.905 version 8.6.0 Release 8).

ETSI TS 136 211 V8.4.0 (Nov. 2008); "LTE; Evolved Universal Terrestrial Radio Access (E-UTRA); Physical channels and modulation"; (3GPP TS 36.211 version 8.4.0 Release 8).

Asustek Computer Inc. "Defendant's Preliminary Invalidity Contentions Pursuant to Local Patent Rules 3-3 and 3-4"; U.S. District Court for the Eastern District of Texas, Civil No. 2:22-CV-00066-RWS-RSP [Lead]; Civil No. 2:22-CV-00099-RWS-RSP; Filed Jul. 13, 2023.

Z. Wang, et al.; "Wireless multicarrier communications"; IEEE Signal Processing Magazine ( vol. 17, Issue: 3, May 2000).

\* cited by examiner $f_{n-1} : f_n$ $f_{n+1} : f_n$ $f_{n-1} : f_n$

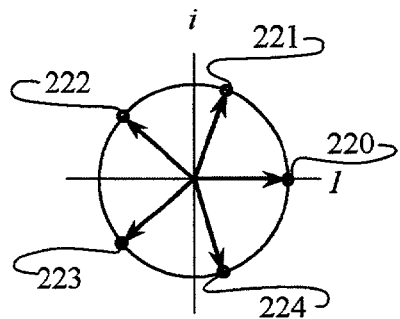
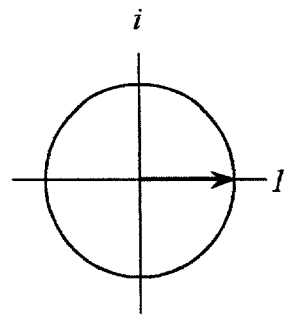

|  | C(1) C(1)* | C(2) C(2)* | C(3) C(3)* | C(4) C(4)* | C(5) C(5)* | C(6) C(6)* | C(7) C(7)* | C(8) C(8)* |
|---|---|---|---|---|---|---|---|---|
| CI(1)   | 0 | 8 | 0 | 0 | 0 | 0 | 0 | 0 | 4-4i | 0 | 0 | 4+4i | 0 | 0 | 0 | 0 |
| CI(1)*  | 8 | 0 | 0 | 0 | 0 | 0 | 0 | 0 | 0 | 4+4i | 4-4i | 0 | 0 | 0 | 0 | 0 |
| CI(2)   | 0 | 0 | 0 | 8 | 0 | 0 | 0 | 0 | 0 | 4-4i | 4+4i | 0 | 0 | 0 | 0 | 0 |
| CI(2)*  | 0 | 0 | 8 | 0 | 0 | 0 | 0 | 0 | 4+4i | 0 | 0 | 4-4i | 0 | 0 | 0 | 0 |
| CI(3)   | 0 | 0 | 0 | 0 | 0 | 8 | 0 | 4-4i | 0 | 0 | 0 | 0 | 4+4i | 0 | 0 | 0 |
| CI(3)*  | 0 | 0 | 0 | 0 | 8 | 0 | 4+4i | 0 | 0 | 0 | 0 | 0 | 0 | 4-4i | 0 | 0 |
| CI(4)   | 0 | 0 | 0 | 0 | 0 | 4+4i | 0 | 8 | 0 | 0 | 0 | 0 | 0 | 4-4i | 0 | 0 |
| CI(4)*  | 0 | 0 | 0 | 0 | 4-4i | 0 | 8 | 0 | 0 | 0 | 0 | 0 | 0 | 0 | 0 | 4+4i |
| CI(5)   | 4-4i | 0 | 0 | 4+4i | 0 | 0 | 0 | 0 | 0 | 8 | 0 | 0 | 0 | 0 | 0 | 0 |
| CI(5)*  | 0 | 4+4i | 4-4i | 0 | 0 | 0 | 0 | 0 | 8 | 0 | 0 | 0 | 0 | 0 | 0 | 0 |
| CI(6)   | 0 | 4-4i | 4+4i | 0 | 0 | 0 | 0 | 0 | 0 | 0 | 0 | 8 | 0 | 0 | 0 | 0 |
| CI(6)*  | 4+4i | 0 | 0 | 4-4i | 0 | 0 | 0 | 0 | 0 | 0 | 8 | 0 | 0 | 0 | 0 | 0 |
| CI(7)   | 0 | 0 | 0 | 0 | 4+4i | 0 | 0 | 0 | 0 | 0 | 0 | 0 | 0 | 8 | 0 | 4-4i |
| CI(7)*  | 0 | 0 | 0 | 0 | 0 | 4-4i | 0 | 0 | 0 | 0 | 0 | 0 | 8 | 0 | 4+4i | 0 |
| CI(8)   | 0 | 0 | 0 | 0 | 0 | 0 | 4-4i | 0 | 0 | 0 | 0 | 0 | 4+4i | 0 | 8 | 0 |
| CI(8)*  | 0 | 0 | 0 | 0 | 0 | 0 | 0 | 4+4i | 0 | 0 | 0 | 0 | 4-4i | 0 | 8 | 0 |

FIG. 5B

|  | $s_0()$ | $s_1() \overset{701}{\diagup}$ | $s_2()$ | $s_{N-1}()$ |
|---|---|---|---|---|
| $w_1 = \Sigma()$: | $e^{i2\pi(0)(0)/N}$ | $e^{i2\pi(1)(0)/N}$ | $e^{i2\pi(2)(0)/N}$ | $e^{i2\pi(N-1)(0)/N}$ |
| $w_2 = \Sigma()$: | $e^{i2\pi(0)(1)/N}$ | $e^{i2\pi(1)(1)/N}$ | $e^{i2\pi(2)(1)/N}$ | $e^{i2\pi(N-1)(1)/N}$ |
| $w_3 = \Sigma()$: | $e^{i2\pi(0)(2)/N}$ | $e^{i2\pi(1)(2)/N}$ | $e^{i2\pi(2)(2)/N}$ | $e^{i2\pi(N-1)(2)/N}$ |
|  |  |  |  | 703 |
| $w_N = \Sigma()$: | $e^{i2\pi(0)(N-1)/N}$ | $e^{i2\pi(1)(N-1)/N}$ | $e^{i2\pi(2)(N-1)/N}$ | $e^{i2\pi(N-1)(N-1)/N}$ |

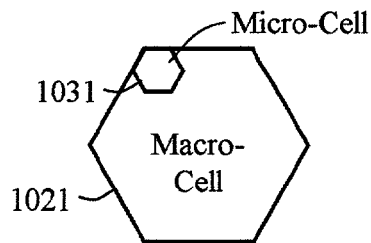
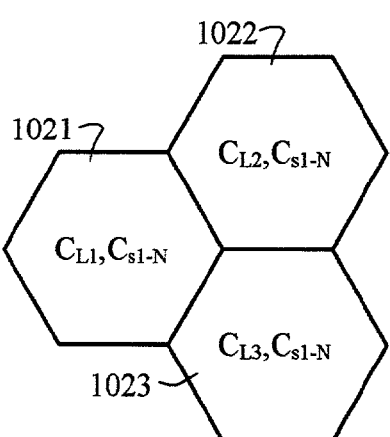
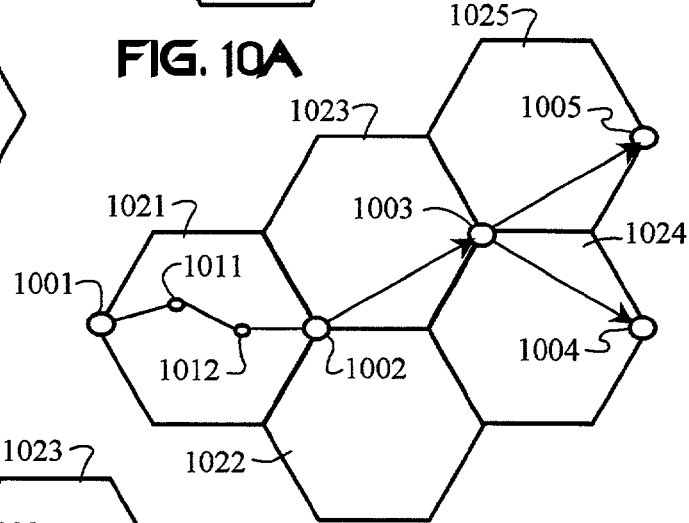
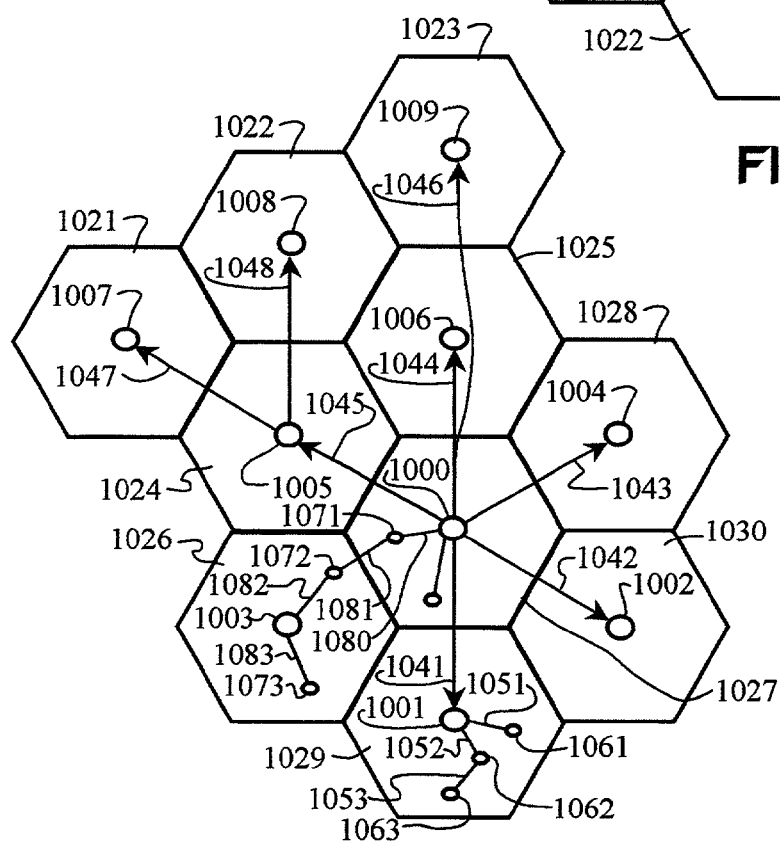
FIG. 10A
FIG. 10B
FIG. 10C
FIG. 10D

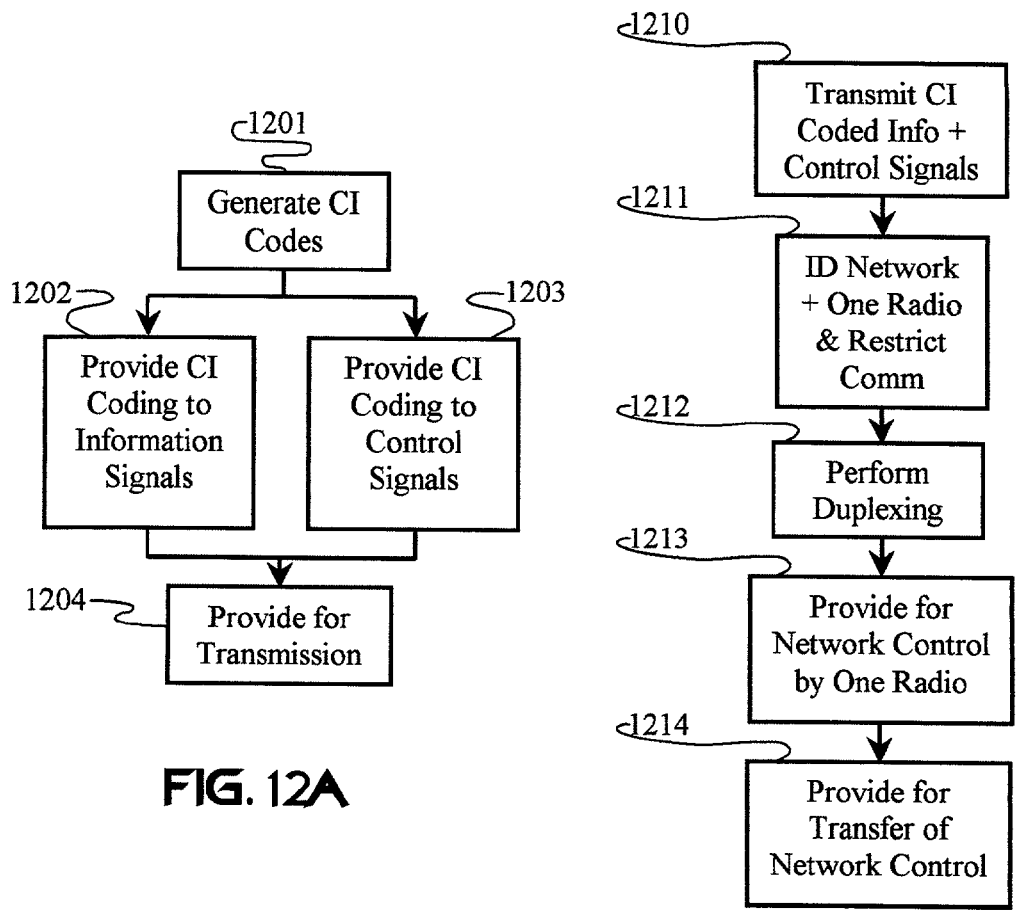
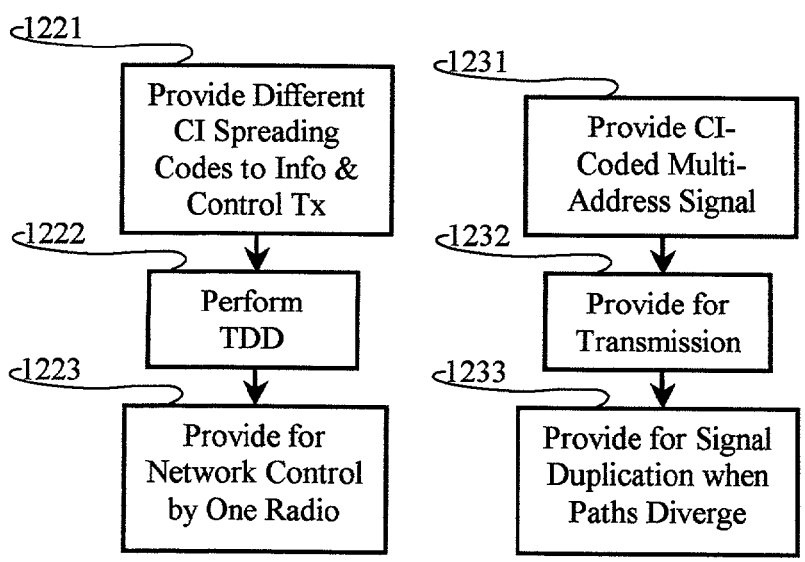
FIG. 12A
FIG. 12B
FIG. 12C
FIG. 12D

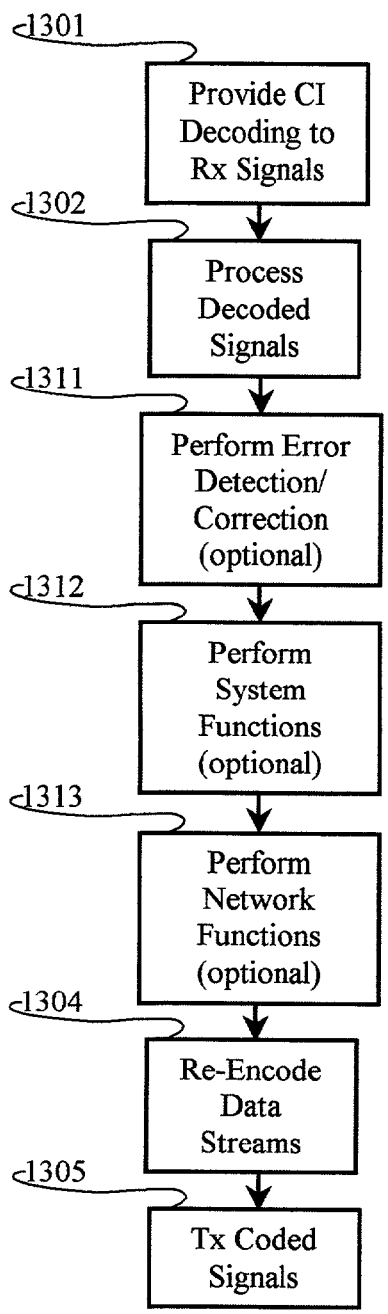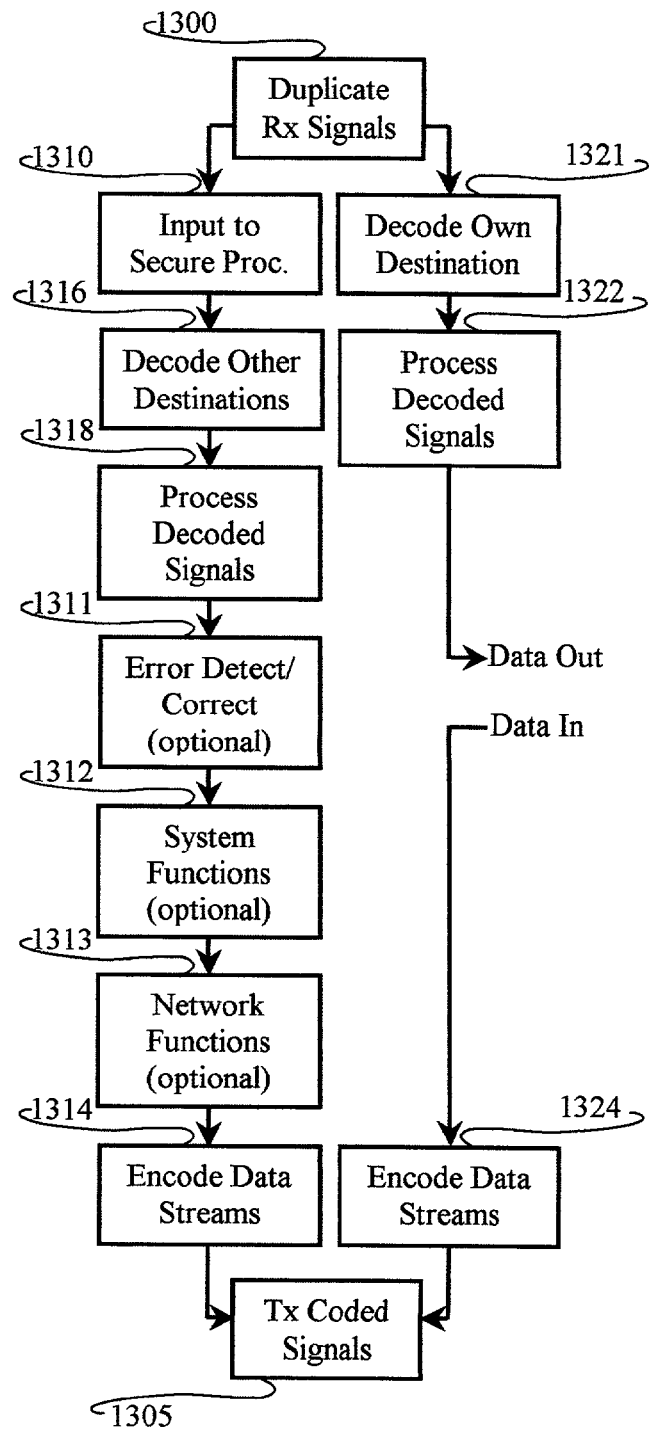
FIG. 13C
FIG. 13D

SINGLE CARRIER FREQUENCY DIVISION MULTIPLE ACCESS BASEBAND SIGNAL GENERATION

CROSS REFERENCE TO RELATED APPLICATIONS

This application is a Continuation of U.S. patent application Ser. No. 14/727,769, entitled "Cooperative Wireless Networks," filed Jun. 1, 2015, which is a Continuation of U.S. patent application Ser. No. 14/276,309, entitled "Cooperative Wireless Networks," filed May 13, 2014, now U.S. Pat. No. 9,048,897, which is a Continuation of U.S. patent application Ser. No. 12/545,572, entitled "Cooperative Wireless Networks," filed Aug. 21, 2009, now U.S. Pat. No. 8,750,264, which is a Divisional of U.S. patent application Ser. No. 11/187,107, entitled "Cooperative Beam-Forming in Wireless Networks," filed on Jul. 22, 2005, now U.S. Pat. No. 8,670,390, which claims priority to Provisional Appl. No. 60/598,187, filed Aug. 2, 2004, all of which are incorporated by reference in their entireties.

BACKGROUND OF THE INVENTION

I. Field of the Invention

The present invention relates to networks of wireless transceivers that implement Carrier Interferometry (CI) and/or CI-based coding.

II. Description of the Related Art

A wideband signal, such as a direct-sequence CDMA (DS-CDMA) signal, transmitted in a multipath environment experiences a frequency-selective fade. If the duration of the data bits is smaller than the multipath delay, the received signal experiences inter-symbol interference resulting from delayed replicas of earlier bits arriving at the receiver.

Improved DS-CDMA systems use interference cancellation to increase capacity; however, the required signal-processing effort is proportional to at least the cube of the bandwidth. Furthermore, DS-CDMA is susceptible to near-far interference, and its long pseudo-noise (PN) codes require long acquisition times. For these reasons, Orthogonal Frequency Division Multiplexing (OFDM) has been merged with DS-CDMA.

In multicarrier CDMA (MC-CDMA), a spreading sequence is converted from serial to parallel. Each chip in the sequence modulates a different carrier frequency. Thus, the resulting signal has a PN-coded structure in the frequency domain, and the processing gain is equal to the number of carriers.

In multi-tone CDMA, or multicarrier DS-CDMA, the available spectrum is divided into a number of equal-width frequency bands used to transmit a narrowband direct-sequence waveform. In U.S. Pat. No. 5,504,775, binary CDMA code symbols are applied to individual carriers in an OFDM system. U.S. Pat. Nos. 5,521,937, 5,960,032, and 6,097,712 describe multicarrier DSSS systems having direct-sequence coding on each subcarrier.

U.S. Pat. No. 5,955,992, PCT Pat. Appl. No. PCT/US99/02838, and U.S. Pat. Pub. No. 2002034191 describe CI, which is a multicarrier protocol implemented with polyphase codes. These polyphase codes may be used for multiple access, spread spectrum, channel coding, or encryption, as described in U.S. Provisional Appl. 60/259,433, filed Dec. 31, 2000. Multiple carriers are redundantly modulated with data streams that are orthogonalized by virtue of different sets of phases encoding each data stream. Interferometry of the carriers provides the means to orthogonalize the data streams, whether the carriers are combined or processed separately. Weights applied to the carriers shape the carrier superpositions, thus, allowing CI signals to appear as single-carrier waveforms, such as Time Division Multiple Access (TDMA) or DS-CDMA signals.

Adaptive antenna arrays may be implemented with DS-CDMA communications to provide significant improvements in range extension, interference reduction, and system capacity. To identify a particular user, a DS-CDMA system demodulates Walsh codes after converting the received signal from analog radio frequency (RF) to digital. Therefore, an adaptive antenna array requires information about the user codes, or it needs to demodulate many different incoming RF signals to track mobile users. These methods are complex processes that are more difficult to implement than tracking users in non-CDMA systems. Furthermore, the wideband nature of DS-CDMA signals restricts the effectiveness of beam forming, interference nulling, spatial interferometry multiplexing, and other techniques employed by adaptive antenna arrays.

U.S. Patent Application entitled "CI Multiple Input, Multiple Output," filed on Nov. 22, 2000, describes applications of multiple-input, multiple-output processing (such as antenna-array processing) to CI signals. CI processing allows wideband single-carrier signals, such as DS-CDMA transmissions, to be processed as a plurality of narrowband components. This simplifies array processing by facilitating beam forming, null steering, space-frequency processing, as well as other adaptive array processing techniques.

U.S. Pat. No. 4,901,307 introduces the concept of marginal isolation, which is another method of exploiting spatial division multiplexing in communication networks. Since cellular implementations of DS-CDMA are typically interference limited, even small reductions in the overall power level of the system allow for increased system capacity.

Ad-hoc networks allow subscriber units to perform base station functions. This allows micro-cell subnetworks, which lowers overall system power levels and improves spectral efficiency. U.S. Pat. No. 5,943,322 describes an adaptable DS-CDMA network that uses a control-signal channel to assign base-station functions (e.g., power control and synchronization) to a subscriber unit. U.S. Pat. No. 6,233,248 provides for multi-address transmissions to be sent on common paths between nodes until the paths diverge. U.S. Pat. No. 5,422,952 allows signals for a particular user to be transmitted throughout the entire network. Different transmissions are provided with unique PN codes.

None of the prior-art references describe the use of CI, CI-based protocols, or CI coding in ad-hoc networks. Thus, none of the prior-art references can provide the improved bandwidth efficiency, enhanced power efficiency, increased range, increased throughput, and superior immunity to multipath, jamming, and co-channel interference enabled by the combination of CI and adaptable networks.

SUMMARY OF THE INVENTION

Applications of CI to ad-hoc networking provide substantial performance improvements that can be used for any combination of range extension, transmission-power reduction, increased throughput, and improved bit-error rates. Performance improvements resulting from frequency-domain processing are particularly useful in ad-hoc networks (as well as in micro-cell networks and networks that employ relays) where interference and multipath typically impede performance. CI pulse shaping also increases throughput (typically characterized as a doubling of throughput), which can be used to increase the number of users, generate higher data rates, and/or provide channel coding.

Adaptations of CI to conventional multicarrier protocols (such as OFDM and MC-CDMA) eliminate the high peak-to-average-power ratios (PAPR) associated with conventional multicarrier protocols. Low PAPR allows low-dynamic-range amplifiers to be used, resulting in substantial cost and power savings.

Conventional codes, such as multiple-access codes, channel codes, spreading codes, etc., may be implemented with CI chip shapes. Alternatively, polyphase codes based on mathematical relationships between CI sub-carriers may be provided.

Applications of CI coding are extended to identifying and addressing network transmissions. CI transceivers are adapted to perform network-control functions. CI coding facilitates routing in ad-hoc and peer-to-peer networks. Networks are adapted to perform array processing with signals received from, and transmitted by, groups of subscriber units. Other applications and embodiments of the invention are apparent from the description of preferred embodiments and the claims that follow.

BRIEF DESCRIPTION OF THE DRAWINGS

FIG. 4B shows samples distributed uniformly around a unit circle in the complex plane.

FIG. 4C is a normalized complex-plane representation of samples of a signal having a particular frequency collected at a sampling rate that equals, or is some sub-harmonic frequency of, the signal frequency. Each sample corresponds to an integer number of full rotations in the complex plane.

FIG. 5A shows a set of 16 octonary CI code vectors of length 8.

FIG. 5B shows correlations of the 16 octonary codes shown in FIG. 5A.

FIG. 10A illustrates a multi-level cellular architecture that may be employed by systems and methods of the present invention.

FIG. 10B illustrates three adjacent cells in a cellular network of the present invention.

FIG. 10C shows a cellular architecture of the present invention that includes a plurality of cells and a plurality of base stations located on cell boundaries.

FIG. 10D illustrates a cellular network of the invention including a plurality of cells, a plurality of base stations, and a plurality of subscriber units.

FIG. 12A illustrates a method for providing CI-coded transmissions of information and control signals.

FIG. 12B illustrates a method for managing network control in a CI network by one or more subscriber units adapted to function as base stations.

FIG. 12C illustrates a network-control method of the present invention.

FIG. 12D shows a routing method of the present invention.

FIG. 13C illustrates a transceiver processing and routing method of the invention.

FIG. 13D illustrates an alternative transceiver processing and routing method of the invention.

DESCRIPTION OF THE PREFERRED EMBODIMENTS

Figure 1A:
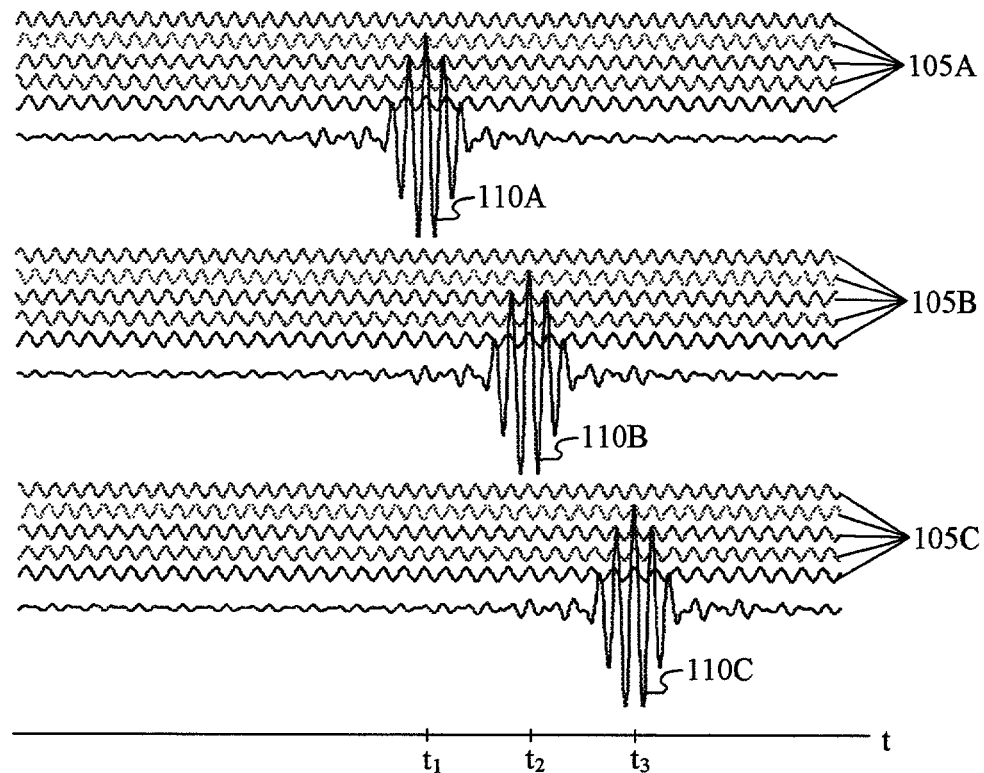
FIG. 1A illustrates a plurality of CI carriers having phase fronts that are aligned at a specific time. The CI carriers combine to generate a plurality of superposition signals that are orthogonal to each other in time.

The description of the preferred embodiments assumes that the reader has a familiarity with CI described in the following publications, which are incorporated by reference:
1. B. Natarajan, C. R. Nassar, S. Shattil, M. Michelini, "Application of interferometry to MC-CDMA", accepted for publication in IEEE Transactions on Vehicular Technology.
2. C. R Nassar, B. Natarajan, and S. Shattil, "Introduction of carrier interference to spread spectrum multiple access," IEEE Emerging Technologies Symposium, Dallas, Texas, 12-13 Apr. 1999.
3. B. Natarajan and C. R. Nassar, "Introducing novel FDD and FDM in MC-CDMA to enhance performance," IEEE Radio and Wireless Conference, Denver, CO, Sep. 10-13, 2000, pp. 29-32.
4. Z. Wu, C. R. Nassar, A. Alagar, and S. Shattil, "Wireless communication system architecture and physical layer design for airport surface management," 2000 IEEE Vehicular Technology Conference, Boston, MA, Sep. 24-28, 2000, pp. 1950-1955.
5. S. Shattil, A. Alagar, Z. Wu and C. R. Nassar, "Wireless communication system design for airport surface management—Part I: Airport ramp measurements at 5.8 GHz," 2000 IEEE International Conference on Communications, Jun. 18-22, 2000, New Orleans, pp. 1552-1556.
6. B. Natarajan, C. R. Nassar, and S. Shattil, "Carrier Interferometry TDMA for future generation wireless—Part I: Performance," accepted for publication in IEEE Communications Letters.
7. Z. Wu, C. R. Nassar, and S. Shattil, "Capacity enhanced DS-CDMA via carrier interferometry chip shaping," IEEE 3G Wireless Symposium, May 30-Jun. 2, 2001, San Francisco, CA.
8. Z. Wu, C. R. Nassar, and S. Shattil, "Frequency diversity performance enhancement in DS-CDMA via carrier interference pulse shaping," The 13th Annual International Conference on Wireless Communications, Calgary, Alberta, Canada, Jul. 7-10, 2001.
9. C. R. Nassar and Z. Wu, "High performance broadband DS-CDMA via carrier interferometry chip shaping," 2000 International Symposium on Advanced Radio Technologies, Boulder, CO, Sep. 6-8, 2000, proceeding available online at http://ntai.its.bldrdoc.gov/meetings/art/index.html.
10. Z. Wu and C. R. Nassar, "MMSE frequency combining for CI/DS-CDMA," IEEE Radio and Wireless Conference, Denver, CO, Sep. 10-13, 2000, pp. 103-106.
11. D. Wiegand, C. R. Nassar, and S. Shattil, "High Performance OFDM for next generation wireless via the application of carrier interferometry," IEEE 3G Wireless Symposium, May 30-Jun. 2, 2001, San Francisco, CA.
12. B. Natarajan, C. R. Nassar, and S. Shattil, "Exploiting frequency diversity in TDMA through carrier interferometry," Wireless 2000: The 12th Annual International Conference on Wireless Communications, Calgary, Alberta, Canada, Jul. 10-12, 2000, pp. 469-476.
13. B. Natarajan, C. R. Nassar, and S. Shattil, "Throughput enhancement in TDMA through carrier interferometry pulse shaping," 2000 IEEE Vehicular Technology Conference, Boston, MA, Sep. 24-28, 2000, pp. 1799-1803.
14. S. A. Zekevat, C. R. Nassar, and S. Shattil, "Smart antenna spatial sweeping for combined directionality and transmit diversity," accepted for publication in Journal of Communication Networks: Special Issue on Adaptive Antennas for Wireless Communications.
15. S. A. Zekevat, C. R. Nassar, and S. Shattil, "Combined directionality and transmit diversity via smart antenna spatial sweeping," 38th Annual Allerton Conference on Communications, Control, and Computing, Champaign-Urbana, Illinois, Oct. 4-6, 2000.
16. S. Shattil and C. R. Nassar, "Array Control Systems For Multicarrier Protocols Using a Frequency-Shifted Feedback Cavity" IEEE Radio and Wireless Conference, Denver, CO, Aug. 1-4, 1999.
17. C. R. Nassar, et. al., MultiCarrier Technologies for Next Generation Multiple Access, Kluwer Academic Publishers: 2001.

Applications of CI, array processing, spatial interferometry, and related systems and methods are cited in the following patents and patent applications, which are hereby incorporated by reference:
1. U.S. Pat. No. 5,955,992
2. U.S. Pat. No. 6,008,760
3. U.S. Pat. No. 6,211,671
4. U.S. Pat. No. 6,331,837
5. U.S. Pat. No. 6,348,791
6. PCT Appl. No. PCT/US99/02838
7. PCT Appl. No. PCT/US00/18113
8. U.S. patent application Ser. No. 09/347,182
9. U.S. patent application Ser. No. 09/472,300
10. U.S. patent application Ser. No. 09/433,196
11. U.S. patent application Ser. No. 09/393,431
12. U.S. patent application Ser. No. 09/718,851
13. U.S. patent application Ser. No. 09/703,202
14. U.S. patent application Ser. No. 10/034,386
15. U.S. patent application Ser. No. 10/078,774
16. U.S. patent application Ser. No. 10/131,163
17. U.S. Provisional Pat. Appl. No. 60/163,141
18. U.S. Provisional Pat. Appl. No. 60/219,482
19. U.S. provisional Pat. Appl. No. 60/259,433
20. U.S. provisional Pat. Appl. No. 60/286,850

1. Definitions

Various terms used in the descriptions of CI methods and systems are generally described in this section. The descriptions in this section are provided for illustrative purposes only, and are not limiting. The meaning of these terms will be apparent to persons skilled in the relevant art(s) based on the entirety of the teachings provided herein. These terms may be discussed throughout the specification and the cited references with additional detail.

An address, or network address, as used herein, describes any set of symbols used to identify a particular network node or transceiver. An address may include symbols in a header or other part of a data transmission. An address may correspond to a code used to encode a transmission. In some applications of the invention, an address may specify one or more routes through a network. For example, multiple addresses may indicate one or more preferred paths through the network. Alternatively, a message address may be constructed via some mathematical relationship of node addresses that indicate one or more paths to at least one destination node. In some aspects of the invention, the message address may be changed as the message propagates through the network.

The term carrier signal, or carrier, when used herein, refers to at least one electromagnetic wave having at least one characteristic that may be varied by modulation. Subcarriers may be referred to as carriers. Other wave phenomena, such as acoustic waves, may be used as carriers. Carrier signals may include any type of periodic signal. Carrier signals may include sinusoids, square waves, triangle waves, wavelets, and/or arbitrary waveforms. A carrier signal is capable of carrying information via modulation. A carrier signal may be modulated or unmodulated. Multicarrier signals may include multi-frequency signals, multi-spatial signals, multi-directional signals, multi-polarization signals, multiple coded signals, multiple sub-space signals, multi-phase-space signals, time-domain (discreet-time) signals, and/or any other set of electromagnetic signals having different orthogonal or quasi-orthogonal values of at least one diversity parameter. A code sequence can be regarded as a carrier signal. A subcarrier may include more than one signal and more than one type of signal.

Channel compensation describes signal processing performed on at least one transmitted and/or received signal according to measured and/or calculated channel fluctuations. Channel compensation may include any of various blind adaptive techniques. Alternatively, channel compensation may employ at least one pilot or training signal to probe the channel. Known signals can be used to compensate for various multipath effects (such as fading and/or inter-symbol interference), mitigate multi-user interference, and/or remove jamming signals. Channel compensation may employ a combination of adaptive and reference-signal processing. Channel compensation may include adaptive channel equalization. Channel compensation in a CI and/or antenna-array system may employ some type of combining.

Channel estimation describes any combination of blind adaptive techniques and reference-signal processing to determine signal distortion resulting from the effects of at least one communication channel. In one example, a pilot symbol is transmitted periodically from a remote transmitter. A local receiver exploits the known transmission time, frequency, polarization, and/or any other diversity-parameter value of at least one pilot symbol to process the transmitted pilot symbol and estimate the distortion caused by the channel environment. On the basis of an estimated value, distortion in the received data symbols is compensated. In some aspects of the invention, a pilot tone may be employed.

CI codes, as used herein, may include basic CI codes or advanced CI codes. CI codes are based on mathematical relationships between CI carriers and phase spaces. CI codes can be used as direct-sequence codes, multicarrier codes (e.g., MC-CDMA), etc. Applications of CI codes can be extended to any application of conventional binary direct sequences, including but not limited to, spread spectrum, multiple access, channel coding, encryption, anti-jamming, etc. CI codes may be applied across any set of orthogonal or quasi-orthogonal diversity-parameter values or subspaces. Although CI codes can be represented with respect to phase relationships generated by vector precession in the complex plane, the implementation of CI coding can be extended to circular, elliptical, and linear polarizations.

A coder, as used herein, describes any system, device, or algorithm adapted to generate spread-spectrum codes, multiple-access codes, channel codes, encryption codes, multi-level codes, compression codes, hybrid codes, and CI codes. A coder may interleave coded data symbols in one or more diversity-parameter spaces. The coder may provide channel coding to the data symbols. A CI coder, includes any algorithm, device, or system adapted to combine, merge, or otherwise impress at least one data symbol onto a plurality of CI code chips or carriers. The CI encoder may impress each CI code chip onto one or more diversity-parameter values prior to, or after, impressing data symbols onto the CI code. A CI code may be impressed onto at least one intermediate-frequency (IF) carrier. The CI encoder may perform multiplexing. For example, the CI encoder may encode data streams onto different CI codes. The CI encoder may employ other diversity parameters on which to multiplex multiple data streams.

A combiner, as used herein, describes any system, device, and/or algorithm adapted to combine a plurality of signals, samples, or symbol values. A combiner may combine multiple carriers or signal values to generate a superposition signal. A combiner may provide weights to carriers or signal values to generate one or more superposition signals having predetermined characteristics, such as time domain, frequency domain, spatial domain, sub-space domain, and/or other physical characteristics. A combiner may compensate for noise, interference, and/or distortion.

Combining often involves generating weights based on channel estimates. The weights may be adapted relative to some performance measurement, such as probability of error, bit-error rate (BER), signal-to-noise ratio (SNR), signal-to-noise-plus-interference ratio (SNIR), and/or any other signal-quality parameter. Possible combining techniques include equal-gain combining (EGC), orthogonal restoring combining (ORC), and minimum mean squared error combining (MMSEC). Performance measurements may include any combination of instantaneous and averaged performance measurements. Averaging may be performed over one or more diversity parameters.

A combiner may perform combining in more than one diversity-parameter space. For example, MMSE combining may be performed in the frequency domain to generate a plurality of combined signals that may be processed via EGC in the time domain. Other types of combining, as well as combining in different dimensions, may be performed. Combining may also be performed as a receive-side array-processing technique. Array processing (e.g., spatial combining) may be integrated into other combining operations, such as CI subcarrier combining.

A communication channel, as described herein, typically comprises an RF channel. A communication channel may include any propagation medium and/or path between at least one transmitter and at least one receiver. A communication channel may be natural and/or man-made, including, but not limited to, air, space, wire, cable, waveguide, microstrip, strip-line, optical fiber, and liquid.

A control channel is a communication channel in which control information is transmitted.

Control information, as used herein, includes any information used to set, monitor, identify, adapt, or change communications and/or transceiver operations in a network. Control information may be provided for power control, synchronization, routing, channel assignments, code assignments, addressing, identification, acknowledgment, transfer of network control, etc. Control information may include pilot signals, training symbols, addresses, tags, codes, parity symbols, reference (e.g., timing, phase, power, frequency) signals, and/or transceiver-control signals.

A decoder, as used herein, describes any system, device, or algorithm capable of decoding an encoded information (e.g., data) signal. A decoder typically decodes an encoded signal with respect to one or more reference signals (e.g., codes, decode sequences, code keys, etc.). Decoding may take the form of a correlation process, matched filtering, or any kind of processing (e.g., complementary processing) that extracts at least one desired information signal from the coded signal. In a preferred embodiment, collected samples are phase shifted with respect to at least one code prior to being summed. In some multicarrier systems, it is impractical to perform matched filtering or correlation. Rather, data symbols are obtained from the output bins of a Fourier transform process. Similarly, other types of transforms or inverse transforms may be performed in a decoder.

A destination node, as used herein, describes a network transceiver selected to receive at least one communication signal. A destination node may describe a local destination node within a particular network. Alternatively, a destination node may describe the final destination(s) of at least one particular transmission.

The term diversity-parameter, as used herein, describes at least one signal characteristic that enables a signal to be distinguished from another signal. Examples of diversity parameters include, but are not limited to, amplitude, spatial gain distribution, directionality, energy, power, linear polarization direction, circular/elliptical polarization direction, circular/elliptical polarization rotation rate, mode, frequency, time, code, phase, coherence length, and phase space. Diversity parameters may include proportions of two or more diversity-parameter values. Diversity parameters may include any combination of unique signal characteristics. Diversity parameters may include diversity-parameter subspaces, such as spatial sub-spaces. A common diversity parameter, as used herein, is a range of at least one diversity-parameter value into which electromagnetic signals may be mapped.

Duplexing, as used herein, describes any processing technique adapted to separate transmitted and received signals. Various multiple-access techniques may be adapted to perform duplexing. Time-division duplexing (TDD) may be provided with respect to orthogonal time-domain slots. In CI-based protocols, TDD may be provided with respect to time-domain characteristics of multicarrier superposition signals and/or time-offset coding applied to CI. Frequency-division duplexing (FDD) provides for separation of signals characterized by different frequency bands. The multicarrier structure of CI enables FDD. Even spread-spectrum protocols, such as DS-CDMA, may benefit from CI-enabled FDD without the reduced frequency-diversity benefits inherent in conventional FDD. Code division duplexing (CDD) may be provided.

CI phase-division duplexing (CI-PDD) describes the separation of multicarrier signals having different phase spaces. Transmitted and received CI signals may be separated due to the orthogonality (or quasi-orthogonality) of the phase spaces. One application of CI-PDD involves applying a matched filter to desired received components to remove the effects of transmitted signals (as well as undesired received signals). Cancellation may be used to electromagnetically isolate receivers from transmitters that use the same time and frequency bands for transmission. Some of these cancellation techniques are described in U.S. Pat. No. 6,348,791, which is incorporated by reference. Polarization division duplexing includes orthogonal polarization duplexing (OPDD) and quasi-orthogonal polarization duplexing (QPDD). OPDD is a well-known method of using orthogonal polarizations to double channel capacity. For example, linear polarized antennas may be oriented perpendicular to each other to provide isolation. OPDD involves using known ratios of co-channel interference to cancel the interfering signals. Circular polarization duplexing (CPD) may employ opposite polarization spins. CPD may employ orthogonal polarization frequencies. OPDD, QPDD, and CPD may employ three-dimensional (i.e., x-y-z axis) polarizations Coherence time division duplexing (CTDD) may be used to remove interfering signals having different time offsets. In CTDD, an information signal modulated onto a wideband signal is transmitted along with a decode signal. A predetermined time offset between the modulated and decode signals allows a receiver to extract the information signal without any knowledge of the wideband signal. In CI-based signals, a time offset corresponds to a vector of phase offsets corresponding to the CI sub-carriers. Wideband signals, such as additive white Gaussian noise, chaotic signals, pseudo-random signals, etc., may be provided (or closely approximated) by a predetermined weighted set of CI sub-carriers. Orthogonal CTDD pertains to time-offset differences between transmitted and received signals that exceed the inverse of the coherence bandwidth of the signals. Quasi-orthogonal CTDD occurs when the time-offset differences between desired receive signals and interfering transmissions do not exceed the inverse coherence bandwidth of the signals. This causes overlap interference in the matched-filter output. The overlap interference may be removed via cancellation.

An information signal, as used herein, describes one or more signals that convey some form of useful information via magnitude, phase, frequency, polarization, mode, direction, and/or some signal property derived therefrom. CI-based information signals may include any type of communication signal, such as, but not limited to, voice, data, and text. Information signals may include any of various types of remote-sensing signals, such as radar signals, Lidar signals, spectroscopy signals of various types (e.g., absorption, scatter, luminescence, resonant, emission, harmonic, intermodulation, etc.), probing signals, and imaging signals (e.g., X-ray, gamma-ray, ultrasound, seismic survey, acoustic, sonar, optical, pulse radio, spread spectrum, etc.). Any information signal may be considered to be a CI-based signal if it is processed via CI signal-processing techniques. Thus, a received non-CI signal may be converted into a CI signal by decomposing the received signal into orthogonal sub-carrier components.

The term modulation, as used herein, refers to any method of impressing a signal (such as an information signal, a code signal, and/or a sub-carrier) onto an electromagnetic signal. Modulation describes the adjustment of one or more physical signal characteristics with respect to an information signal. Modulation may be combined with spreading. Signals, such as analog and/or digital information signals, may be impressed onto one or more carrier signals via any combination of modulation techniques, including, but not limited to, amplitude modulation, phase modulation, frequency modulation, pulse modulation, and/or polarization modulation. Pulse modulation (such as CI-pulse modulation) may include Pulse-Amplitude Modulation (PAM), pulse-code modulation, pulse-frequency modulation, pulse-position modulation, and/or pulse-width modulation.

CI signal generation sometimes includes modulation, PAM, Frequency Shift Keying (FSK), Phase Shift Keying (PSK), and Quadrature Amplitude Modulation (QAM). Coded modulation, such as trellis-code modulation, may be performed. Data symbols may be modulated onto a code sequence, such as a multiple-access code, a spreading code, an encryption code, a channel code, etc. A code sequence may include digital and/or analog signals. Examples of code sequences include direct-sequence codes, MC-CDMA codes, CI codes, CI/DS-CDMA codes, frequency-hopping codes, chirp codes, coherence-multiplexing codes, sub-channel codes, and code length division multiplexing codes. Some types of modulation can include the formation of code-chip values, continuous-code values, and/or code-chip sequences based on data-symbol values. Data symbols may be input to a code-generation process.

A network control station (also referred to as a base station) is any network transceiver adapted to perform network control operations, such as communication control, power control, synchronization, assignment of operating parameters to other network transceivers, spectrum management, load balancing, network configuration, code assignment, channel selection, performance monitoring, performance optimization, routing, authentication, verification, channel estimation, etc.

A network transceiver is any transceiver adapted to operate in a network. A network transceiver may include a base station, access point, relay, router, and/or subscriber unit.

A receiver, as used herein, includes any system, device, or process that employs any combination of detection and estimation. Detection is the task of determining if a predetermined signal is present in an observation. Estimation is the task of obtaining or determining values of one or more signal parameters. A receiver may perform various signal-processing operations, including, but not limited to, filtering, channel selection, A/D conversion, AGC, timing recovery, carrier acquisition, carrier recovery, bandwidth adjustment, sample-rate adjustment, matched filtering, soft-decision quantization, array processing, error detection, error correction, amplification, decoding, DC-signal removal, equalization, combining, spectral shaping, noise-bandwidth control, spectral translation, amplifier linearization, de-interleaving, in-phase/quadrature-phase gain and phase balancing, etc.

An RF front end describes any device or system adapted to convert baseband or IF signals to RF for transmission. An RF front end may be adapted to receive and convert RF signals to baseband or IF. An RF front end may be adapted to perform RF, IF, and/or baseband signal processing to prepare a received RF signal for IF or baseband processing. Similarly, RF, IF, and/or baseband processing may be provided to prepare a baseband or IF signal for coupling into an RF communication channel. An RF front end may perform array processing.

A source node is a transceiver in a network from which a transmission originates. A source node may be defined relative to a given network. For example, although a base station may receive a transmission and retransmit the information into a given network, the base station may be regarded as the source node relative to the given network. Alternatively, the source of the information may be identified as the source node.

A subscriber, or subscriber unit, as used herein, is a transceiver that is capable of acting as an information source and/or an information sink in a network. A subscriber is typically provided with communication services from at least one network. A subscriber typically communicates communication information with other subscribers. However, this communication information may be routed through other subscribers or non-subscriber devices. Thus, a subscriber is typically provided with at least one communication link to at least one other transceiver, such as a base station, access point, relay, router, and/or another subscriber.

A subspace, as used herein, describes a signal space that can include a plurality of signals having at least one common diversity parameter value (or range of values) and, preferably, is characterized by some means to separate at least one of the signals from at least one other of the signals. For example, each of a plurality of signals sharing the same frequency band, but transmitted by a different transmitter element characterized by some unique physical property (i.e., diversity-parameter value), may be characterized as a sub-space signal. Preferably, a plurality of receiving antennas are adapted to produce a plurality of algebraically unique combinations of the transmitted signals. Accordingly, algorithms and/or processors are provided to separate at least one desired signal from at least one interfering signal.

A transmitter, as used herein, includes any system, device, or process adapted to couple one or more signals into at least one communication channel. A transmitter may perform one or more signal-processing operations to prepare the signal for propagation in a channel. For example, transmitter-side signal processing may include D/A conversion, frequency up-conversion, filtering, spreading, predistortion, and/or array processing.

A CI transmitter may be implemented via any of many different techniques. The present invention anticipates design variations of CI-based transmitters. A CI/DS-CDMA transmitter, as well as any other CI transmitter, is characterized by the signals generated. In particular, a CI/DS-CDMA transmitter is any device, system, or algorithm capable of impressing information onto a plurality of carriers and adjusting (e.g., weighting) the carriers to provide a superposition signal having predetermined time-domain characteristics. Such time-domain characteristics may include a signal resembling a direct-sequence code.

An unlicensed frequency band refers to any frequency band that is allocated for unlicensed use by the Federal Communications Commission or an equivalent national or international regulatory organization. For example, unlicensed frequency bands for wireless LAN are specified in the IEEE 802.11 standards.

2. Introduction to Carrier Interferometry

Various aspects of the present invention are based on CI. Other aspects of the invention are particularly applicable to CI methods and systems. There are too many variations, permutations, and specific implementations of CI to describe in this introduction. Accordingly, the descriptions and examples of CI described herein are not intended to limit the scope of how CI is defined, but rather to illustrate a few of the many ways that the present invention may be implemented. Descriptions of CI are also intended to clarify some of the aspects and embodiments of the present invention.

Inter-symbol interference occurs when a reflected signal travels a distance sufficiently greater than the distance traversed by a line-of-sight signal so as to cause a delay greater than the duration of a data symbol. CI avoids inter-symbol interference by transmitting data symbols on narrowband carriers. Multipath fading occurs when a narrowband signal traverses two paths having a half-cycle phase difference. CI avoids the problem of multipath fading by transmitting each data symbol on multiple carriers that are adequately separated with respect to frequency or some other diversity parameter. Redundant modulation typically reduces bandwidth efficiency. CI avoids the problem of reduced bandwidth efficiency by modulating up to 2N data symbols on each of N carriers. Increased interference on one or more carriers typically increases probability of error. CI avoids the problem of increased interference and probability of error by exploiting interferometry to orthogonalize data symbols modulated on the same carriers. Thus, CI achieves higher throughput with better signal quality than any other multiple-access protocol.

FIG. 1A illustrates a basic form of CI in which a plurality of CI carrier sets 105A, 105B, and 105C each have phase fronts aligned at a specific time $t_1$, $t_2$, and $t_3$, respectively. A plurality of superposition signals 110A, 110B, and 110C result from a summation of each carrier set 105A, 105B, and 105C, respectively. The superposition signal 110A illustrates a pulse envelope centered at time $t_1$. All of the carriers 105A are in-phase at time $t_1$ and thus, combine constructively. The superposition signal 110A has a maximum magnitude at time $t_1$. At other times (e.g., times $t_2$ and $t_3$), the carriers in carrier set 105A combine destructively, resulting in low or undetectable signal levels.

In CI, the individual signal components 105A, 105B, and 105C contributing to a CI pulse 110A, 110B, and 110C, respectively, or information symbol $s_n$ have an extended duration $T_s$ relative to the pulse width $T_{pulse}$. The extended symbol duration $T_s$ (i.e., the duration of component waveforms corresponding to a symbol $s_n$) reduces spectral sidelobes associated with the transmitted information symbol $s_n$. The extended waveform shape can be overlapped with extended waveforms associated with other symbols $s_{n'}$ ($n' \neq n$). Naturally, interference will occur between the waveforms associated with different data symbols. However, CI coding can be employed to provide orthogonality (or quasi-orthogonality) between the composite waveforms (i.e., the data symbols $s_n$).

Although multicarrier-based CI signals (such as signals 110A, 110B, and 110C) can resemble sinc-shaped pulses, which are orthogonalized by time-domain pulse positioning, it is important to note that multicarrier-based CI signals are composed of multicarrier (e.g., multi-frequency) components and are typically processed (e.g., generated and/or decomposed) in the frequency domain.

The signal 110A results from an addition of N carriers that have a uniform frequency separation $f_s$. FIG. 1A illustrates a simple case of rectangular (i.e., non-tapered) windowing of the carrier amplitudes. The CI carriers are uniformly spaced in frequency $f_n = f_o + nf_s$, where $f_o$ is some zero or non-zero offset frequency, $f_s$ is a non-zero shift frequency, and n is some integer or set of integers. A superposition CI signal, such as signal 110A, is expressed by:

$$e(t) = \sum_{n=1}^{N} e^{j[(\omega_c + n\omega_s)t + n\Delta\phi]},$$

and has a magnitude of:

$$|e(t)| = \left| \frac{\sin(N(\omega_s t + \Delta\phi)/2)}{\sin((\omega_s t + \Delta\phi)/2)} \right|.$$

The CI signals are periodic with period $1/f_s$ for an odd number of carriers N and with period $2/f_s$ for an even number of carriers N. The main lobe has a duration $2/Nf_s$ and each of the N−2 side lobes has a duration $1/Nf_s$. The amplitude A(l) of the $l^{th}$ side lobe with respect to the main lobe amplitude is:

$$A(l) = \frac{1}{N \sin(\pi(l + 1/2)/N)}$$

Applying a phase shift of $n\Delta\phi_k$ to each $n^{th}$ carrier shifts the CI envelope in time by $\Delta t = \Delta\phi_k/2\pi f_s$. Therefore, N signals can be positioned orthogonally in time. The phase shifts can provide necessary phase relationships to create the desired timing of the information signal received by at least one receiver (not shown).

The cross correlation between users is:

$$R_{cc}(\tau) = \frac{1}{2f_s} \frac{\sin(N 2\pi f_s \tau / 2)}{\sin(2\pi f_s \tau / 2)} \cos((N-1) 2\pi f_s \tau / 2),$$

where τ is the time shift between envelopes. Zeros occur at: $k/Nf_s$, k=1, 2, . . . , N−1 and at $(2k-1)/2(N-1)f_s$, k=1, 2, . . . , N−1. CI can support N orthogonal users (or channels). If additional users or signals need to be accommodated, CI provides N−1 additional positions to place signals.

Figure 1B:
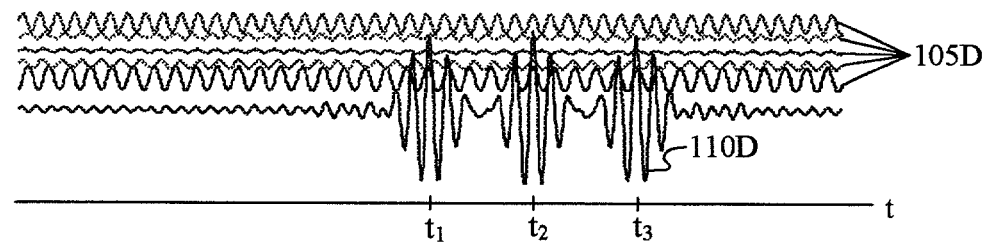
FIG. 1B illustrates an in-phase superposition of CI carriers of a carrier set that produces a superposition signal corresponding to a sum of the superposition signals shown in FIG. 1A

A CI signal centered at time τ is orthogonal to the CI signal centered at time $t_1$ whenever the difference between τ and $t_1$ is $\Delta t = k/Nf_s$, k=1, 2, . . . , N−1. This enables CI waveforms to represent information symbols located sequentially in time without creating inter-symbol interference. The superposition signal 110D shown in FIG. 1B represents a sum of the orthogonally positioned superposition signals 110A, 110B, and 110C.

An offset in the time domain corresponds to linearly increasing phase offsets in the frequency domain. A CI signal with a time offset $\tau = k/Nf_s$ is equivalent to a CI carrier set with carriers 1 to N having phase offsets:

$$\{\phi_1, \phi_2, \ldots, \phi_N\} = \{0, 2\pi k/N, 2 \cdot 2\pi k/N, \ldots, (N-1) \cdot 2\pi k/N\}.$$

Orthogonality between CI signals can be understood as an appropriate time separation $\tau \in \{k/f_s, k=1, 2, \ldots, N-1\}$ between superposition signals, or as carriers of each carrier set coded with a different polyphase spreading sequence:

$$f(\phi) = \{e^{j\phi 1}, e^{j\phi 2}, \ldots, e^{j\phi N}\} = \{e^{j0}, e^{j2\pi k/N}, \ldots, e^{j(N-1) \cdot 2\pi k/N}\}$$

with respect to values of k=0, 1, . . . , N−1.

Figure 1C:
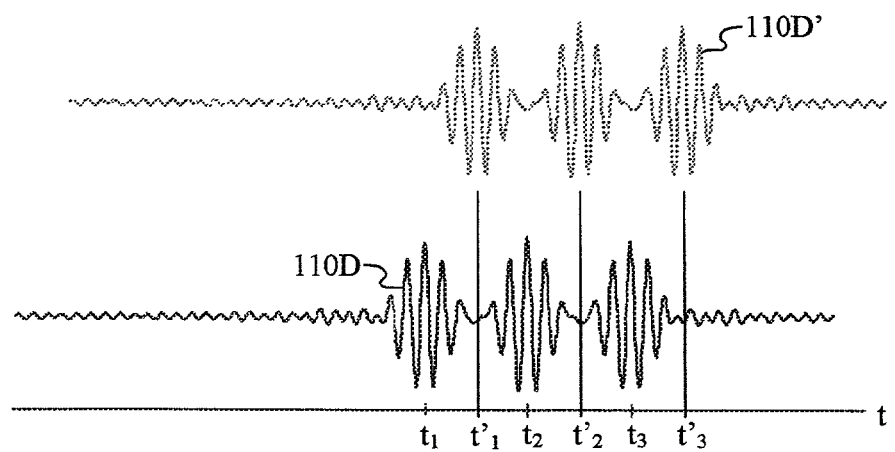
FIG. 1C illustrates two sets of orthogonal superposition signals. The signals in each set are orthogonal to each other. The signals in a first set are substantially orthogonal to signals in a second set.

A set of quasi-orthogonal signals can be determined from non-orthogonal time offsets that minimize the mean-squared value of the interference between the quasi-orthogonal signals. This criteria is satisfied by multiples of a time-offset value $\Delta t = 1/(2Nf_s)$. FIG. 1C shows a first set of N orthogonal signals 110D represented in time by:

$$\{t_1, t_2, \ldots, t_{N-1}\} = \{1/f_s, 2/f_s, \ldots, (N-1)/f_s\}.$$

A second set of N orthogonal signals 110D' is represented in time by:

$$\{t'_1, t'_2, \ldots, t'_{N-1}\} = 1/(2Nf_s) + \{1/f_s, 2/f_s, \ldots, (N-1)/f_s\}.$$

Figure 1D:
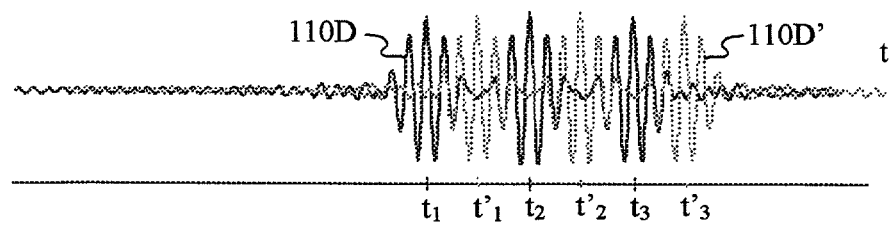
FIG. 1D shows a summation of two orthogonal sets of CI signals wherein signals in a first set are quasi-orthogonal to signals in a second set.

The first set of signals 110D is quasi-orthogonal to the second set 110D' and results in a minimal amount of interference, as shown in FIG. 1D.

This result can also be expressed in terms of carrier phase offsets using the equivalence between shifts in the time domain and phase offsets in the frequency domain. A first set of N orthogonal signals is represented in phase by N complex spreading codes:

$$f_1(\phi) = \{e^{j\phi 1}, e^{j\phi 2}, \ldots, e^{j\phi N}\} = \{e^{j0}, e^{j2\pi k/N}, \ldots, e^{j(N-1)\cdot 2\pi k/N}\}$$

A second set of N orthogonal signals is represented in phase by N complex spreading codes:

$$f_2(\phi) = \{e^{j\phi'1}, e^{j\phi'2}, \ldots, e^{j\phi'N}\} = \{e^{j(0+\Delta\phi)}, e^{j(2\pi k/N+\Delta\phi)}, \ldots, e^{j((N-1)\cdot 2\pi k/N+\Delta\phi)}\}$$

where $\Delta\phi = \pi/N$.

The superposition signal 110D in FIG. 1B can be thought of as a superposition of complex-weighted carriers in a carrier set 105D or a sum of the superposition signals 110A, 110B, and 110C. The carrier set 105D represents a sum of the carrier sets 105A, 105B, and 105C. The complex amplitudes of carrier set 105D can be characterized by a complex-weight vector $w = [w_1, w_2, \ldots, w_N]$. Each value $w_n$ of the weight vector w corresponds to a particular carrier frequency $f_n$. The values $w_n$ can be derived from a complex addition of carriers in the carrier sets 105A, 105B, and 105C. The values $w_n$ can be derived from summing complex numbers representing the magnitude and phase of each carrier in the carrier sets 105A, 105B, and 105C.

CI signals demonstrate both excellent frequency resolution and excellent time resolution. A CI signal is composed of multiple narrowband carriers that allow it to be resolved into its frequency components. When observed in the time domain, a basic CI signal is very narrow, enabling it to be easily separated from other CI signals and to resolve the channel's multipath profiles.

Because the period and width of the pulse envelope depends on the amplitudes, relative phases, and frequency separation of the CI carriers, the frequency of each carrier may be changed without affecting the pulse envelope as long as the amplitudes, relative phases, and frequency separation are preserved. Thus, frequency hopping and frequency shifting of the carriers does not affect the temporal characteristics of the superposition signal, such as superposition signal 110A. Tapering the amplitude distribution of the CI carriers broadens the main-lobe width and reduces the amplitude of the side lobes.

A CI signal has a number of carrier signals that may each have a bandwidth that is less than the coherence bandwidth of the communication channel. The coherence bandwidth is the bandwidth limit in which correlated fading occurs. The total bandwidth of the CI signal preferably exceeds the coherence bandwidth.

CI carriers corresponding to any particular user, channel, or data symbol may be spaced in frequency by large amounts to achieve a large system bandwidth relative to the coherence bandwidth. In this case, CI uses frequency to achieve uncorrelated fading. However, any diversity parameter or combination of diversity parameters may be used to achieve uncorrelated fading over the system bandwidth, or even between individual carriers.

The system bandwidth of a group of CI carriers may be selected relative to the coherence bandwidth of one or more subchannels, such as spatial sub-channels. Carriers that are closely spaced in frequency may have uncorrelated fading if they are transmitted from different locations or have different degrees of directivity. CI carriers transmitted from different locations may have different fades over each spatial sub-channel and therefore, can benefit from diversity combining at a receiver (not shown).

Phase shifts applied to an $n^{th}$ carrier to separate a $k^{th}$ channel from adjacent channels are given by:

$$\phi_{kn} = \pi k n f_s(\Delta t) + \phi^0_{kn} = \pi k n/N + \phi^0_{kn}$$

where $\phi^0_{kn}$ is an initial phase-offset corresponding to the $n^{th}$ carrier and the $k^{th}$ channel. The values of $\Delta t$ depend on whether the channel spacing is orthogonal or quasi-orthogonal.

Although FIG. 1A and FIG. 1B illustrate an in-phase superposition of carrier signals, this example can be extended to other superpositions of CI. For example, the time offset $\Delta t$ (and the corresponding carrier phase shifts $\phi_{kn}$) for adjacent channels may be applied to CI implementations that do not have in-phase superpositions. The time offsets $\Delta t$ (and thus, the phase shifts $\phi_{kn}$) derived in this case are also relevant to CI implementations that process the received carriers separately. When each carrier is processed separately, phase-offset coding (in addition to the phase offsets $\phi_{kn}$ used to separate channels) may be used to reduce or minimize the peak of the superposition signal.

The carrier sets 105A, 105B, and 105C have phase offsets corresponding to a pulse-width duration. However, any type of orthogonal (e.g., non-overlapping) or quasi-orthogonal (e.g., overlapping) spacing may be provided. Carrier sets having quasi-orthogonal (or non-orthogonal) spacing may be processed with multi-user (or multi-channel) detection techniques or with any other type of interference-suppression technique.

FIG. 1A and FIG. 1B illustrate several levels of signal decomposition that reduce a complex time-domain signal into simple components. The time-domain pulses may be scaled and positioned to produce a predetermined time-domain signal indicative of an information signal, coding, and at least one transmission protocol. Multiple frequency components may be weighted to produce an information signal having predetermined time-domain characteristics. Similarly, multiple frequency components that comprise the pulses may be selected and weighted to impart predetermined characteristics to the pulses. The scale of the components selected for signal processing can be selected to provide a desired granularity for the information architecture.

Modulation of the pulses, the carriers, or both may be performed over the duration of the signals shown in FIG. 1A and FIG. 1B. Carrier modulation may be performed over a pulse-repetition period, a pulse duration, or any multiple or fraction of either. In some cases, guard intervals, guard bands, and/or cyclic prefixes may be provided to CI signals.

3. CI Codes

CI codes, as used herein, may include basic CI codes or advanced CI codes. CI codes are based on phase relationships between orthogonal carriers, such as illustrated by samples 220 to 225 shown in FIG. 2A.

Figure 2A:
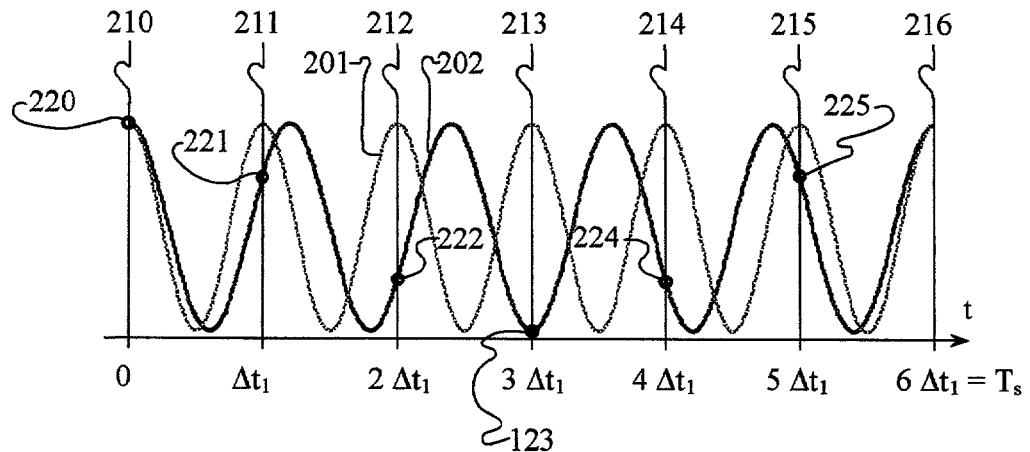
FIG. 2A illustrates phase relationships between two orthogonal sinusoidal waveforms that demonstrate a mathematical basis of CI processing.

Basic CI codes of the present invention can be derived from phase relationships between orthogonal carrier frequencies. FIG. 2A illustrates first and second orthogonal sinusoidal waveforms 201 and 202. Each waveform 201 and 202 has an integer number of wavelengths over a particular symbol interval $T_s$. The first waveform 201 frequency $f_1$ is six cycles per symbol interval $T_s$. The second waveform 102 frequency $f_2$ is five cycles per symbol interval $T_s$.

Figure 3A:
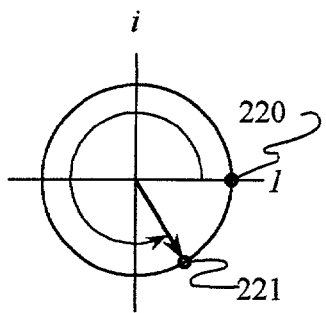
FIG. 3A illustrates a phase offset of adjacent samples shown in FIG. 2A.

The samples 220 to 225 of waveform 202 are selected at intervals of $\Delta t_1$ corresponding to periods 210 to 215 of waveform 201 over a symbol interval $T_s = 6\Delta t_1$. In this case, the waveforms 201 and 202 are aligned in phase at times t=0 and t=$T_s$. At t=$\Delta t_1$, sample 221 occurs at ⅚ of waveform 202 period $\Delta t_2$. Each sample 220 to 225 can be represented by a value on a unit circle in the complex plane. For example, FIG. 3A shows a complex-plane representation of samples 220 and 221.

Figure 4A:
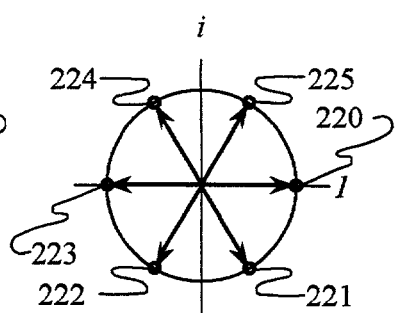
FIG. 4A shows samples distributed uniformly around a unit circle in the complex plane.

Since the sampling frequency $f_1$ exceeds the frequency $f_2$ of the sampled waveform 202, the phase shift of each successive sample 220 to 225 falls short of a full cycle of waveform 202. The waveforms 201 and 202 are orthogonal due to selection of an appropriate symbol interval $T_s$ that causes the samples 220 to 225 to be distributed uniformly across the unit circle in the complex plane, as illustrated by FIG. 4A. The sample values 220 to 225 cancel when they are summed.

Figure 2B:
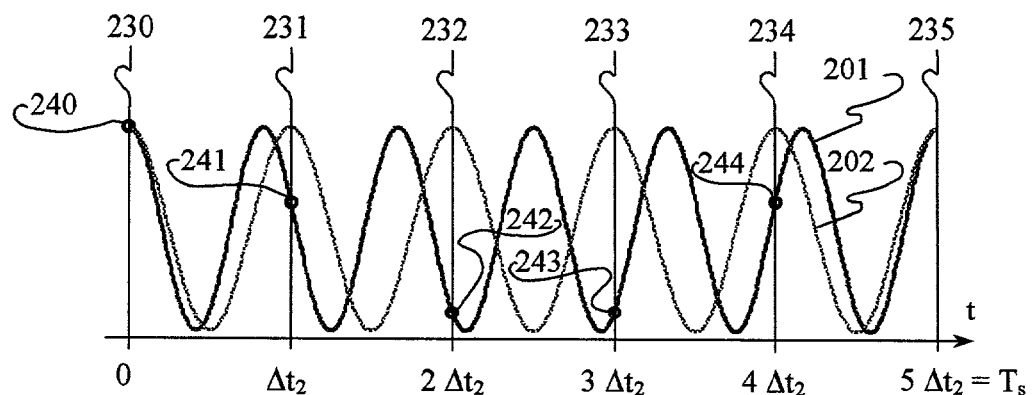
FIG. 2B illustrates relationships between two orthogonal sinusoidal waveforms.
Figure 3B:
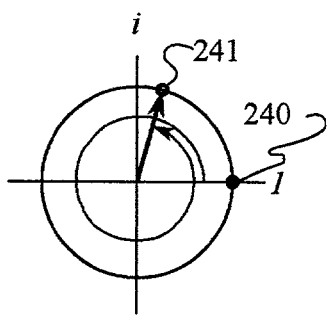
FIG. 3B illustrates a phase offset of adjacent samples shown in FIG. 2B.

FIG. 2B illustrates a first waveform 201 sampled at intervals 230 to 235 relative to a sampling frequency $f_2$ of a second waveform 202. A symbol interval is expressed by $T_s=5\Delta t_2$. Each sample 240 to 244 corresponds to a phase shift that is greater than a full cycle of waveform 201, as illustrated by FIG. 3B. The orthogonality of the waveforms 201 and 202 ensures that the samples 240 to 244 are distributed uniformly around the unit circle in the complex plane, as shown in FIG. 4B. Samples 240 to 244 collected over a symbol interval $T_s$ cancel when summed.

FIG. 4C shows a normalized complex-plane representation of samples (collected at a sampling rate $f_{sample}=f_n$) of a desired waveform having a frequency $f_n$. Since $f_{sample}=f_n$, the samples always occur on the same part of the unit circle in the complex plane. Thus, the samples sum constructively. In this example, the samples occur at the peaks of the desired waveform and thus, occur on the real axis in the complex plane. The number of samples $N_s$ per symbol interval $T_s$ is expressed by:

$$N_s = f_{sample}T_s = (f_o + nf_s)/f_s$$

The number of samples per waveform period ($1/f_n$) is 1.

Nearby waveform frequencies $f_{n\pm n'}$ can be expressed as: $f_{n\pm n'} = f_o + (n\pm n')f_s$. The number of samples per period of a nearby waveform can be expressed as:

$$N_{n\pm n'} = \frac{f_{n\pm n'}}{f_{sample}} = 1 \pm \frac{n' f_s}{(f_o + nf_s)}$$

In the complex plane, the sampled values shift by an amount:

$$\phi_{n\pm n'} = \pm \frac{n' f_s}{(f_o + nf_s)} 2\pi \text{ radians}$$

$N_s$ samples collected throughout the symbol interval $T_s$ are distributed uniformly on a unit circle in the normalized complex plane unless $f_{n\pm n'}$ is an integer multiple of $f_n$. The case in which $f_{n\pm n'}=mf_n$ (where m is some integer) can be avoided by appropriately frequency converting the received signal(s) and/or the sampling rate to ensure that the vector sum of the samples is zero.

CI codes can be used as direct-sequence codes, multicarrier codes (e.g., MC-CDMA), etc. Applications of CI codes can be extended to any application of conventional binary direct sequence codes, including, but not limited to, spread spectrum, multiple access, channel coding, encryption, and interference mitigation. CI codes may be applied across any set of orthogonal or quasi-orthogonal diversity-parameter values or subspaces.

Basic CI codes can be generated from phase relationships indicated by vector precession in the complex plane, such as shown in FIG. 4A. CI coding can be applied to circular, elliptical, and linear polarization. CI polarization codes may be based on vector precession in a two- or three-dimensional polarization plane. Advanced CI codes may be based on basic CI polarization codes. Similarly, vector rotation in a plane or a higher-dimension field of orthogonal bases may be used to generate basic and/or advanced CI codes. The basic family of CI codes is generated from an M×M matrix of elements having phases $\phi_{mn}$ described by:

$$\phi_{mn} = 2\pi mn/M + 2\pi f_o m/f_s M,$$

where m and n are row and column indices, respectively. M may have any positive integer value. The second Vim in $\phi_{mn}$ is an optional phase shift applied to all terms in a row. The phase-shift $\phi_{mn}$ may correspond to a carrier frequency offset $f_o$ and a sub-carrier separation $f_s$. A basic CI code $c_m$ of length N can include a row or column vector consisting of terms:

$$c_m = e^{im\phi'} \sum_{n=0}^{N-1} e^{imn\phi} \hat{n}$$

where $\phi=2\pi/M$ and $\phi'=2\pi f_o/f_s M$.

Some of the CI codes are complex-conjugate pairs. For example, correlations between CI codes are expressed by the following relationship:

$$corr_{m,m'} = \left(\frac{1}{M}\right) e^{i(m+m')\phi'} \sum_{n=0}^{M-1} e^{in(m+m')\phi}$$

The correlations are non-zero for (m+m')=M.

CI codes may have polyphase and/or multi-magnitude values. A CI code set may include one or more binary code vectors corresponding to at least one conventional binary-phase code. In the case where CI codes include complex-valued chips, the real and imaginary parts may be impressed upon different orthogonal parameters. For example, a magnitude corresponding to a real value may be modulated on an in-phase carrier component, whereas a corresponding imaginary value may be modulated on a quadrature-phase carrier component.

Orthogonal components may include, but are not limited to, perpendicular linear polarizations, left-hand and right-hand circular or elliptical polarizations, orthogonal polarization-spin frequencies, subspaces (e.g., spatial, directional, temporal, phase, polarization, etc.), orthogonal frequencies, orthogonal time intervals, direct-sequence codes, etc. Modulation may include phase modulation, amplitude modulation, frequency modulation, polarization modulation, time-offset modulation, or any combination thereof.

Phase shifts corresponding to CI code chips may be impressed upon a single carrier or onto multiple carriers. In one embodiment, phase shifts are impressed relative to a transmitted or locally generated reference phase. In another embodiment, differential phase modulation (DPM) is employed. In one embodiment, DPM is employed on a single carrier. In another embodiment, DPM is applied to a multicarrier transmission protocol. In one embodiment, each phase shift is conveyed as a phase differential between at least two carriers.

CI codes may be applied to ordinary direct-sequence (e.g., DS SS or DS-CDMA), MC-CDMA, OFDM, coded OFDM, Discreet Multitone, Wavelength Division Multiplexing (WDM), ultra-dense WDM, Multi-tone CDMA, Multi-code spread spectrum, or any of the CI protocols. In the case where CI codes are used in a multicarrier transmission protocol, phase-shift coding may be accomplished in any of several ways. Each carrier may be phase shifted with respect to each chip of a CI code chip sequence. Each carrier may be modulated with respect to any single-carrier modulation scheme. Each carrier may be modulated with one or more CI code chip encoded subcarriers. Each carrier may be provided with at least two diversity parameters that are modulated to convey real and imaginary parts of CI codes chips.

Multicarrier signals may be defined by any set of substantially orthogonal diversity-parameter values. These diversity parameters may include, without limitation, frequency, phase space, polarization (including linear, circular, elliptical) in two or three dimensions, mode, code (e.g., DS and/or CI), time, any type of subspace, and any combination thereof.

Advanced CI codes can involve one or more types of processing applied to basic CI codes. Some examples of advanced CI codes include matrices resulting from processing basic CI codes with a Hadamard-Walsh matrix, matrices derived from Hadamard-Walsh/CI matrices, and expanded CI matrices based on Hadamard-Walsh matrix expansion.

The basic CI codes can be combined (with each other or with other direct-sequence codes) to faun other families of polyphase and/or poly-magnitude CI codes. In any set of CI codes, the chip sequences may be truncated, appended, rearranged, concatenated, etc., to generate orthogonal or quasi-orthogonal chip sequences. Codes of similar or different lengths may be concatenated. Different chip sequences may be combined in such a way that at least one chip sequence is interleaved with chips from at least one other code.

CI code vectors may be multiplied by other code vectors including, but not limited to, direct-sequence codes, complementary codes, and/or other CI codes. Groups of CI code chips may be modulated (scaled and/or shifted) with respect to other code chips. A CI code may be overlayed with a long code, a Hadamard-Walsh code, a Barker code, a Gold code, a Kasami code, a Golay code, a CI code, or some other code. CI coding may include multiple levels of coding wherein at least one set of code chips modulates at least one other set of code chips.

Basic CI codes form an orthonormal basis. New orthonormal bases can be generated by linearly combining CI codes of a particular length. More advanced permutations of CI codes may also be provided to form orthonormal bases. The orthonormal bases may be multiplied by code chips of other sequences, such as Hadamard-Walsh, Gold, CI, etc.

Data symbols may be mapped to CI codes to provide channel coding. For the purpose of mapping, bi-orthogonal CI codes may be generated by including a code set multiplied by the value −1. CI codes may be used to generate trans-orthogonal (e.g., simplex) codes. Quasi-orthogonal mapping may be performed by phase shifting or scaling the CI codes. A second set of orthogonal CI codes may be generated by rotating the phase of a first code set by $\pi/2$, thus providing in-phase and quadrature CI codes.

CI-coded symbols may be decoded by correlating a coded signal with a complex-conjugate code. A received signal may be processed with an FIR filter having coefficients set appropriately to decode a desired signal. The received signal may be sampled and summed. Optionally, samples of the received signal may be weighted prior to being summed to compensate for any of various effects, such as channel distortions, transmitter-side encoding (e.g., to reduce PAPR), jamming, etc. Weighting may be performed with respect to one or more optimization processes in which weights are adjusted with respect to at least one measurement, such as signal to noise, signal to noise plus interference, probability of error, BER, received signal power, etc.

The received signal may be phase shifted with respect to chip phases of a decoding signal. If a received signal includes multiple samples per chip interval, the chip samples may be time shifted with respect to the chip phases of the decoding signal. The samples corresponding to each chip may be cyclically shifted with respect to a decode chip sequence. Subsequent processing, such as sampling, adding, comparison, and/or decision making (hard and/or soft) may be performed to evaluate data symbols measured after the decoding process.

FIG. 5A shows a set of 16 octonary code vectors C(n) resulting from multiplying an 8×8 basic CI code matrix $CI_{8\times 8}$ by rows of an 8×8 Hadamard-Walsh matrix $HW_{8\times 8}$. An 8×8 matrix resulting from a product of a matrix $CI_{8\times 8}$ by a row of matrix $HW_{8\times 8}$ includes two binary-phase 8-chip codes (which correspond to rows of matrix $HW_{8\times 8}$), two quaternary-phase code vectors, and four octonary-phase code vectors including two complex-conjugate pairs. The 16 code vectors C(n) are selected from octonary-phase vectors in matrices resulting from products of vectors of $HW_{8\times 8}$ with CI code matrix $CI_{8\times 8}$.

FIG. 5B shows auto correlations and cross correlations of the 16 octonary codes C(n) shown in FIG. 5A. The correlation relationships may be used to choose orthogonal or quasi-orthogonal code sets from the codes C(n). For example, the codes C(1), C(1)*, C(2), C(2)*, C(4), C(4)*, C(7), and C(7)* form an orthogonal eight-code set. The code pair {C(1), C(1)*} has zero cross correlation with C(2), C(2)*, C(4), C(4)*, C(7), and C(7)* and thus, can be used with these codes to provide orthogonal code sets. Code C(1) has a non-zero cross correlation with codes C(1)*, C(5), and C(6)*. Thus, an orthogonal set may include codes C(1) and C(5), and exclude codes C(1)* and C(6)*. The codes C(3), C(3)*, C(5), C(5)*, C(6), C(6)*, C(7), and C(7)* form another orthogonal eight-code set. Codes C(7), C(3), C(8), C(4), C(1), C(5), C(2), and C(6) form yet another orthogonal eight-code set. Many other code sets, including quasi-orthogonal codes, are possible.

Orthogonal and quasi-orthogonal code sets may be implemented separately or simultaneously. Code sets may include combinations of different M-ary polyphase codes. An M-ary code set may include codes with a code length (i.e., number of code chips) that is less than or greater than M. Code sets may include numbers of codes that are less than or greater than the code lengths. Code sets may include same-length and/or different-length codes.

Although basic CI codes and one family of advanced CI codes are described herein, many other implementations of coding based on CI are clearly anticipated. CI code sets may be selected or manipulated to provide cross-correlation values that are shifted by $\pi/2$. CI codes may be used to generate bi-orthogonal and/or trans-orthogonal CI code sets. CI codes may include linear combinations of other CI codes. CI codes may be derived from Hadamard-Walsh matrix expansion, code concatenation, code interleaving, code superposition, and/or weighted code superposition wherein weights are applied to one or more code chips. A CI code may include at least one set of CI matrix elements, such as a row, a column, a diagonal, and/or matrix elements selected with respect to some predetermined pattern.

CI code chips may be cyclically shifted, swapped, or otherwise re-ordered. CI codes may be implemented as multi-level codes with one or more codes that are not necessarily CI codes. Multiple codes including at least one CI code may be interleaved. CI codes may be interleaved with same length or different length codes. CI codes may be implemented in block coding, convolutional coding, turbo coding, any other form of channel coding, encryption, multiple-access coding, spread-spectrum coding, peak-power mitigation, etc. CI codes may be implemented with orthogonal coding, quasi-orthogonal coding, bi-orthogonal coding, trans-orthogonal coding, or any combination thereof.

CI codes may be generated by convolving at least one set of CI codes with at least one other set of codes, including one or more of the following: CI codes, binary direct-sequence codes, channel codes, spreading codes, multiple-access codes, etc. CI codes may be provided with one or more parity-check symbols formed from linear combinations of data symbols and/or code chips.

Figure 6A:
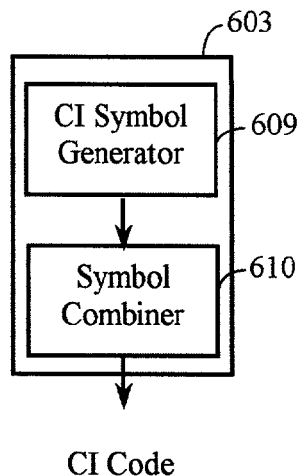
FIG. 6A illustrates basic components of a CI-code generator.

FIG. 6A illustrates basic components of a CI-code generator 603. A CI-symbol generator 609 generates a plurality of CI symbols that are coupled to a symbol combiner 610. The symbol combiner 610 groups the CI symbols to generate one or more CI codes.

A CI-symbol generator, such as the CI-symbol generator 609, includes any algorithm, system, or device adapted to generate a plurality of CI symbols. CI symbols may include basic CI symbols. CI symbols may be discreet-valued or continuous-valued numbers or functions. CI symbols may be values derived from at least one invertible transform function, such as a Fourier transform, a Laplace transform, a Walsh transform, a wavelet transform, etc. CI symbols may include linear combinations of other CI symbols, linear combinations of CI symbols with other code symbols, CI symbols modulated with code sequences from a predetermined code set including one or more of the following: spread-spectrum codes, multiple-access codes, channel codes, encryption codes, multi-level codes, compression codes, hybrid codes, invertible-transform codes, and CI codes.

A CI symbol combiner, such as the symbol combiner 610, includes any algorithm, system, or device adapted to group CI symbols to generate at least one CI chip sequence. A symbol combiner may append, concatenate, interleave, shift, puncture, or re-order one or more symbol sets. A symbol combiner may combine CI symbols with other symbols. A symbol combiner may provide a CI chips sequence with at least one parity-check symbol.

Figure 6B:
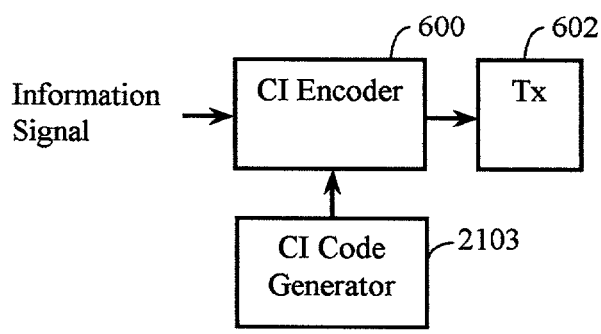
FIG. 6B illustrates basic components of a CI transmitter.

FIG. 6B illustrates a CI transmitter adapted to generate at least one CI-coded information signal. A CI encoder 600 encodes at least one input information signal relative to at least one CI code produced by a CI code generator 603. CI coded information signals are optionally coupled to a transmission system 602 that may include a pre-transmission processor (not shown).

Figure 6C:
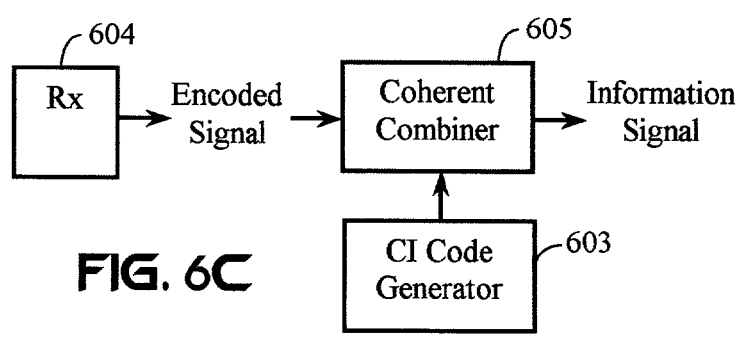
FIG. 6C illustrates basic components of a CI decoder.

FIG. 6C illustrates basic components of a CI decoder that include a CI code generator 603 and a coherent combiner 605 adapted to decode at least one CI-encoded signal with respect to at least one code generated by the CI code generator 603. Optionally, the decoder may be coupled to a front-end receiver processor 604 that provides the at least one CI-encoded signal to the decoder.

Channel coding provides signal transformations that are designed to improve communication performance by enabling transmitted signals to better withstand the effects of various channel impairments (e.g., noise, fading, interference). CI channel coding may include waveform coding and/or structured sequences. CI waveform coding (such as M-ary signaling, orthogonal coding, bi-orthogonal coding, trans-orthogonal coding, etc.) transforms waveforms to make them less subject to error. CI-structured sequences transform a data sequence into one or more sequences having structured redundancy. Redundant bits are used for detecting and/or correcting errors.

CI coding may include replacing a data set with an orthogonal codeword set. In one embodiment, a CI coder may multiplex multiple coded data symbols together by providing an orthogonal codeword set. A CI codeword set may be selected in which each codeword vector has zero projection onto all other CI codeword vectors except for its complex conjugate. A decoder may include multiple matched filters (or equivalent systems or algorithms) that output zero unless a corresponding encoded data symbol is received.

Figures 7, 8A:
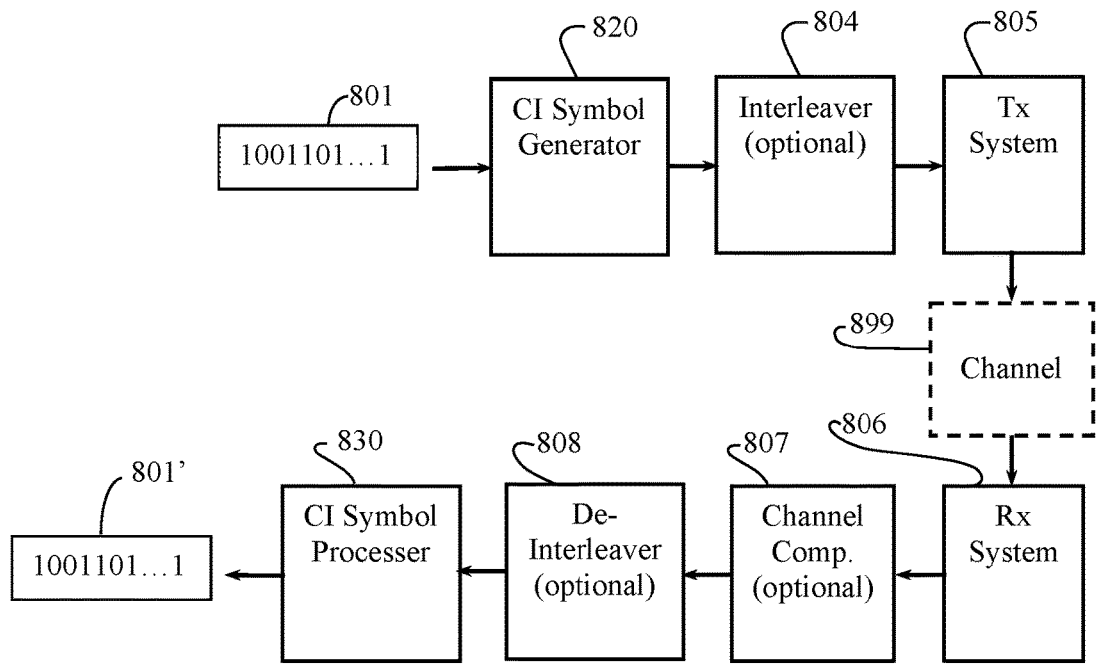
FIG. 7 illustrates the relationship between basic CI symbol values $w_n$ and data symbols $s_n$ processed with CI code chips to produce the CI symbol values $w_n$.
FIG. 8A illustrates basic components of a CI coding system and a CI decoding system.

FIG. 7 illustrates a relationship between CI symbol values $w_n$ and data symbols $s_n$. CI code chip values are arranged in columns with respect to phase spaces, such as phase space (column) 701. A phase space may be analogous to a pulse position. The phase spaces (e.g., pulse positions) may be orthogonal or quasi-orthogonal. Thus, the number of CI symbols $w_n$ may differ from the maximum number of data symbols $s_n$. Each data symbol value $s_n$ is impressed upon a phase space such that each set of CI code chip values in that phase space expresses the value of the corresponding data symbol $s_n$. Each code chip value is analogous to a complex weight applied to a particular CI carrier. A superposition of these carriers produces a CI waveform (e.g., pulse) bearing the data symbol value $s_n$.

A CI superposition waveform bearing multiple data-symbol/pulse-position characteristics can be created by applying weights to CI carriers that correspond to sums of carrier weights for each data-symbol/pulse-position. Similarly, each CI symbol, such as symbol $w_2$, corresponds to a summed row of data-bearing CI code chips, such as row 703. The code chips may be transmitted over multiple time intervals, carrier frequencies, polarizations, and/or other orthogonal diversity parameter values.

Decoding may include any appropriate inverse of the coding operation represented by FIG. 7. For example, to extract an $n^{th}$ data-symbol value s from a vector of received CI symbol values w, the complex conjugate of a vector of the $n^{th}$ phase space (or CI code) values $w_n$ may be correlated with the received CI symbol vector w. Equivalent decoding processes may be performed. The decoding process may be performed with respect to one or more combining techniques, such as, but not limited to, MMSE, EGC, maximum likelihood combining, or any combination thereof. Decoding may include turbo decoding.

FIG. 8A illustrates basic components of a CI coding system and a CI decoding system. A data symbol stream 801 is processed by a CI symbol generator 820 that outputs a plurality of CI symbol values $w_n$ representing a coded version of the data symbols $s_n$. The symbols $w_n$ may be interleaved by an optional interleaver 804 prior to being prepared for transmission into a communication channel 899 by a pre-transmission processor (not shown) in a transmission system 805. The symbols $w_n$ are typically multiplexed onto one or more diversity-parameter spaces prior to transmission.

A receiver system 806 couples transmitted signals from the channel 899, and a front-end receiver processor (not shown) performs any necessary processing, such as filtering, amplification, demultiplexing, de-spreading, decoding, and/or beam forming, prior to outputting an IF or baseband digital signal. Optionally, channel compensation 807 may be performed to mitigate effects of channel distortion and/or interference. Any necessary de-interleaving processes 808 may be performed prior to processing by a CI symbol decoder 830. The decoder 830 processes received CI symbols $w'_n$ to produce data-symbol estimates 801'. The data-symbol estimates 801' may be output to additional signal-processing systems (not shown).

The CI Symbol Generator 820 converts a predetermined number of input data symbols $s_n$ to a plurality of CI code symbols $w_n$. This conversion may involve summing information-modulated CI code chips. A first step in a CI symbol generation process may include generating code chips and/or acquiring code chips stored in memory or received from an input data stream. Code chips may be generated from a reduced set (e.g., an orthonormal basis) of code chips or code vectors.

A second step in a CI symbol generation process involves impressing at least one data symbol $s_n$ onto at least one set of code chips. The code chips may be multiplied, phase shifted, modulated, or otherwise impressed with data symbol values $s_n$. The code chips may represent a phase space, such as a pulse position. Optionally, the code chips may be provided with phase offsets, such as for crest-factor reduction or encryption.

A third step in a CI symbol generation process involves combining the code chips to produce one or more CI code symbols $w_n$. FIG. 7 illustrates how rows of information-modulated CI code chips are summed to produce CI code symbols $w_n$. Predistortion may be provided applying channel-compensation weights to the CI code symbols $w_n$.

The decoder 830 processes received CI symbols $w'_n$ to produce data-symbol estimates 801'. A first step in a CI decoding method includes generating code chips and/or acquiring code chips stored in memory or received from an input data stream. Code chips may be generated from a set of orthonormal codes or a subset of chips comprising one or more orthonormal codes.

A second step in a CI signal processing method includes combining or correlating at least one vector of the code chips with a vector of the received data symbols $w'_n$. A correlation process may include a scalar multiplication between the code chip vector and the received data symbol vector followed by combining (e.g., integrating) the products. Another embodiment of correlation includes adding together selected samples over a predetermined symbol interval $T_s$. Additional processing may be performed to produce estimates of the transmitted data symbols.

The decoder 830 may perform various types of combining, such as weighted combining as part of an MMSE, EGC, maximal likelihood, or any other performance-based optimization process. The decoder 830 may perform channel compensation. The decoder 830 may include a front-end receiver processor (not shown).

The bandwidth requirements for bi-orthogonal CI codes are half of the requirements for comparable orthogonal codes. Bi-orthogonal codes have slightly better performance over orthogonal codes because antipodal signal vectors have better distance properties than orthogonal signals. Trans-orthogonal (e.g., simplex) codes, when compared to orthogonal and bi-orthogonal codes, require the minimum SNR for a particular symbol error rate. Channel codes may be overlaid onto multiple-access codes. Depending on the processing gain of the multiple-access codes, channel coding may not require additional bandwidth.

Figure 8B:
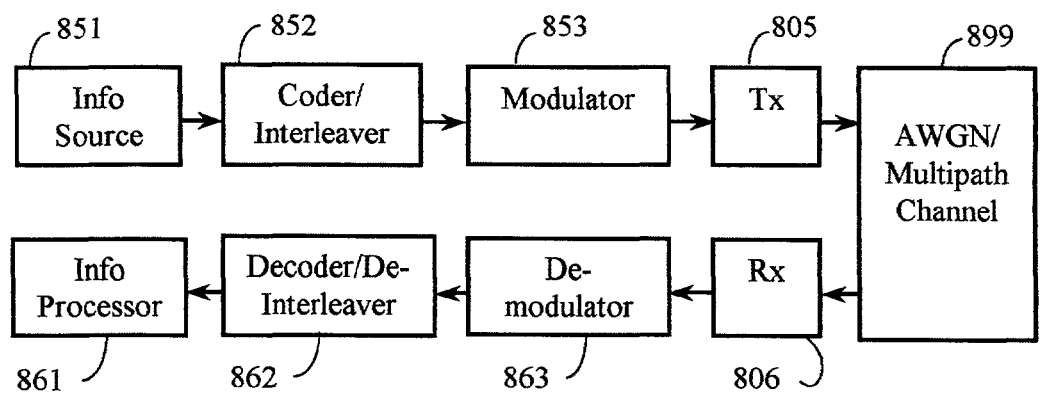
FIG. 8B shows a system diagram of a CI transceiver.

FIG. 8B shows a system diagram of a CI transceiver. An information source 851 provides data symbols to a CI coder/interleaver 852. A modulator 853 modulates the coded symbols onto one or more carriers that are transmitted by a transmitter 805 into a communication channel 899. The channel 899 may be characterized by AWGN and/or multipath. Other channel distortions may be considered. A receiver 806 couples the transmitted signals out of the channel 899. A demodulator 863 retrieves symbols from the received signal. A CI decoder/de-interleaver 862 decodes (and de-interleaves, if necessary) the received symbols into information symbols that are optionally processed in an information processor or sink 861.

In one embodiment, the coder 852 maps data symbols to CI code words using a look-up table. In another embodiment, the CI code words are generated with respect to each data symbol. Codeword generation may be performed with a CI code generation matrix G. CI codes of a given set of CI code words may be constructed from a combination of linearly independent code vectors that form the CI code generation matrix G.

Although code generation is described with respect to basic CI codes, orthonormal basis vectors and a corresponding CI code generation matrix may be constructed for advanced CI codes. Each code in a basic CI code set can be defined by a different number of full rotations in the complex plain. For example, an orthonormal basis for a set of N=64 basic CI codes can be defined by the CI code generation matrix:

$$G = \begin{bmatrix} C(\text{rotations} = 1) \\ C(\text{rotations} = 2) \\ C(\text{rotations} = 4) \\ C(\text{rotations} = 8) \\ C(\text{rotations} = 16) \\ C(\text{rotations} = 32) \end{bmatrix}$$

where C(rotations=m), m=0, 1, ..., N-1, is a code vectorize corresponding to:

$$C(m) = e^{im\phi'}(1, e^{im\phi}, e^{i2m\phi}, \ldots, e^{i(n-1)m\phi})$$

Since this basic CI code set is totally defined by G, the coder 852 needs to store only k rows of G instead of $2^k$ vectors of the CI code matrix. Furthermore, since the first half of each row vector C(m) of G is the same as the second half (except C(1)'s first and second halves differ by a factor of −1), the coder 852 and decoder 862 need only store one half of each row vector C(m).

A CI receiver may perform error detection using any of several techniques. Symmetry relationships between the first and second halves of a received code can be exploited to determine whether an error occurred. Other relationships between code symbols may be used to provide error detection and/or correction. For example, adjacent CI code symbols (except for the all-ones code) are typically not identical. Depending on the code, the values of adjacent code symbols change in a predetermined way. For example, adjacent code chips of an $m^{th}$ basic code C(m) differ by $e^{im\phi}$.

A parity-check matrix H (defined by the equation, $GH^T=0$) can be used to test whether a received vector is a member of a codeword set. The decoder 862, upon detecting an error, may perform forward error correction and/or request a retransmission. Preferably, the decoder 862 estimates the transmitted code vector using some optimizing strategy, such as the maximum-likelihood algorithm. The receiver may erase ambiguous signals. The decoder 862 may implement error correction to correct erasures and/or errors.

It is preferable that the coder 852 select codes that maximize the Hamming distance between codes. An advantage of using polyphase codes is that they provide a superior Hamming distance compared to binary codes. For example, (n,k)=(8,3) binary code has an n-tuple space of $2^n=2^8=256$ binary words, of which $2^k=2^3=8$ are code words. An octonary-phase (m=8) (8,3) code has an n-tuple space of $2^{mn}=2^{64}$ octonary words. The fraction of words that are code words decreases dramatically with increasing values of m. When a small fraction of the n-tuple space is used for code words, a large Hamming distance can be created.

CI codes may be processed as cyclic codes, which are described in many prior-art references, such as B. Sklar, *Digital Communications, Fundamentals and Applications*, Prentice-Hall, Inc., New Jersey, 1988. For example, components of a CI code vector $C=(C_0, C_1, \ldots, C_{N-1})$ can be treated as coefficients of a polynomial U(X), as follows:

$$U(X)=u_0+u_1X+u_2X^2+\ldots+u_{N-1}X^{N-1}$$

where $X=e^{i2\pi nk/N}$, where k is the order of the code: k=0, 1, ..., N−1. Well-known cyclic code processing may then be performed.

4. CI Networks

Figure 9A:
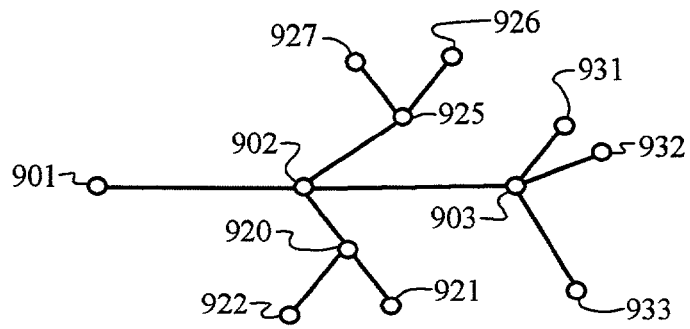
FIG. 9A illustrates a tree network that may be implemented in some aspects of the present invention.

FIG. 9A illustrates a tree network that may be implemented in aspects of the present invention. Transmissions passed to one or more nodes in the network may be branched off, or routed, to a plurality of nodes. Routing may include processing any combination of network addresses conveyed in headers and network addresses conveyed by codes (e.g., spreading codes, multiple-access codes, channel codes, etc.).

Network addresses may provide routing information and/or directions. For example, multiple addresses may convey one or more paths between a source node and a destination node. Various types of control information may be included in a code. For example, certain codes may convey priority information, identify the type of data payload, and/or otherwise tag the transmission.

Figure 9B:
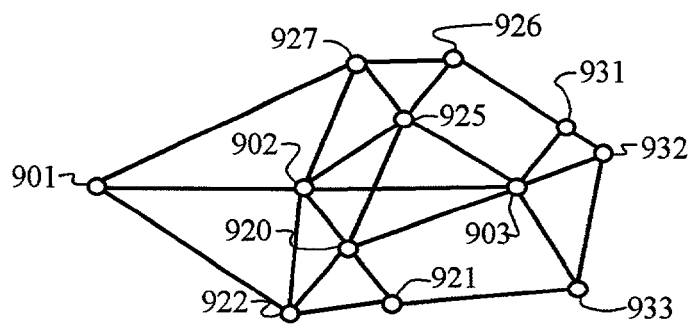
FIG. 9B illustrates a network design that permits a plurality of communication paths to each node.

FIG. 9B illustrates a network design that permits a plurality of communication paths to each node. Multiple network connections between a source node and a destination node may be provided for redundancy. Alternatively, each path may be selected based on one or more criteria, such as channel conditions and load balancing.

Figure 9C:
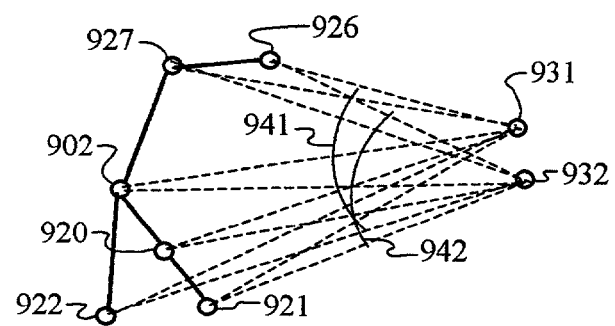
FIG. 9C illustrates a network design adapted to provide array processing performance advantages.

FIG. 9C illustrates a network design adapted to provide array processing performance advantages. A plurality of nodes 926, 927, 902, 920, 921, and 922 are adapted to provide complex-weighted transmissions to at least one destination node, such as nodes 931 and 932. For example, a data sequence addressed to node 931 is routed to nodes 926, 927, 902, 920, 921, and 922, which provide appropriate weights to the data transmission to generate a phase front 941 that converges at the destination node 931. Similarly, appropriate delays or complex weights may be provided to transmissions to produce a coherent phase front 942 that converges at destination node 932. Signals received by the nodes 926, 927, 902, 920, 921, and 922 may be combined with respect to any combining technique, including optimal combining.

Nodes in a wireless network may generate weighted transmissions (or process received signals) to perform various types of array processing. Individual nodes may include one or more transceiver (e.g., antenna) elements. Array-processing operations may include combinations of local and global processing. For example, diversity combining may be performed at each multi-element node and signals from each node may be combined in a central processor to perform sub-space (i.e., directional) processing. Other combinations of local and global processing may be employed.

Array processing may include space-time processing, space-frequency processing, beam forming, null steering, blind-adaptive processing, long baseline interferometry, frequency-diversity interferometry, etc. Array processing may be performed to achieve any combination of sub-space processing (i.e., increased capacity) and diversity benefits in (i.e., improved performance). Selection of transmitting and receiving nodes in an array-processing network can be adapted to changing node positions, network loads, throughput requirements, user services, bandwidth availability, frequency-reuse requirements, channel conditions, etc.

Figure 9D:
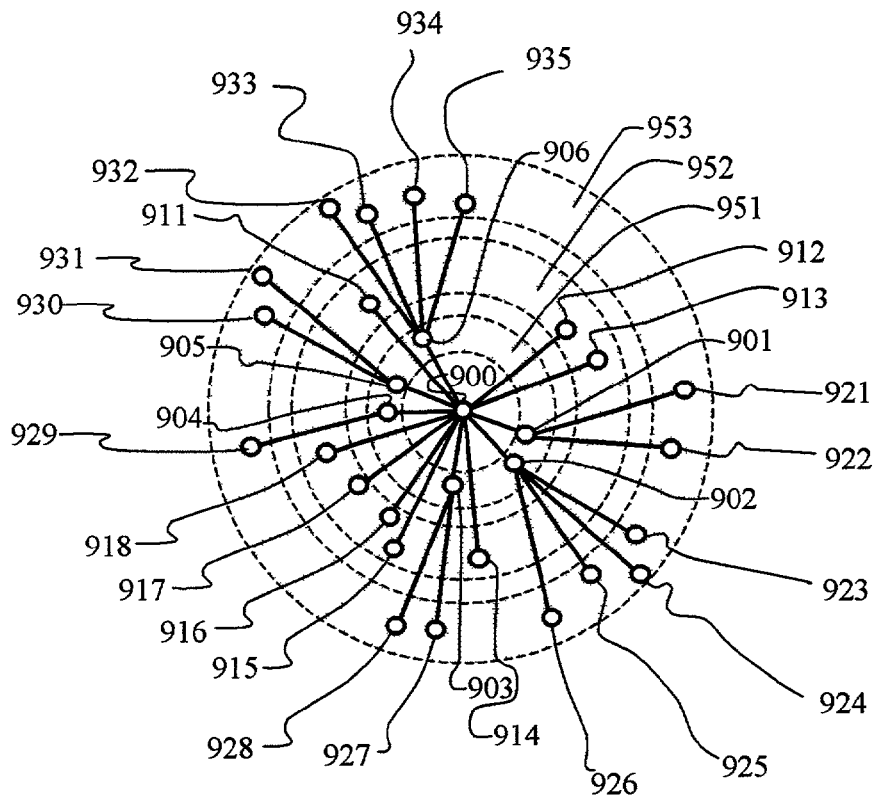
FIG. 9D illustrates a concentric ring network configuration.

FIG. 9D illustrates a concentric ring network configuration in which a base station 900 or access point provides direct or indirect communication links to a plurality of subscriber units 901 to 935 arranged in a plurality of concentric-ring regions 951 to 953. Subscriber units 901 to 906 in region 951 are adapted to route signals to one or more subscriber units 921 to 935 in one or more regions, such as region 953. Similarly, subscriber units 911 to 918 in region 952 may be adapted to route signals to subscribers in other regions. In some applications, one or more subscribers may be adapted to route signals to at least one other subscriber in the same region.

Region shapes and sizes may be adapted to numbers of users and/or the geographical distributions of the users. Similarly, regions may be adapted to balance network loads. For example, subscriber power consumption and processing requirements associated with routing signals through subscribers near the base 900 can be mitigated by distributing routing operations over a larger number of subscribers. Thus, subscribers in regions 951 and 952 perform routing associated with a direct transmission from and/or to the base 900. Similarly, the number of subscribers in primary arteries of tree networks (or other networks) can be increased. Routing functions can be assigned to subscribers based on subscriber location, subscriber load, channel conditions, and network load. The network configuration illustrated in FIG. 9D may be integrated with other network architectures, such as tree configurations, or otherwise adapted to geographical distributions of subscribers and other network transceivers.

Figure 9E:
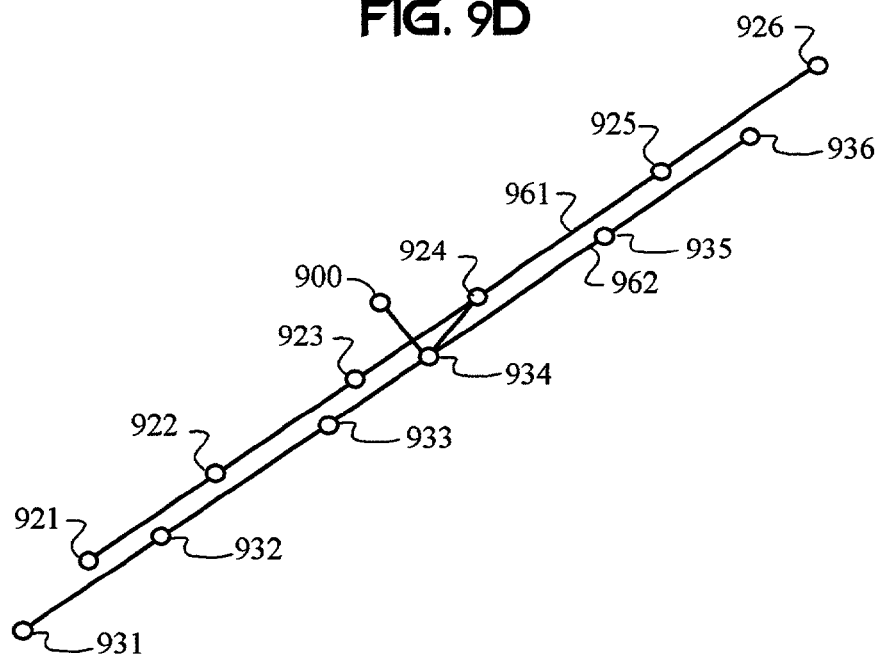
FIG. 9E illustrates a network configuration adapted to the geographic distribution of a plurality of subscribers located along a roadway.

FIG. 9E illustrates a network configuration adapted to the geographic distribution of a plurality of subscribers 921 to 926 and 931 to 936 located along a roadway. In this case, there are two routing paths 961 and 962 provided by subscriber routing. Network configurations, including transmission paths, may be adapted to subscriber distributions and channel conditions. For example, urban channel environments are typically characterized by a waveguide grid. Thus, routing paths may be provided with a grid architecture in urban areas.

Figure 9F:
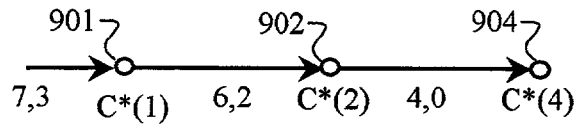
FIG. 9F illustrates a plurality of nodes adapted to route CI code-addressed signals.

A transmission may include multiple levels of coding intended to be stripped off at each node along a predetermined path to a particular address. FIG. 9F illustrates three nodes 901, 902, and 904. The first node is adapted to decode a one-rotation basic CI code by applying complex-conjugate decoding of the one-rotation code. A basic CI code $c_m$ characterized by m rotations (m<N) is expressed by the following equation:

$$c_m = e^{im\phi'} \sum_{n=0}^{N-1} e^{jmn2\pi/N} \hat{n}$$

The complex-conjugate decoding essentially unwinds the code. Similarly, nodes 902 and 904 are adapted to decode two-rotation and four-rotation codes, respectively. For simplicity, the rotations are provided in a common predetermined direction.

In one aspect of the invention, each node splits a received signal into at least two signals. At least one of the split signals is decoded at the node to extract any information intended for that node. A node may be associated with one or more addresses, or codes. At least one split signal is passed through the node without any decoding. Thus, node 901 receives signals coded (or addressed) with one code rotation, node 902 receives signals coded (or addressed) with two code rotations, etc.

In another aspect of the invention, a signal input to a node is not split prior to being decoded to extract any signals intended for that node. The decoded signal is then re-encoded with respect to the complex conjugate of the decoding operation. Thus, any unwinding associated with decoding is reversed prior to re-transmission of the coded information signal. Optionally, a node transceiver may cancel or otherwise remove signals addressed to itself prior to re-encoding.

In yet another aspect of the invention, coded transmissions are coded with respect to the intended path(s) to a predetermined address, thus obviating the need for splitting or re-encoding. For example, an information signal addressed to nodes 902 and 904 input to the first node 901 is encoded with a pair of basic CI codes having three rotations and seven rotations, respectively:

$$r_{node901} = \sum_{n=0}^{N-1} \left( s_2(t) e^{j3n2\pi/N} + s_4(t) e^{j7n2\pi/N} \right) \hat{n}$$

Decoding at the first node 901 unwinds the coded signals by one rotation. The decode signal is characterized by $C^*(1)$, which is the complex conjugate of code $C(1)$. Thus, node 901 passes a coded information signal to node 902 expressed by two-rotation and six-rotation codes:

$$r_{node902} = \sum_{n=0}^{N-1} \left( s_2(t) e^{j2n2\pi/N} + s_4(t) e^{j6n2\pi/N} \right) \hat{n}$$

A sum of the decoded chips yields zero because there are no input signals coded with a single-rotation code. A sum of the chips generated at node 901 is zero because the non-zero rotations cause the chip values to cancel.

Decoding with decode signal $C^*(2)$ at node 902 unwinds the coded signals by two rotations. Thus, a sum of the decoded signal at node 902 coherently combines chip values associated with signal $s_2(t)$ and cancels chip values associated with signal $s_4(t)$. Node 902 produces a coded information signal expressed by:

$$r_{node904} = \sum_{n=0}^{N-1} \left( s_2(t) + s_4(t) e^{j4n2\pi/N} \right) \hat{n}$$

The values $s_2(t)$ may optionally be removed (such as by cancellation, dc-offset removal, etc.) prior to transmission to node 904. A node transceiver at node 902 may ensure non-zero chip values prior to transmission.

Coded signals received by node 904 are processed with a complex-conjugate code $C^*(4)$ that unwinds the coded signal by four rotations. The resulting decoded signal is expressed by:

$$r_{node904'} = \sum_{n=0}^{N-1} s_4(t) \hat{n}$$

Decoding and summing the code chips at node 904 coherently combines signal values $s_4(t)$ associated with a four-rotation code $C(4)$.

Figure 9G:
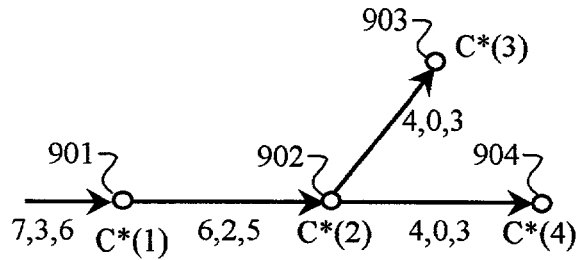
FIG. 9G illustrates a simple tree-style CI-based network of the present invention.

FIG. 9G illustrates a simple tree-style CI-based network. Nodes 901, 902, and 904 are provided with decode signals corresponding to $C^*(1)$, $C^*(2)$, and $C^*(4)$, respectively. A branch node 903 employs a decode signal $C^*(3)$ adapted to decode signals characterized by three rotations in a predetermined direction. A signal addressed with basic CI codes corresponding to rotations of seven, three, and six are input to node 901. Signals output by node 901 to node 902 correspond to rotations of six, two, and five. Node 902 provides a decode signal of $C^*(2)$ to its input signal. Thus, the input corresponding to two rotations is decoded and the resulting value is processed at the node 902. The resulting output signal(s) from node 902 is expressed by rotations as four, zero, three. The zero value may characterize a substantially null signal resulting from cancellation of the decoded signal at node 902.

Node 902 may provide a broadcast signal to nodes 903 and 904. Alternatively, node 902 may duplicate the signal four, zero, three and provide a signal to each of the nodes 903 and 904. In some cases, node 902 may be adapted to separate its input signal into a plurality of components relative to addresses. Each component may be forwarded directly to its intended node. In some cases, separate signals may be provided via beam forming. In other cases, some form of multiple access, including header addresses, may be employed.

Figure 9H:
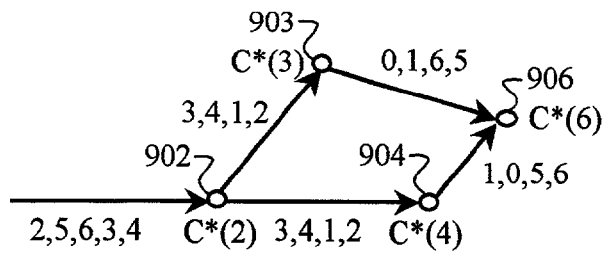
FIG. 9H illustrates a simple CI-based network wherein each node can be reached by a plurality of paths.

FIG. 9H illustrates a simple multipath CI-based network. Node 902 is provided with coded signals (expressed in rotations as 2, 5, 6, 3, 4). The value two is addressed to node 902. The values five and six are addressed to nodes 903 and 904. A fourth node 906 receives transmissions from nodes 903 and 904. Thus, values three and four characterize paths through nodes 903 and 904, respectively, that are addressed to node 906. Signals received and decoded at node 906 may be combined coherently. Such combining may include optimal combining.

In some aspects of the invention, node 906 may be provided with additional decode values (e.g., $C^*(5)$) to enhance reception. Furthermore, two or more decode values (e.g., $C^*(6)$ and $C^*(5)$) may be exploited in appropriate combinations to provide beam forming (or equivalent array processing) operations. Various combining operations may be performed to provide any combination of interference rejection, diversity enhancement, and sub-space processing (i.e., capacity enhancement).

Figure 9I:
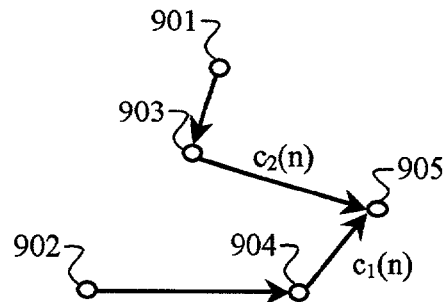
FIG. 9I illustrates a network characterized by two communication paths to a common destination node.

FIG. 9I illustrates a plurality of nodes 901 to 905 and at least two communication paths. A first communication path includes nodes 902, 904 and 905. A second communication path includes nodes 901, 903, and 905. In this case, the two paths illustrate communication to node 5. Alternatively communication paths may be provided indicating communications from node 905.

Signals arriving from the first communication path are encoded with at least one code $c_1(n)$. Similarly, the signals arriving from the second communication path are encoded with at least one code $c_2(n)$. In various applications of the invention, additional communication paths (not shown) may be provided.

The codes $c_1(n)$ and $c_2(n)$ may be address codes or they may include address codes. The codes $c_1(n)$ and $c_2(n)$ may be similar or different. Alternatively, the codes $c_1(n)$ and $c_2(n)$ may be separate (or different) from address codes. In some cases, address codes may be adapted to provide additional coding or achieve other objectives, such as, but not limited to, encryption, verification, authentication, identification, anti-jamming, and/or diversity benefits.

In one set of embodiments of the invention, redundant information signals or signals providing redundant information are routed along the multiple paths to the destination node 905. This can provide diversity benefits. The codes $c_1(n)$ and $c_2(n)$ may include similar or different channel codes. Signals provided along the multiple paths may be decoded (if necessary) and coherently combined in a receiver at the node 905. Combining may include one or more optimal-combining techniques. The number of transmission paths that are coherently combined is proportional to an effective processing gain of the combining process. Consequently, low-power information-bearing transmissions may be employed over the multiple transmission paths. Signals received from different paths may be processed via soft-decision processing to provide confidence measurements for symbol estimates and/or enhance channel compensation and/or iterative decoding.

In another set of embodiments, each of a plurality of signals routed along different paths to a given node may provide necessary keys (or equivalent information) necessary for decoding. For example, signals routed along a first path may provide a coded information signal to a predetermined destination. Signals routed along a second path to the same destination may provide a decode sequence to decode the coded information signal. The codes $c_1(n)$ and $c_2(n)$ may include codes that are complex conjugates of each other. The first code $c_1(n)$ may include a public key and the second code $c_2(n)$ may include a private key wherein the two codes $c_1(n)$ and $c_2(n)$ contribute the necessary code keys for decoding a coded information signal transmitted along the first and/or second paths, or along a third path. Various pluralities of codes, paths, and/or coded information signals may be employed.

The process of providing multiple decoder keys across multiple transmission paths may be part of an authentication and/or verification process. The codes $c_1(n)$ and $c_2(n)$ may include channel-specific codes that characterize the channel between at least one transceiver and the destination node 905. The codes $c_1(n)$ and $c_2(n)$ may include channel compensation. Consequently, a channel analysis of received signals at the destination node 905 will indicate the likelihood that the signals were transmitted from known nodes, such as nodes 903 and 904. Similarly, channel analysis may be employed to determine the local source node of a given transmission. The codes $c_1(n)$ and $c_2(n)$ may include beamforming weights.

In some aspects of the invention, channel estimation may be performed on a signal received from a transceiver attempting to access the network. Various location-finding processes (e.g., direction-of-arrival determination, geo-location tracking, triangulation, etc.) may be implemented to determine the transceiver's location relative to a set or range of allowed locations. In some applications, identification of unauthorized users may be combined with location finding.

Figure 9J:
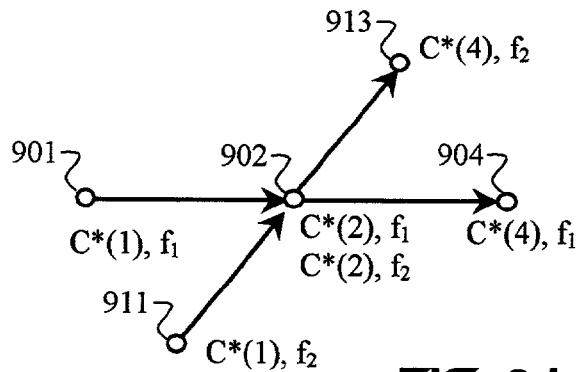
FIG. 9J illustrates a network having a plurality of crossing communication paths.

FIG. 9J illustrates a node 902 used in a plurality of crossing communication paths. Nodes 901, 902, and 904 are part of a first communication path. Nodes 911, 902, and 913 are part of a second communication path characterized by at least one unique diversity parameter value. In this case, the communication paths are distinguished by different carrier frequencies. Alternatively, communication paths may be differentiated by code, polarization, subspace, time, phase, subspace, or any combination thereof.

Although basic CI codes are illustrated in the exemplary network architectures, other types of codes (including, but not limited to, complex CI codes, Walsh codes, multi-code sets, multi-level (or stacked) codes, and/or codes derived from invertible transforms) may be implemented in the examples shown, as well as in variations, adaptations, permutations, and combinations of the exemplary network architectures. Network address codes may be employed for one or more additional functions, including, but not limited to, spread spectrum, multiple access, channel coding, and encryption. Network designs shown in the figures and described in the specification are intended to convey basic principles and various aspects of the invention. These network designs do not limit the scope of the invention. Consequently, various network designs may be considered as building blocks for complex network architectures.

Network designs and other aspects of the invention may be combined with prior-art network designs, systems, devices, protocols, formats, and/or methods. Such combinations are clearly anticipated and suggested. Aspects and embodiments of the invention may serve as portions of networks. Network designs, systems, and/or methods of the invention may be adapted to various types of networks, such as long-haul, short-haul, last-mile, local-area, metropolitan-area, sensor, RF-identification, tracking, ad-hoc, mobile radio, personal communication, cellular, airborne, air-ground, and/or satellite networks. Network architectures of the invention may include one or more types of multiple access. Network architectures of the invention may include any combination of addressing, including address codes and packet headers containing addresses.

FIG. 10A illustrates a multi-level cellular architecture that may be employed by systems and methods of the present invention. At least one macro-cell 1021 is subdivided into one or more micro-cells 1031. Various multiple-access techniques may be used to separate communications in different cells. For example, a predetermined code may be provided to transmissions within the macro-cell 1021. Macro-cell codes may be provided for inter-cell multiple access or radio isolation. Micro-cell codes may be provided for intra-cell multiple access. Codes applied to transmissions may implement additional network functions, such as spread spectrum, encryption, authentication, channel coding, addressing, and/or interference mitigation.

In some applications, multi-level codes may be implemented. In some cases, macro-cell codes may provide greater processing gain than the micro-cell codes. For example, macro-cell codes may consist of long codes and micro-cell codes may consist of shorter channel codes and/or multiple-access codes. Either or both micro-cell codes and macro-cell codes may implement CI and/or CI-based coding. Coding may be implemented with, or as part of, array processing.

FIG. 10B illustrates three cells 1021 to 1023 in a cellular network of the present invention. Each cell 1021 to 1023 employs a different long code $C_{L1}$ to $C_{L3}$, respectively, to differentiate between communications in adjacent cells. Each cell 1021 to 1023 provides intra-cell communications with codes $C_{s1-N}$ to differentiate between subscriber units in each cell. Coding may include CI and/or CI-based codes. Additional multiple-access techniques may be employed to provide for inter-cell and intra-cell multiple access.

FIG. 10C shows a cellular architecture of the present invention that includes a plurality of cells 1021 to 1025 and a plurality of base stations 1001 to 1005 located on cell boundaries. The base stations 1001 to 1005 may include spatially sectorized antennas to provide communication to a plurality of cells. For example, base 1002 may be adapted to service users in cells 1021, 1022, and 1023.

The base stations 1001 to 1005 may be adapted to route coded information across multiple cells. For example, coded data and/or control information is routed from base 1002 to base 1003. A coded signal may be duplicated or decomposed for routing to multiple bases or subscriber units. For example, base 1003 transmits coded information to bases 1004 and 1005. In some applications, subscriber units, such as subscriber units 1011 and 1012 may be employed to route information between two or more base stations. In any of the implementations of the invention, transmission paths through a network may be selected based on one or more criteria, including transceiver availability, transceiver locations, network loads, channel conditions, transmission-power requirements, etc.

FIG. 10D illustrates a cellular network of the invention including a plurality of cells 1021 to 1030, a plurality of base stations 1000 to 1009, and a plurality of subscriber units, such as subscriber units 1061 to 1063 and 1071 to 1073. In this case, the bases 1000 to 1009 are located inside each cell 1021 to 1030. Other cellular architectures may be employed.

A base station (e.g., base 1000) may route information directly to other bases (e.g., bases 1001, 1002, 1004, 1005, and 1006). Such direct transmissions paths are indicated by transmission paths 1041 to 1045. A direct transmission path 1046 may be provided to a base (such as base 1009) that is not adjacent to the originating base 1000. A transmission between bases may be routed through intermediate bases. For example, base 1005 acts as a router for transmissions between base 1000 and bases 1007 and 1008. Similarly, subscriber units (such as subscriber units 1071 and 1072 may be employed as routers for communications between bases (e.g., bases 1000 and 1003), between subscribers, and/or between bases and subscribers.

5. CI Routing Systems

Figure 11A:
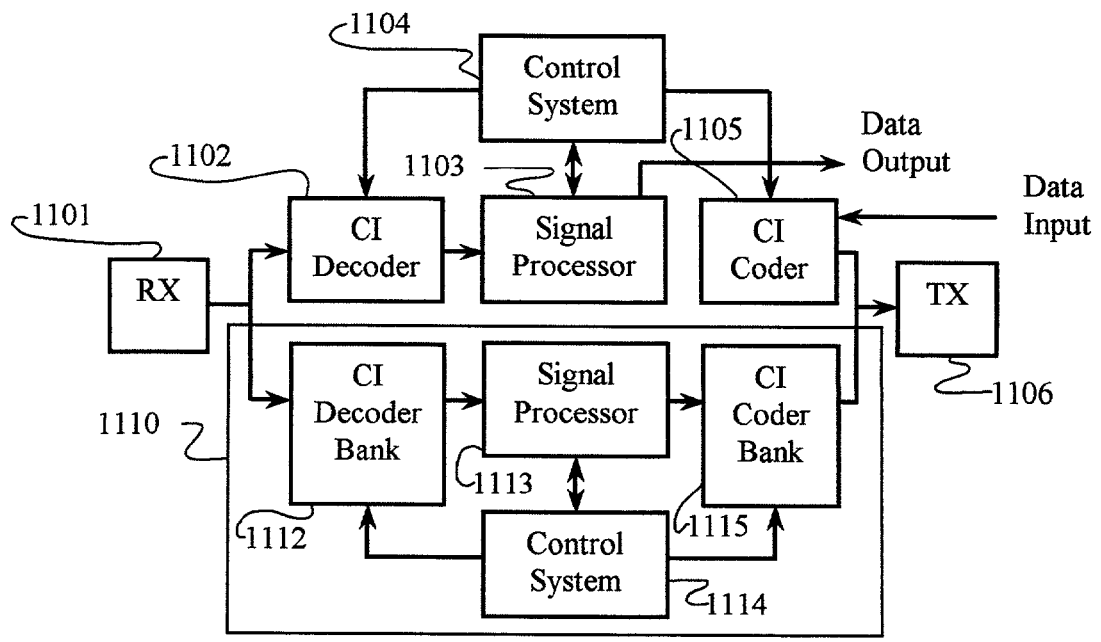
FIG. 11A illustrates a CI transceiver adapted to perform routing.

FIG. 11A illustrates a CI transceiver adapted to perform routing. Transmitted signals are received by a receiver system 1101 that outputs a baseband or IF signal. The receiver system 1101 performs RF and (optionally) baseband processes typically performed to convert an RF signal to a baseband or intermediate frequency signal. For example, the receiver system 1101 may perform channel selection, filtering, amplification, frequency conversion, and A/D conversion.

A CI decoder 1102 is adapted to decode the baseband signal relative to one or more address codes intended for the transceiver. The decoder 1102 may select a signal relative to an address in a header prior to decoding. A signal processor 1103 may process the decoded signals prior to producing an output data stream. Signal processing may include one or more signal-processing operations, including, but not limited to, quantization, channel decoding, multiple access decoding, demultiplexing, formatting, demodulation, channel estimation, channel compensation, synchronization, filtering, error detection, error correction, signal-quality analysis, multi-user detection, phase jitter compensation, frequency-offset correction, time-offset correction, etc.

A control system 1104 is adapted to select, adapt, or otherwise control the operation of one or more transceiver components. For example, channel estimates and/or signal-quality analysis performed by the signal processor 1103 may be processed in the control system 1104 to adapt decoding performed by the decoder 1102. The control system 1104 may provide power-control information to the transmission system 1106. For example, power control may include mitigating the effects of near-far interference. Channel selection may also be performed to mitigate near-far interference. The control system 1104 may provide other types of network control. For example, CI coding may be adapted by the control system 1104.

A CI coder 1105 is adapted to process input data bits to produce a coded signal that is coupled to a transmission system 1106. The transmission system 1106 performs signal-processing operations typically performed to prepare a baseband signal for transmission into a communication channel. The transmission system 1106 may perform one or more processes, including, but not limited to, D/A conversion, modulation, filtering, amplification, frequency conversion, beam forming, etc.

Signals from the receiver system 1101 are coupled to a CI decoder 1112, which may include a bank of CI decoders. The decoder 1112 decodes received signals that are to be retransmitted. The decoded signals are processed in a signal processor 1113. The signal processor 1113 may perform similar signal-processing operations as signal processor 1103. Additionally, the signal processor 1113 may perform duplication, addressing, signal removal, information insertion, re-routing functions, and/or transmitter 1106 control. Furthermore, the signal processor 1113 may perform pre-processing operations prior to coding in a CI coder 1115. The coder 1115 may include a CI coder bank. A control system 1114 is adapted to select, adapt, or otherwise control the operation of one or more of the transceiver components 1112, 1113, and 1115.

The control system 1114 and the coder 1115 may provide channel-compensation and/or beam-forming weights to the coded symbols. Such weights may be regarded as part of the routing process. Since routing decodes some signals that are not intended for the transceiver, the router components 1112, 1113, 1114, and 1115 are isolated from the rest of the transceiver by a fire wall 1110.

Code division duplexing or cancellation division duplexing may be employed to permit reliable reception while concurrently transmitting. Alternatively, other types of duplexing may be employed. Pseudo-random time, frequency, and/or phase codes are typically used to avoid self-jamming. However, CI codes and CI-based waveforms enable the frequency-domain processing required for optimal performance in a multipath environment while providing data redundancy (i.e., channel coding) needed to mitigate errors. Optionally, additional channel coding (e.g., block, convolutional, TCM, turbo, etc.) may be provided to CI waveforms and/or CI coding.

Figure 11B:
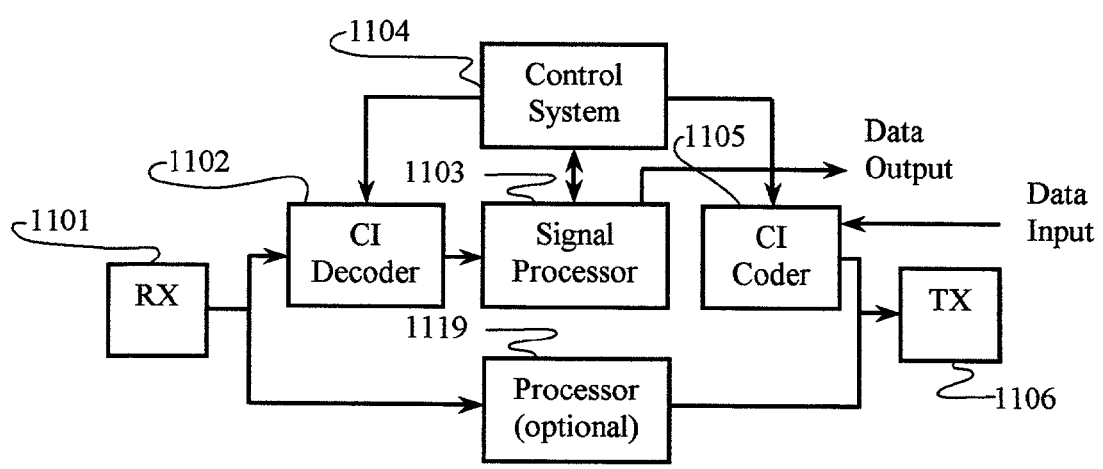
FIG. 11B illustrates an alternative embodiment of a CI transceiver adapted to perform routing.

FIG. 11B illustrates an alternative embodiment of a CI receiver adapted to perform routing. Many of the system components shown in FIG. 11B are similar to components shown in FIG. 11A and thus, are identified by corresponding reference numbers. A portion of the baseband (or IF) signal(s) produced by the receiver system 1101 is optionally processed in a processor 1119 prior to being coupled into the transmission system 1106.

The processor 1119 may perform one or more baseband or IF processes, including, but not limited to, signal shaping, filtering, re-quantization, error detection, error correction, interference mitigation, multi-user detection, amplification, up sampling, down sampling, frequency conversion, D/A conversion, AGC, symbol remapping, etc. The processor 1119 may be adapted to perform routing functions. In some applications, the processor 1119 may perform signal duplication, addressing, signal deletion, signal insertion, signal monitoring, address adjustment, re-routing, request retransmission, update header information, and/or insert or adjust control information.

Figure 11C:
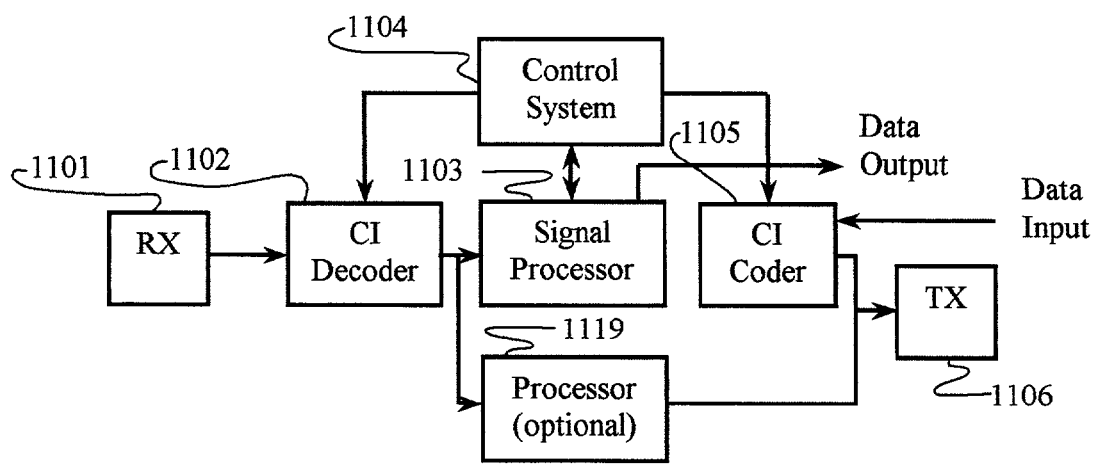
FIG. 11C illustrates an alternative embodiment of a CI transceiver adapted to perform routing.

FIG. 11C illustrates a CI transceiver adapted to decode received signals intended for the transceiver and partially decode and route signals intended for one or more other transceivers. System components shown in FIG. 11C are similar to components shown in FIG. 11B, as indicated by similar reference numbers.

The CI decoder 1103 applies one or more decode signals to the received baseband signal. If the received baseband signal is coded with one or more codes including complex conjugates of the one or more decode signals, a sum of decoded baseband symbols over a code period combines coherently. The combined symbols have a value associated with one or more information signals. The combined symbols may be provided as a data output after one or more optional signal-processing operations.

Symbols generated by the CI decoder 1103 are optionally processed in processor 1119 prior to being coupled to a transmission system 1106 for re-transmission. CI-encoded signals not corresponding to complex conjugates of at least one of the decode signals (i.e., not intended for the transceiver) contribute a substantially zero value to the combined symbols. The processor 1119 may be adapted to remove one or more signal components intended for the transceiver. Since the signals intended for the transceiver provide a dc offset to the individual symbols generated by the CI decoder 1106, these signals may be removed by filtering, cancellation, or some other dc-removal process.

6. CI Routing and Control Methods

Figures 11D, 11E, 11F:
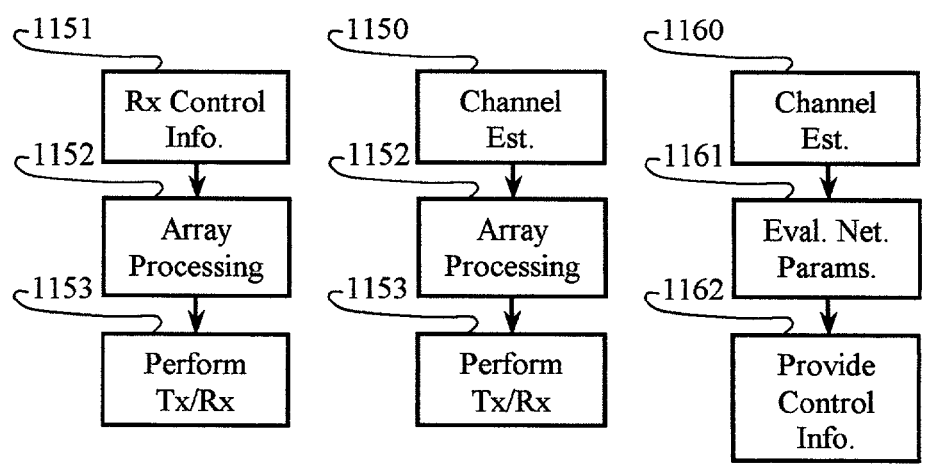
FIG. 11D illustrates a method in which a transceiver in a network is provided with control information that includes information used to generate one or more array-processing weights.
FIG. 11E illustrates a method in which an individual network transceiver is adapted to perform array processing relative to local conditions. The transceiver can be adapted to optimize transmit/receive operations relative to signal quality measured at the transceiver.
FIG. 11F illustrates an array-processing method that employs at least one central processor to provide beamforming operations across a plurality of spatially distributed network transceivers. The central processor may direct the network transceivers to apply weights to transmitted and/or received signals. Alternatively, the central processor may perform array processing by providing weights to signals it transmits to, and receives from, network transceivers. The central processor may be adapted to perform various combining operations, including CI combining.

FIG. 11D illustrates a method whereby a transceiver in a network is provided with control information 1151 that includes information used to generate one or more array-processing weights 1153. Array processing 1153 may be integrated into one or more transceiving functions 1153, such as transmitting, receiving, routing, and/or relay operations.

A subscriber unit (or any other network transceiver) may be adapted to provide a directional or otherwise adaptable beam pattern. A beam pattern may be considered to include any type of array processing, including, but not limited to, space-frequency processing, space-time processing, spatial interferometry, null steering, diversity combining, spatial sweeping, and/or direction-of-arrival processing. A network transceiver, such as a subscriber unit, may act as an antenna element in an array including other network transceivers. Thus, a network transceiver may provide one or more weights to its transmitted and/or received signals as part of a larger array-processing scheme. Similarly, each antenna element of a multi-element network transceiver may be regarded as a transceiver element in a larger array. Each transceiver element may be provided with weights as part of a larger array-processing scheme. Array processing may be performed relative to one or more operational characteristics and/or objectives.

Array processing may depend on one or more network parameters, such as relative location of each destination address, relative location of each transmission source, interference characteristics (e.g., origin of interference, time-domain characteristics, frequency-domain characteristics, polarization, power, etc.), channel characteristics (e.g., multipath, Doppler, etc.), link priority, link security, spectrum management, power control, and network loads. Array processing may depend on the locations of one or more network transceivers, such as relays, routers, access points, base stations, and other subscriber units. Array processing may be adapted relative to changing locations of other network transceivers, changing operational configurations, interference, frequency-reuse plans, channel conditions, power-control specifications, performance measurements (e.g., BER, probability of error, SNR, SNIR, etc.), subscriber services, information type, modulation, formatting, channel selection, multiple-access protocol, frequency band, channel bandwidth, as well as any other Physical Layer and/or MAC Layer configurations.

FIG. 11E illustrates a method in which individual network transceivers are adapted to perform array processing relative to local conditions. A channel-estimation step 1150 provides a characterization of the propagation environment to better optimize array processing 1152 and/or CI processing. Any combination of sub-space processing (i.e., capacity enhancement) and diversity combining (i.e., signal-quality enhancement) may be performed. Array processing 1152 may be integrated into a transceiver-operations step 1153.

FIG. 11F illustrates an array-processing method that employs at least one central processor to provide beam-forming operations across a plurality of spatially distributed network transceivers. Signals received by the distributed network transceivers are coupled to the central processor, which performs channel estimation 1160 to characterize one or more communication channels. Various operational characteristics and/or objectives (e.g., network parameters) are evaluated 1161. The evaluation 1161 can affect calculations of array-processing weights in a step 1162 that provides control information to a plurality of network transceivers. Alternatively, the step of providing control information 1162 may include applications of array-processing weights to signals received from and/or transmitted to the network transceivers by the central processor.

FIG. 12A illustrates a method for providing CI-coded transmissions of information and control signals. The method described in FIG. 12A may be performed by a subscriber unit acting as a base station in a CI network. A CI code generation process 1201 provides CI codes and/or CI-based codes for at least one information signal and at least one control signal. A control signal may provide for one or more control functions, such as, but not limited to, power control, synchronization, code assignments, priority assignments, link assignments, channel assignments, duplexing control, training-signal generation, notice of transfer of control responsibilities, and request acknowledgement. Coding processes 1202 and 1203 encode the information signal(s) and control signal(s), respectively. A transmission process 1204 provides for transmission of the coded signals.

FIG. 12B illustrates a method for managing network control in a CI network by one or more subscriber units adapted to function as base stations. A CI transceiver acting as a base station transmits CI-coded information and control signals in a transmission step 1210. In a network identification and communication restriction step 1211, CI codes can be used, at least in part, to address the communication and control channels. CI codes can be allocated to restrict communications between transceivers permitted to operate in the network. CI codes can also be used to identify a radio network and each of the radio devices, as well as the type of communications being transmitted.

A duplexing step 1212 provides for management of transmission and reception. Various types of duplexing may be employed, such as time-division duplexing, frequency-division duplexing, code-division duplexing, polarization-division duplexing, etc. A CI transceiver may include a plurality of CI decoders in parallel to allow reception of more than one signal simultaneously. Similarly, transmission of coded signals may be performed simultaneously with reception when the transmitted CI codes differ from the code of the received signal. Furthermore, different CI codes may be used to encode transmissions to differentiate types of transmitted signals.

A network-control step 1213 indicates that at least one of the subscriber units becomes a network control station. A network control station initiates communications and maintains power control and time synchronization of the network in the same manner that a base station would normally function. A transfer step provides for transfer of network control from at least one subscriber to at least one other subscriber. The network control station can voluntarily transfer, or be commanded to transfer, power control and time synchronization of the network to any other radio in the network.

FIG. 12C illustrates a network-control method of the present invention. A CI coding step 1221 provides different CI codes (such as may be used to spread a signal) to information and control signals. A network control station may provide time-division duplexing 1222 to regulate transmission and reception. A network-control step 1223 provides for network control by the network control station. Network control 1223 can include various operations, including, but not limited to, synchronization, power control, code assignment, channel assignments, channel coding, transmission-path selection, load balancing, and spectrum management.

FIG. 12D shows a routing method of the present invention. A coding step 1231 provides a multi-address, CI-coded signal for transmission in a transmission step 1232. The addresses may be provided by any combination of CI coding and header addressing. Transmitted signals may be routed via one or more paths through a network. A duplication step 1233 is provided when transmission paths through a node diverge. Duplicated signals are transmitted along their respective paths.

In the methods and systems of the present invention, an address may include any combination of coding and header information. A header typically includes fields that provide control information, information-processing directives, waveform identification, network identification, and/or other information for enabling and facilitating network control and information processing. Tags are typically included in a header of a transmission. An information signal may be provided with one or more tags identifying the type of transmitted information, the amount of information, coding, number of addresses, routing information, and/or any other processing or payload information.

Header fields may include frame-sequence numbers, precedence, security, and end-of-message fields. A header may include a field indicating whether an acknowledgment is required from the destination node. Acknowledgments may be requested upon receipt, reading, and/or printing of received information. An extend field may identify whether an address is an extended network address usable when the destination node corresponding to the network address has moved from one network to another network. Information may be included in the header for forwarding a message to the other network. Information may be provided for updating routing tables maintained at a node. An end-of-routing field may be provided for indicating whether a network address is the last address in a multi-address network header. Tags and/or address information may be included in a preamble of a transmission.

Figure 13A:
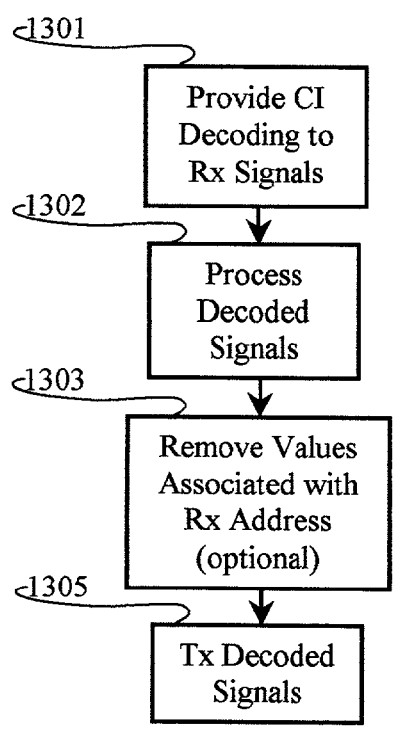
FIG. 13A shows a relay method of the present invention.

FIG. 13A shows a relay method of the present invention. Received signals are decoded in a decoding step 1301 at each node. The decoding step 1301 may involve applying a code to a received signal corresponding to the complex conjugate of the node's address code. A processing step 1302 processes information signals coded with the node's address code. Processing 1302 may include summing the decoded symbols and performing hard and/or soft decisions. Information signals addressed to the node provide a de offset to the symbols of the decoded signal. This offset may optionally be removed 1303 prior to transmitting 1305 the resulting decoded signals.

Figure 13B:
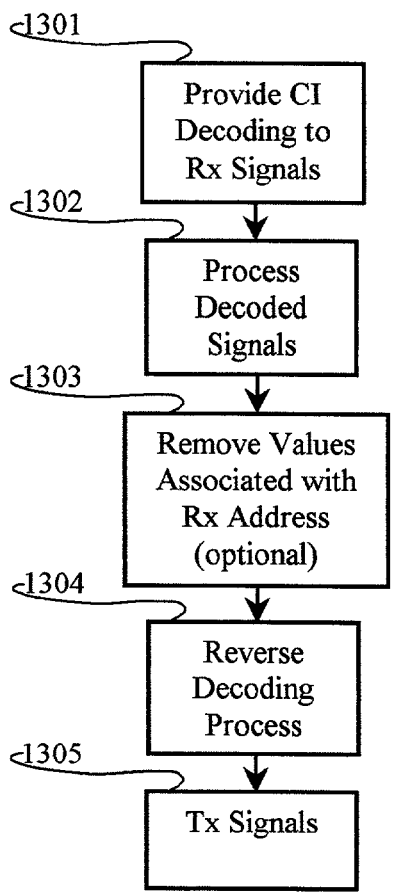
FIG. 13B illustrates an alternative embodiment of a relay method of the invention.

FIG. 13B illustrates an alternative embodiment of a relay method of the invention. Some of the steps in the relay method shown in FIG. 13B are similar to the steps shown in FIG. 13A, as indicated by similar reference numbers. A reverse-decoding step 1304 provided between steps 1303 and 1305 applies the complex conjugate of any codes applied to the received signals in the decoding step 1302.

FIG. 13C illustrates a transceiver processing and routing method of the invention. A decoding step 1301 processes received signals with at least one complex-conjugate code corresponding to at least one address code associated with the transceiver address and/or one or more predetermined addresses. Decoding 1301 may include one or more decoding processes, such as channel decoding, multiple-access decoding, spread-spectrum decoding, and decryption. The decoding step 1301 may optionally include a level-detect function (not shown) to verify that a received signal is present prior to decoding.

A processing step 1302 is adapted to provide one or more signal-processing steps to the decoded signals. The processing step 1302 may estimate the values of information or control signals impressed onto address codes corresponding to one or more complex-conjugate codes provided in the decoding step 1301. For example, an adding step (not shown) may provide for coherent combining of addressed information symbols. A decision step (not shown) may follow the adding step (not shown). If any signal values are present, they may be passed to an optional error detection/correction step 1311.

Error detection/correction 1311 may employ parity checks, trellis demodulation, convolutional decoding, block decoding, and/or any other channel decoding or error-checking technique. Errors may be corrected via receiver-side processing. Alternatively, error detection may initiate a request for re-transmission. Error detection/correction 1311 may include re-quantization, channel estimation, channel compensation, predistortion of transmissions, multi-user detection, and/or optimal combining. Error detection/correction 1311 may include decision processing, including hard decisions and/or soft decisions. Decision processing may include iterative feedback processing, such as turbo decoding.

The signal values may be provided to an optional system-function step 1312. Confidence measures from soft-decision processes may be used to adapt receiver parameters (e.g., the processing step 1302), such as to optimize reception. Similarly, received control information may be used to adjust receiver parameters. System functions 1312 may include AGC, adapting filter parameters, adjusting quantization constellations, and/or changing sampling parameters. System functions may also include removing symbols or values associated with one or more predetermined addresses from the input signal values.

The signal values may be provided to an optional network-function step 1313. Network functions 1313 may be selected or adapted relative to received control information. Network functions 1313 may include routing, addressing, power control, synchronization, request re-transmission, multiple-access control, channel selection, authentication, verification, identification, link-priority assignments, load balancing, spectrum management, and/or error processing. Network functions 1313 may include adding, removing, and/or changing system control information.

Data and control information are re-encoded in a coding step 1304. Re-encoding 1304 may include the application of one or more codes, including address codes, multiple-access codes, spreading codes, channel codes, and encryption. Coded signals are processed for transmission into a communication channel in a transmission step 1305.

FIG. 13D illustrates a transceiver processing and routing method of the invention. A received signal is duplicated in a duplication step 1300. At least one duplicated signal is coupled into a decoding step 1321 that applies a complex-conjugate code to the received signal. The complex-conjugate code is related to the address code of the transceiver. The decoded signal is processed in a processing step 1322 to extract or otherwise estimate information values addressed to the transceiver.

At least one of the duplicated signals is input to a secure procedure 1310. For example, the at least one duplicated signal is passed through a fire wall (not shown). A decoding step 1316 provides for decoding signals addressed to one or more destinations other than the current transceiver. A processing step 1318 is adapted to provide one or more signal-processing steps to the decoded signals. The processing step 1318 may estimate the values of information or control signals impressed onto address codes corresponding to the complex-conjugate code(s) provided in the decoding step 1310.

Processed signals may be coupled to one or more optional processing steps, including error detection/correction 1311, system function 1312, and network function 1313 steps. The processed signals are encoded 1314 prior to being transmitted 1305. Similarly, data input to the transceiver is encoded 1324 prior to being transmitted 1305.

7. Scope of the Invention

In the preferred embodiments, several kinds of addressing, coding, and routing are demonstrated to provide a basic understanding of applications of CI processing in ad-hoc and peer-to-peer networks. With respect to this understanding, many aspects of this invention may vary.

For illustrative purposes, flowcharts and signal diagrams represent the operation of the invention. It should be understood, however, that the use of flowcharts and diagrams is for illustrative purposes only, and is not limiting. For example, the invention is not limited to the operational embodiments represented by the flowcharts. The invention is not limited to specific network architectures shown in the drawings. Instead, alternative operational embodiments and network architectures will be apparent to persons skilled in the relevant art(s) based on the discussion contained herein. Also, the use of flowcharts and diagrams should not be interpreted as limiting the invention to discrete or digital operation.

In practice, as will be appreciated by persons skilled in the relevant art(s) based on the discussion herein, the invention can be achieved via discrete or continuous operation, or a combination thereof. Furthermore, the flow of control represented by the flowcharts is provided for illustrative purposes only. As will be appreciated by persons skilled in the relevant art(s), other operational control flows are within the scope and spirit of the present invention.

Exemplary structural embodiments for implementing the methods of the invention are also described. It should be understood that the invention is not limited to the particular embodiments described herein. Alternate embodiments (equivalents, extensions, variations, deviations, combinations, etc.) of the methods and structural embodiments of the invention and the related art will be apparent to persons skilled in the relevant arts based on the teachings contained herein. The invention is intended and adapted to include such alternate embodiments. Such equivalents, extensions, variations, deviations, combinations, etc., are within the scope and spirit of the present invention.

Signal processing with respect to sinusoidal oscillating signals are described herein. Those skilled in the art will recognize that other types of periodic oscillating signals that can be used, including, but not limited to, sinusoids, square waves, triangle waves, wavelets, repetitive noise waveforms, pseudo-noise signals, and arbitrary waveforms.

The foregoing discussion and the claims that follow describe the preferred embodiments of the present invention. With respect to the claims, it should be understood that changes can be made without departing from the essence of the invention. To the extent such changes embody the essence of the present invention, each naturally falls within the breadth of protection encompassed by this patent. This is particularly true for the present invention because its basic concepts and understandings are fundamental in nature and can be broadly applied.

The invention claimed is:

1. A method, comprising:
spreading a plurality of data symbols with a plurality of polyphase spreading sequences, to produce a plurality of coded symbols; and
modulating the plurality of coded symbols onto an Orthogonal Frequency Division Multiplexing (OFDM) signal that is transmitted into a communication channel;
wherein each of the plurality of polyphase spreading sequences equals a plurality of samples of a different one of a plurality of orthogonal sinusoidal waveforms, the plurality of samples corresponding to a first sampling frequency, and each of the plurality of orthogonal sinusoidal waveforms having a different one of a plurality of uniformly spaced frequencies.

2. The method of claim 1, wherein the plurality of orthogonal sinusoidal waveforms comprises subcarriers of the OFDM signal.

3. The method of claim 1, wherein the first sampling frequency comprises a frequency of one of the plurality of orthogonal sinusoidal waveforms.

4. The method of claim 1, wherein at least one of the polyphase spreading sequences comprises five or more different complex values.

5. The method of claim 1, wherein the plurality of polyphase spreading sequences form an orthonormal basis.

6. The method of claim 1, wherein modulating comprises multiplying each code chip of the plurality of polyphase spreading sequences with a different one of the plurality of data symbols to produce a plurality of sets of data-bearing code chips, and summing each of the plurality of sets of data-bearing code chips to produce the plurality of coded symbols.

7. The method of claim 1, wherein the OFDM signal comprises a plurality of subcarriers that are uniformly spaced in frequency, and modulating comprises providing an offset frequency to each of the plurality of subcarriers.

8. The method of claim 1, wherein the OFDM signal is transmitted in at least one of a peer-to-peer network, an ad-hoc network, a cellular network, a long-haul network, a short-haul network, a last-mile network, a local-area network, a metropolitan-area network, a sensor network, an Radio Frequency identification network, a mobile radio network, a personal communication network, an airborne network, an air-ground network, or a satellite network.

9. The method of claim 1, further comprising providing the OFDM signal with at least one of a cyclic prefix, a guard interval, or a guard band.

10. An apparatus for communication in a wireless communication network, the apparatus comprising:
  at least one processor; and
  a non-transitory computer-readable memory communicatively coupled to the at least one processor, the non-transitory computer-readable memory including a set of instructions stored thereon and executable by the at least one processor for:
    spreading a plurality of data symbols with a plurality of polyphase spreading sequences, to produce a plurality of coded symbols; and
    modulating the plurality of coded symbols onto an Orthogonal Frequency Division Multiplexing (OFDM) signal that is transmitted into a communication channel;
  wherein each of the plurality of polyphase spreading sequences equals a plurality of samples of a different one of a plurality of orthogonal sinusoidal waveforms, the plurality of samples corresponding to a first sampling frequency, and each of the plurality of orthogonal sinusoidal waveforms having a different one of a plurality of uniformly spaced frequencies.

11. The apparatus of claim 10, wherein the plurality of orthogonal sinusoidal waveforms comprises subcarriers of the OFDM signal.

12. The apparatus of claim 10, wherein the first sampling frequency comprises a frequency of one of the plurality of orthogonal sinusoidal waveforms.

13. The apparatus of claim 10, wherein at least one of the polyphase spreading sequences comprises five or more different complex values.

14. The apparatus of claim 10, wherein the plurality of polyphase spreading sequences form an orthonormal basis.

15. The apparatus of claim 10, wherein modulating comprises multiplying each code chip of the plurality of polyphase spreading sequences with a different one of the plurality of data symbols to produce a plurality of sets of data-bearing code chips, and summing each of the plurality of sets of data-bearing code chips to produce the plurality of coded symbols.

16. The apparatus of claim 10, wherein the OFDM signal comprises a plurality of subcarriers that are uniformly spaced in frequency, and modulating comprises providing an offset frequency to each of the plurality of subcarriers.

17. The apparatus of claim 10, wherein the wireless communication network comprises at least one of a peer-to-peer network, an ad-hoc network, a cellular network, a long-haul network, a short-haul network, a last-mile network, a local-area network, a metropolitan-area network, a sensor network, an Radio Frequency identification network, a mobile radio network, a personal communication network, an airborne network, an air-ground network, or a satellite network.

18. The apparatus of claim 10, wherein the non-transitory computer-readable memory further comprises a set of instructions stored thereon and executable by the at least one processor for providing the OFDM signal with at least one of a cyclic prefix, a guard interval, or a guard band.

19. The apparatus of claim 10, wherein the at least one processor and the non-transitory computer-readable memory resides in a User Equipment, a mobile transceiver, a relay, a router, a base station, an airborne transceiver, a satellite transceiver, a radio frequency identification transceiver, an access point, or a personal communication transceiver.

20. A computer program product for operating a transmitter in a wireless communication network, the computer program product comprising a non-transitory computer-readable memory having computer readable program code stored therein, said program code containing instructions executable by one or more processors of a computer system for:
  spreading a plurality of data symbols with a plurality of polyphase spreading sequences, to produce a plurality of coded symbols; and
  modulating the plurality of coded symbols onto an Orthogonal Frequency Division Multiplexing (OFDM) signal that is transmitted into a communication channel;
  wherein each of the plurality of polyphase spreading sequences equals a plurality of samples of a different one of a plurality of orthogonal sinusoidal waveforms, the plurality of samples corresponding to a first sampling frequency, and each of the plurality of orthogonal sinusoidal waveforms having a different one of a plurality of uniformly spaced frequencies.

21. The computer program product of claim 20, wherein the plurality of orthogonal sinusoidal waveforms comprises subcarriers of the OFDM signal.

22. The computer program product of claim 20, wherein the first sampling frequency comprises a frequency of one of the plurality of orthogonal sinusoidal waveforms.

23. The computer program product of claim 20, wherein at least one of the polyphase spreading sequences comprises five or more different complex values.

24. The computer program product of claim 20, wherein the plurality of polyphase spreading sequences form an orthonormal basis.

25. The computer program product of claim 20, wherein modulating comprises multiplying each code chip of the plurality of polyphase spreading sequences with a different one of the plurality of data symbols to produce a plurality of sets of data-bearing code chips, and summing each of the plurality of sets of data-bearing code chips to produce the plurality of coded symbols.

26. The computer program product of claim 20, wherein the OFDM signal comprises a plurality of subcarriers that are uniformly spaced in frequency, and modulating comprises providing an offset frequency to each of the plurality of subcarriers.

27. The computer program product of claim 20, wherein the wireless communication network comprises at least one of a peer-to-peer network, an ad-hoc network, a cellular network, a long-haul network, a short-haul network, a last-mile network, a local-area network, a metropolitan-area network, a sensor network, an Radio Frequency identification network, a mobile radio network, a personal communication network, an airborne network, an air-ground network, or a satellite network.

28. The computer program product of claim 20, wherein said program code further contains instructions executable by the one or more processors of the computer system for providing the OFDM signal with at least one of a cyclic prefix, a guard interval, or a guard band.

29. The computer program product of claim 20, wherein the non-transitory computer-readable memory resides in a User Equipment, a mobile transceiver, a relay, a router, a base station, an airborne transceiver, a satellite transceiver, a radio frequency identification transceiver, an access point, or a personal communication transceiver.

\* \* \* \* \*